US008265273B2

(12) United States Patent
Yokota et al.

(10) Patent No.: US 8,265,273 B2
(45) Date of Patent: Sep. 11, 2012

(54) ENCRYPTION DEVICE USING MASK VALUE TO CONVERT PLAIN TEXT INTO ENCRYPTED TEXT

(75) Inventors: Kaoru Yokota, Hyogo (JP); Yuusaku Ohta, Osaka (JP)

(73) Assignee: Panasonic Corporation, Osaka (JP)

( * ) Notice: Subject to any disclaimer, the term of this patent is extended or adjusted under 35 U.S.C. 154(b) by 550 days.

(21) Appl. No.: 12/517,301

(22) PCT Filed: May 26, 2008

(86) PCT No.: PCT/JP2008/001304
§ 371 (c)(1),
(2), (4) Date: Jun. 2, 2009

(87) PCT Pub. No.: WO2008/146482
PCT Pub. Date: Dec. 4, 2008

(65) Prior Publication Data
US 2010/0086126 A1    Apr. 8, 2010

(30) Foreign Application Priority Data
May 30, 2007    (JP) .................................. 2007-143242

(51) Int. Cl.
*H04L 9/22*    (2006.01)
*G06F 17/16*    (2006.01)
(52) U.S. Cl. ........................... 380/46; 380/252; 380/205
(58) Field of Classification Search ........................ None
See application file for complete search history.

(56) References Cited

U.S. PATENT DOCUMENTS
6,295,606 B1    9/2001    Messerges et al.

FOREIGN PATENT DOCUMENTS
EP    1 596 278    11/2005
JP    2007-235913    9/2007
WO    2005/109183    11/2005

OTHER PUBLICATIONS

An AES Smart Card Implementation Resistant to Power Analysis Attacks. Herbst et al. ACNS(2006) pp. 239-252.*
An efficient Masking Scheme for AES Software Implementations. Oswald et al.LNCS(2005) pp. 292-305.*
International Search Report issued Jul. 22, 2008 in the International (PCT) Application of which the present application is the U.S. National Stage.
Elisabeth Oswald et al., "A Side-Channel Analysis Resistant Description of the AES S-Box", FSE 2005, LNCS 3557, 2005, pp. 413-423.
Sumio Morioka et al., "DPA attack to AES S-Box Circuits over Composite Fields", Computer Security Symposium 2004 Preliminary Report, Oct. 2004, pp. 679-684 and its full English translation.
Federal Information Processing Standards Publication 197, Specification for the Advanced Encryption Standard (AES), Nov. 26, 2001.

\* cited by examiner

*Primary Examiner* — Venkat Perungavoor
(74) *Attorney, Agent, or Firm* — Wenderoth, Lind & Ponack, L.L.P.

(57) ABSTRACT

An encryption circuit is provided which generates encrypted text from plain text using a key. The encryption circuit includes a randomized 8-bit inverse element calculation circuit which receives randomized input data that is obtained by adding, to input data on which predetermined processing is performed with the key, a predetermined input mask value determined depending on a random number, and which generates randomized output data that is obtained by adding, to an inverse element of the input data, an output mask value that is an inverse element of the input mask value, wherein the encryption circuit generates the encrypted text from the generated randomized output data.

8 Claims, 38 Drawing Sheets

ENCRYPTION DEVICE USING MASK VALUE TO CONVERT PLAIN TEXT INTO ENCRYPTED TEXT

TECHNICAL FIELD

The present invention relates to an encryption device, a decryption device, an encryption method, and an integrated circuit that are secured against attack methods for analyzing encryption keys embedded in encryption modules by measuring power consumption when performing encryption processing.

BACKGROUND ART

In recent years, different cryptanalysis methods for analyzing encryption keys using side information when encryption modules implemented in hardware or software perform encryption processing have been formulated. For instance, in an analysis method called a timing attack, an encryption key is analyzed by using a fact that a time required for an encryption module to perform encryption processing slightly varies according to a value of the encryption key being used in the encryption processing. To put it differently, in the timing attack, cryptanalysis of the encryption key is performed using side information that is a processing time when performing the encryption processing. Among those cryptanalysis methods, different methods such as a simple power analysis and a differential power analysis have been formulated as cryptanalysis methods for performing cryptanalysis using, as side information, power consumption when performing encryption processing. It has been reported that the methods of cryptanalysis can be used to analyze an actual product, such as an IC card, in which a cipher is implemented, partly because high-performance measuring devices have recently become available at a low price. Furthermore, a great number of analysis methods, such as a method for performing cryptanalysis using, as side information, the strength of an electromagnetic wave generated in an encryption module when performing encryption processing, have been formulated. In the following description, cryptanalysis methods for analyzing encryption keys using power consumption of encryption modules when performing encryption processing are collectively called a "power analysis attack". Although the following gives a description using the power analysis attack as an example, the present invention is also effective for other analysis methods in which side information is used. In other words, the present invention can be applied to not only the power analysis attack but also analysis methods for inferring keys using side information generated in encryption modules during encryption processing.

The power analysis attack performs a key analysis using a correlation between power consumption of an encryption module and an intermediate value in encryption processing. Thus, as a countermeasure for the power analysis attack, it is thought that the correlation between the power consumption and the intermediate value in encryption processing is obscured by randomizing the intermediate value with a random number generated in the encryption module. Randomizing the intermediate value in encryption processing in the above manner is called "masking" the intermediate value. Moreover, methods for making the key analysis of the power analysis attack difficult by masking the intermediate value are collectively called a "masking method".

Patent Reference 1 discloses the masking method (hereinafter referred to as Conventional Technique 1) for the U.S. Data Encryption Standard (DES) cipher.

(Summary of Conventional Technique 1)

According to Conventional Technique 1, a randomized Sbox table in which a table Sbox for data conversion used for the DES cipher is randomized based on a random number generated in an encryption module is created prior to encryption processing and temporarily stored. Using the randomized Sbox table allows an intermediate value for encryption processing to be masked, which makes power analysis attack difficult. Here, in Conventional Technique 1, a RAM for temporarily storing the randomized Sbox table is needed. Thus, in the case where there are strict limits on RAM capacity, there is a problem that Conventional Technique 1 cannot be used. Moreover, in the case where the encryption module is implemented in hardware, an Sbox table is generally implemented in a logic circuit. Thus, since the randomized Sbox table cannot be created, there is a problem that Conventional Technique 1 cannot be used.

(Summary of Conventional Technique 2)

Non-patent Reference 1 discloses a masking method (hereinafter referred to as Conventional Technique 2) for the U.S. Advanced Encryption Standard (AES) cipher. Since the Sbox table can be implemented in the logic circuit and, as with Conventional Technique 1, the randomized Sbox table does not need to be created, Conventional Technique 2 is suitable for hardware implementation. The following will describe the summary of Conventional Technique 2.

It is known that an inverse element calculation ("X^Y" indicates "raising X to the Y power") in an extension field $GF(2^8)$ and processing in which predetermined affine transformation is preformed are equivalent in an Sbox table for AES cipher. In addition, an example of methods for implementing in a circuit the inverse element calculation for an element X in the extension field $GF(2^8)$ includes the following existing method.

(1) Transform X into an element A in a composite field $GF(((2^2)^2)^2)$ that is the same type as $GF(2^8)$.
(2) Calculate an inverse element $A^{\wedge}(-1)$ of A in the composite field.
(3) Inversely transform $A^{\wedge}(-1)$ into an element in an extension field to obtain $X^{\wedge}(-1)$.

In this method, it is possible to implement the inverse element calculation with a small circuit size by performing the inverse element calculation in the composite field.

When the Sbox table for AES cipher is implemented through the above inverse element calculation and affine transformation and a masking method is applied to the Sbox table for AES cipher, it is possible to increase a resistance to the power analysis attack with the small circuit size. At this time, a point is how a portion of the inverse element calculation is masked. The following will briefly describe the masking method for the portion of the inverse element calculation in Conventional Technique 2.

FIGS. 1 to 7 show a randomized 8-bit inverse element calculation unit 81 included in an encryption device according to Conventional Technique 2.

<Randomized 8-Bit Inverse Element Calculation Unit 81>

FIG. 1 is a block diagram showing a configuration of the randomized inverse element calculation unit 81 according to Conventional Technique 2. The randomized 8-bit inverse element calculation unit 81 performs an inverse element calculation using, as inputs, masked data X (8 bits) that is an object of the inverse element calculation, mask data R (8 bits), a random number for calculation r (4 bits), and outputs the masked result of the inverse element calculation Y (8 bits). Here, X is data that has been masked with the mask data R, and expressed as X=M(+)R. Here, M (8 bits) is data that has not been masked, and "(+)" indicates a bit-basis exclusive OR operation. Y is expressed as Y={M^(-1)}(+)R. In other words, the randomized 8-bit inverse element calculation unit 81 performs the inverse element calculation using, as an input, M that has been masked by R, and accordingly outputs M^(-1) that is masked with R. Stated differently, since the inverse element calculation is performed on M that is an intermediate value for encryption processing with M masked with the random mask data R, power analysis attack is difficult to execute.

As shown in FIG. 1, the randomized 8-bit inverse element calculation unit 81 includes seventeenth power calculation units 810 and 812 that perform a seventeenth power calculation in a composite field GF(((2^2)^2)^2), a 4-bit correction term calculation unit 811 (FIG. 2), 4-bit output calculation units 816 and 817 (FIG. 3), exclusive OR units 813, 814, 818, and 819 that perform a 4-bit exclusive OR operation, and a randomized 4-bit inverse element calculation unit 815 (FIG. 4).

Here, as shown in FIG. 2, the 4-bit correction term calculation unit 811 includes 4-bit multiplication units 811*a* and 811*b* that perform a multiplication in a composite field GF((2^2)^2), and exclusive OR units 811*c* and 811*d* that perform the 4-bit exclusive OR operation. It is to be noted that the composite field GF (((2^2)^2)^2) is a secondary extended composite field GF ((2^2)^2).

Furthermore, as shown in FIG. 3, the 4-bit output calculation units 816 and 817 each include 4-bit multiplication units 816*a* to 816*d* that perform the multiplication in the composite field GF((2^2)^2), and exclusive OR units 816*e* to 816*j* that perform the 4-bit exclusive OR operation.

Moreover, as shown in FIG. 4, the randomized 4-bit inverse element calculation unit 815 includes fifth power calculation units 820 and 822 that perform a fifth power calculation in the composite field GF((2^2)^2), a 2-bit correction term calculation unit 821 (FIG. 5), 2-bit output calculation units 826 and 827 (FIG. 6), exclusive OR units 823, 824, 828, and 829 that perform a 2-bit exclusive OR operation, and a randomized 2-bit inverse element calculation unit 825 (FIG. 7).

Here, as shown in FIG. 5, the 2-bit correction term calculation unit 821 (FIGS. 4 and 5) includes 2-bit multiplication units 821*a* and 821*b* that perform a multiplication in a finite field GF(2^2), and exclusive OR units 821*c* and 821*d* that perform the 2-bit exclusive OR operation. It is to be noted that the composite field GF((2^2)^2) is a secondary extended finite field GF(2^2).

In addition, as shown in FIG. 6, the 2-bit output calculation units 826 and 827 (FIGS. 4 and 6) each include 2-bit multiplication units 826*a* to 826*d* that perform the multiplication in the finite field GF(2^2), and exclusive OR units 826*e* to 826*j* that perform the 2-bit exclusive OR operation.

Furthermore, as shown in FIG. 7, the randomized 2-bit inverse element calculation unit 825 (FIGS. 4 and 7) includes exclusive OR units 825*a* and 825*b* that perform a 1-bit exclusive OR operation.

As described above, the randomized 8-bit inverse element calculation unit 81 (FIG. 1) that is provided to the encryption device according to Conventional Technique 2 is configured to cause recursively the randomized 4-bit inverse element calculation unit 815 and the randomized 2-bit inverse element calculation unit 825 to operate. Due to this configuration implementation is possible with a relatively smaller circuit size, in comparison with other conventional techniques.

Conventional Technique 2 discloses the encryption device that is designed to be suitable for hardware implementation by providing the randomized 8-bit inverse element calculation unit 81 (FIG. 1) so as to implement the Sbox table for AES cipher through the inverse element calculation and the affine transformation.

Non-patent Reference 1: Morioka, Sumio & Toru Akishita. (October, 2004). DPA attack to AES S-Box Circuits over Composite Fields. *Computer Security Symposium* 2004 *Preliminary Report*, 679-684.

Non-patent Reference 2: Federal Information Processing Standards Publication 197, Specification for the ADVANCED ENCRYPTION STANDARD (AES), Nov. 26, 2001

Patent Reference 1: U.S. Pat. No. 6,295,606

DISCLOSURE OF INVENTION

Problems that Invention is to Solve

However, due to the above mentioned recursive configuration of the randomized 8-bit inverse element calculation unit 81 (FIG. 1), Conventional Technique 2 has had a problem that the maximum number of logical steps becomes large. The following will describe an estimation of critical paths and the maximum number of logical steps when the randomized 8-bit inverse element calculation unit 81 according to Conventional Technique 2 is implemented in a circuit.

The critical paths of the randomized 8-bit inverse element calculation unit 81 (FIGS. 1 to 7) are as follows.

First, the following is a critical path in FIG. 1.

The seventeenth power calculation unit 810 »the exclusive OR unit 813 »the exclusive OR unit 814 »the randomized 4-bit inverse element calculation unit 815 (FIG. 4) »the 4-bit output calculation unit 817 (FIG. 3) »the exclusive OR unit 818 »the exclusive OR unit 819

Here, critical paths in the 4-bit output calculation unit 817 (FIG. 3) and the randomized 4-bit inverse element calculation unit 815 (FIG. 4) that are on the above critical path are as follows.

First, the following is the critical path in the 4-bit output calculation unit 817 (FIG. 3).

The 4-bit multiplication unit 816*a* » the exclusive OR unit 816*e* »the exclusive OR unit 816*f* »the exclusive OR unit 816*i* »the exclusive OR unit 816*j*

The following is the critical path in the randomized 4-bit inverse element calculation unit 815 (FIG. 4).

The fifth power calculation unit 820 »the exclusive OR unit 823 »the exclusive OR unit 824 »the randomized 2-bit inverse element calculation unit 825 (FIG. 7) »the 2-bit output calculation unit 827 (FIG. 6) »the exclusive OR unit 828 »the exclusive OR unit 829

The 2-bit output calculation unit 827 (FIG. 6) and the randomized 2-bit inverse element calculation unit 825 (FIG. 7) are on the above critical path. Each of critical paths in these units is as follows.

First, the following is the critical path in the 2-bit output calculation unit 827 (FIG. 6).

The 2-bit multiplication unit 826*a* » the exclusive OR unit 826*e* »the exclusive OR unit 826*f* »the exclusive OR unit 826*i* »the exclusive OR unit 826*j*

The following is the critical path in the randomized 2-bit inverse element calculation unit 825 (FIG. 7).

The exclusive OR unit 825*a* »the exclusive OR unit 825*b*

Therefore, the maximum number of logical steps in the randomized 8-bit is the number of logical steps at the time of serially processing the following processes.

Seventeenth power calculation×1 time

Fifth power calculation×1 time 4-bit multiplication×1 time 2-bit multiplication×1 time Exclusive OR operation×18 times It is to be noted that, here, 18 in "Exclusive OR operation× 18 times" is obtained through the following calculation: 18=4+4+4+4+2.

As mentioned above, Conventional Technique 2 has had the problem that the maximum number of logical steps becomes large.

The present invention has been conceived to solve the problem in encryption processing of Conventional Technique 2, and has an objective of providing an encryption device which can reduce the maximum number of logical steps more than Conventional Technique 2 has done, by using an implementation method for Sbox table in which an inverse element calculation in a composite field GF $(((2^2)^2)^2)$ is performed in the same manner as Conventional Technique 2.

Means to Solve the Problems

The present invention adopts the following structure in order to solve the above problem.

In other words, an encryption device which generates encrypted text from plain text using a key, the encryption device being structured to include a first randomization inverse element data generation unit which receives randomization input data and an input mask value, and which generates randomization output data that is obtained by adding, to an inverse element in a predetermined first finite field of the input data, an output mask value that is an inverse element in the predetermined first finite field of the received input mask value, wherein the encryption device generates the encrypted text from the randomized input data, the randomization input data being obtained by adding, to input data on which predetermined processing is performed with the key, an input mask value determined depending on a random number.

The present invention can realize the encryption device in which the output mask value is the inverse element of the input mask value and which has a simple structure and the fewer number of logical steps.

Effects of the Invention

The present invention can realize the encryption device having the simple structure and the fewer number of logical steps.

NUMERICAL REFERENCES

Figure 1:
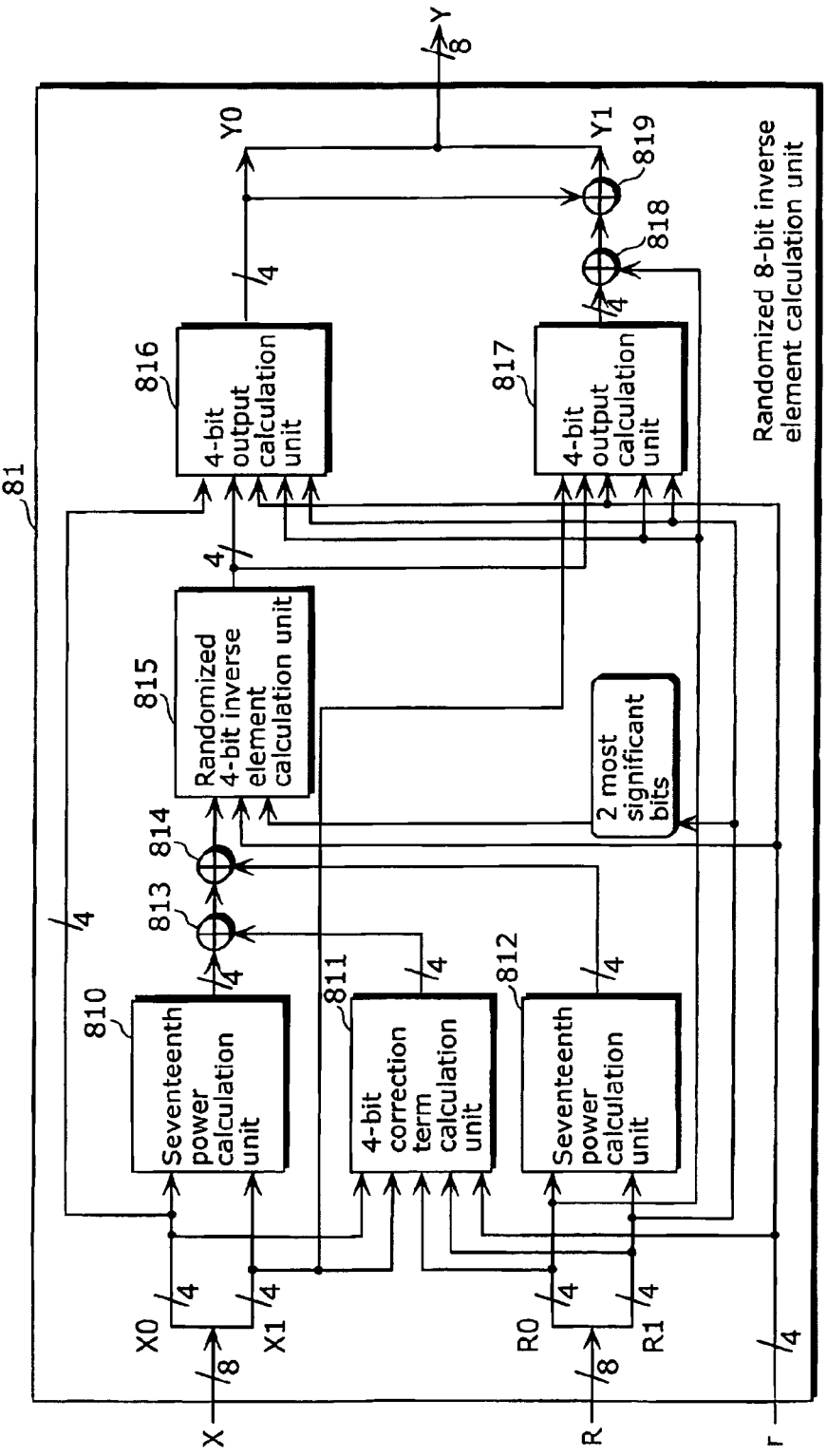
FIG. 1 is a block diagram showing a configuration of a randomized 8-bit inverse element calculation unit 81 according to a conventional technique.
Figure 2:
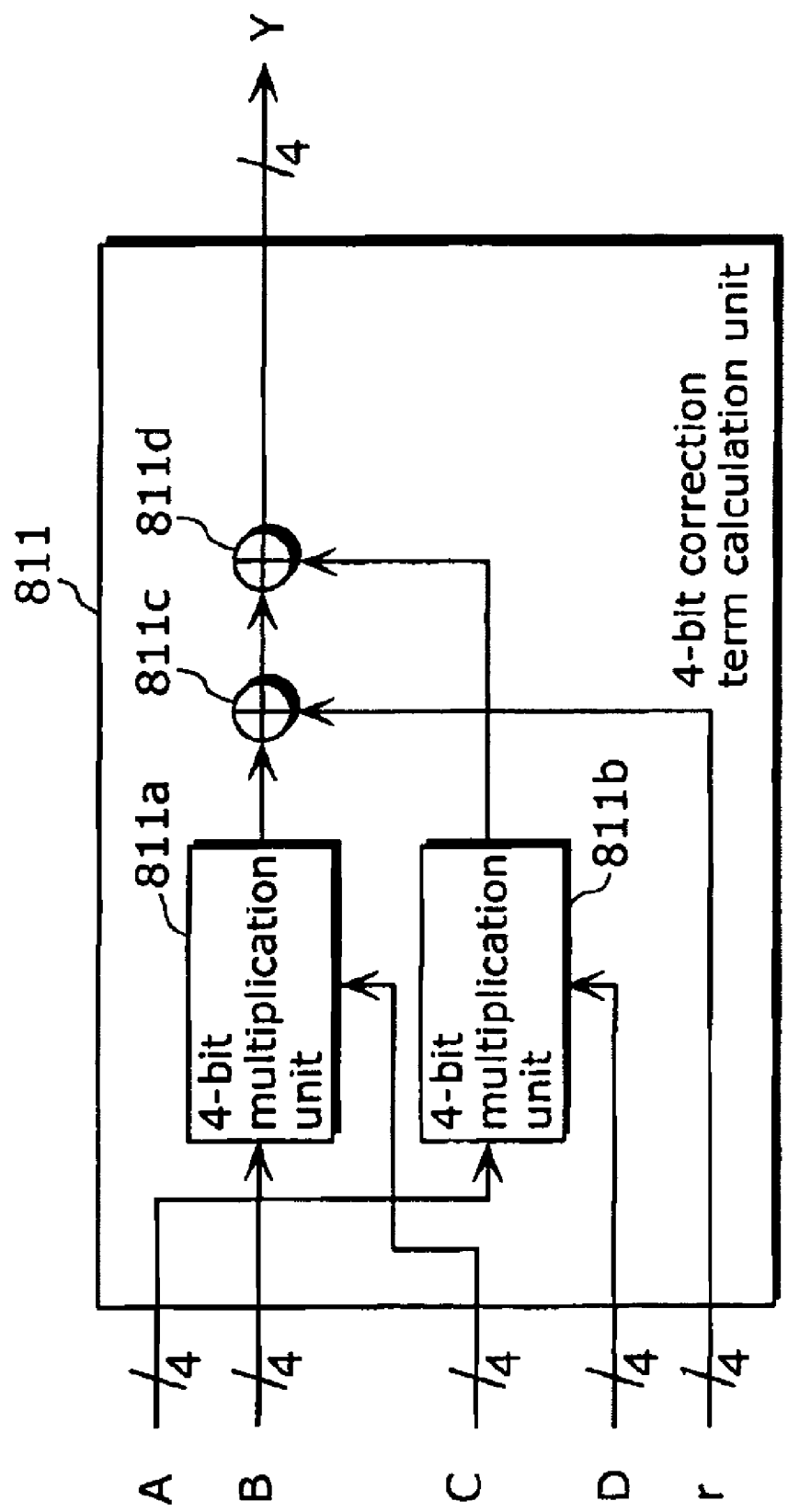
FIG. 2 is a block diagram showing a configuration of a 4-bit correction term calculation unit 811 according to the conventional technique.
Figure 3:
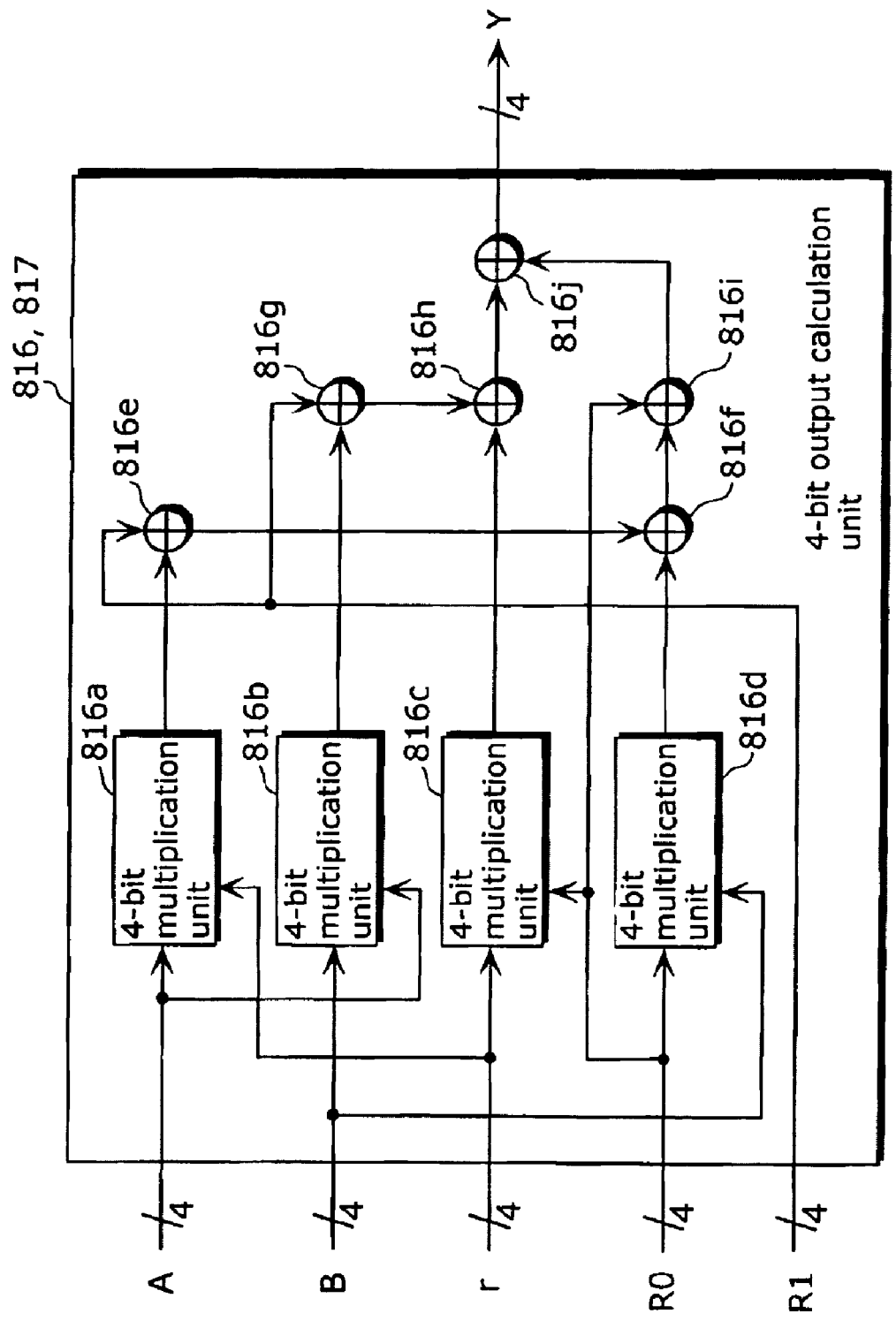
FIG. 3 is a block diagram showing a configuration of 4-bit output calculation units 816 and 817 according to the conventional technique.
Figure 4:
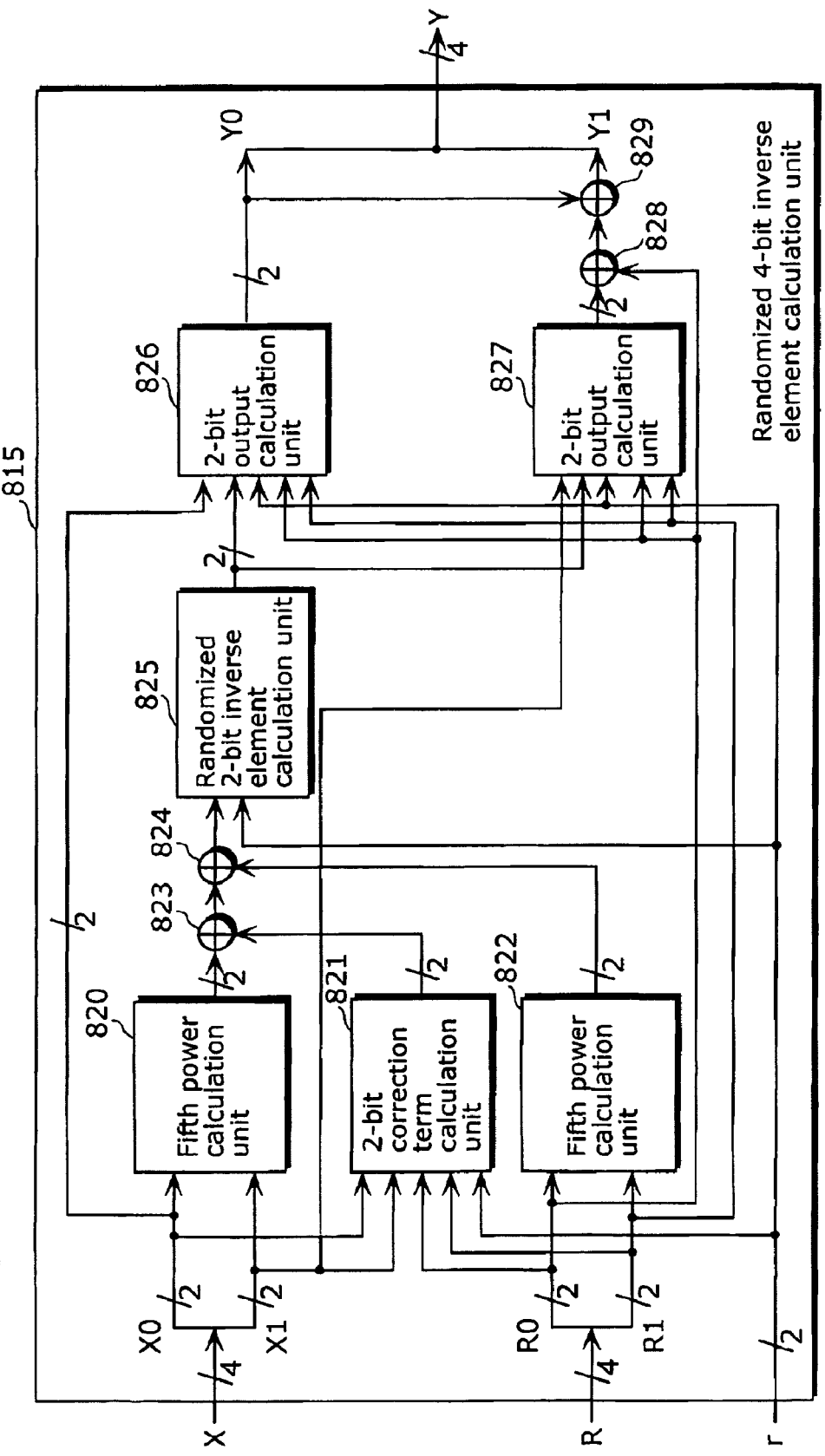
FIG. 4 is a block diagram showing a configuration of a randomized 4-bit inverse element calculation unit 815 according to a conventional technique.
Figure 5:
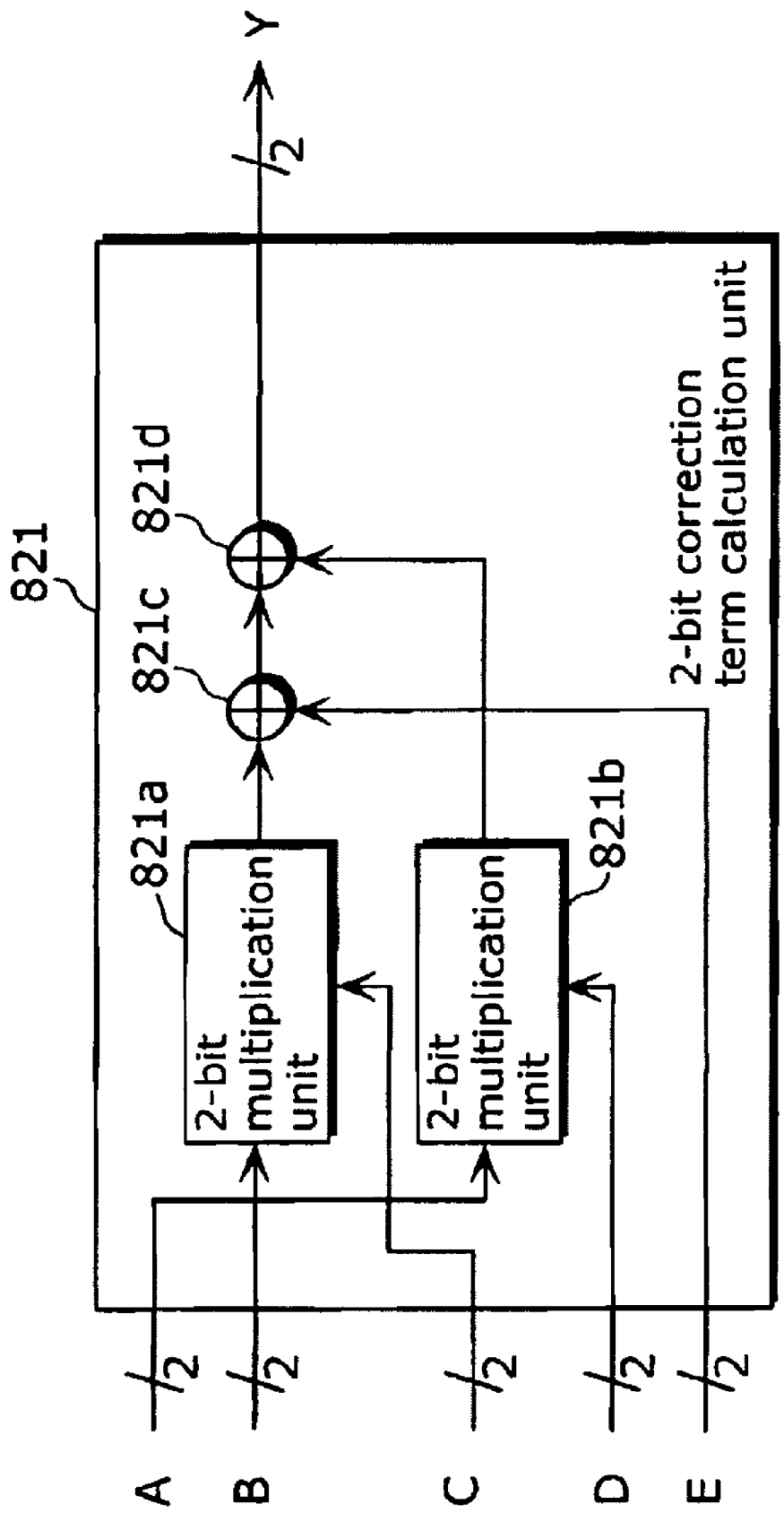
FIG. 5 is a block diagram showing a configuration of a randomized 2-bit inverse element calculation unit 821 according to the conventional technique.
Figure 6:
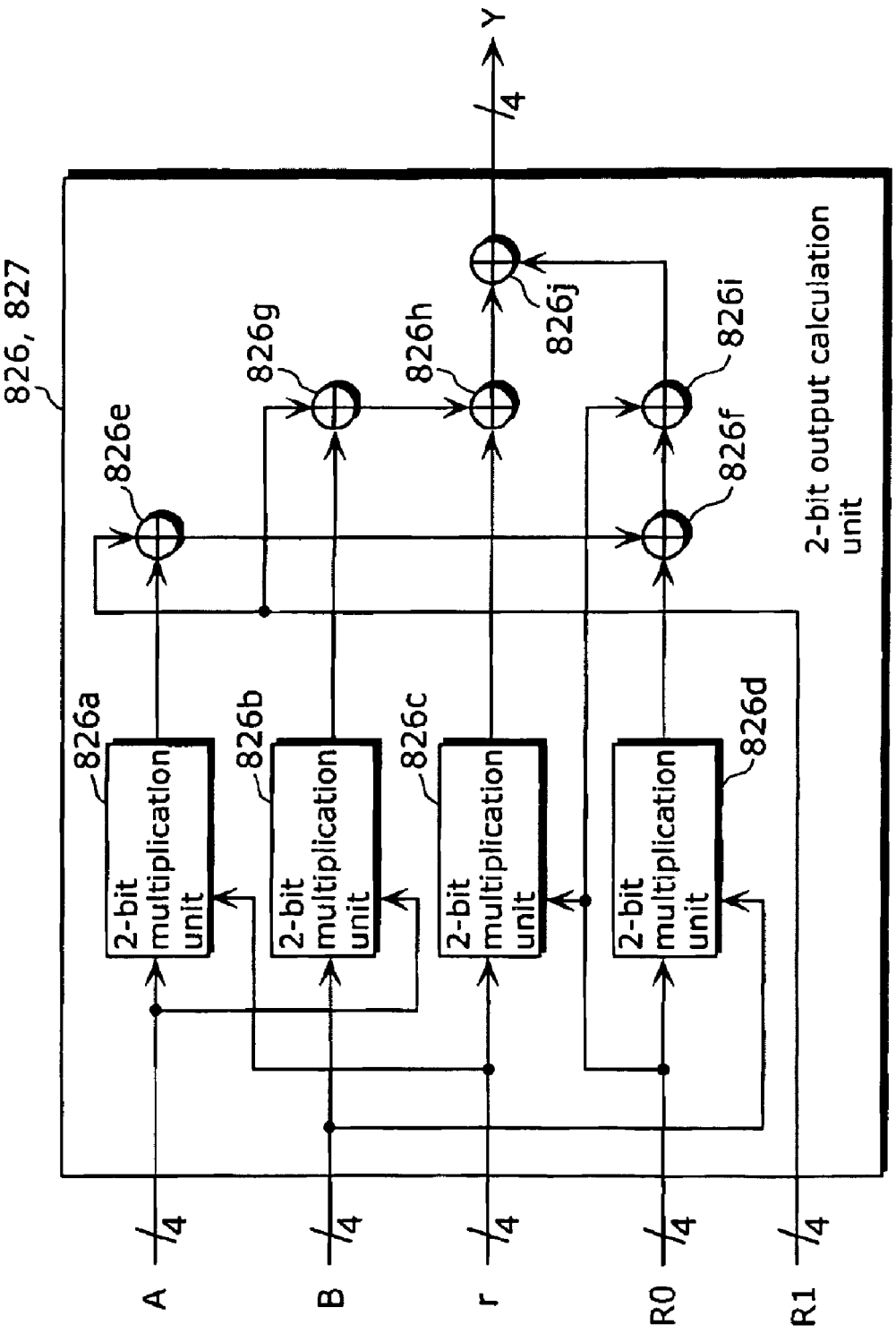
FIG. 6 is a block diagram showing a configuration of 2-bit output calculation units 826 and 827 according to the conventional technique.
Figure 7:
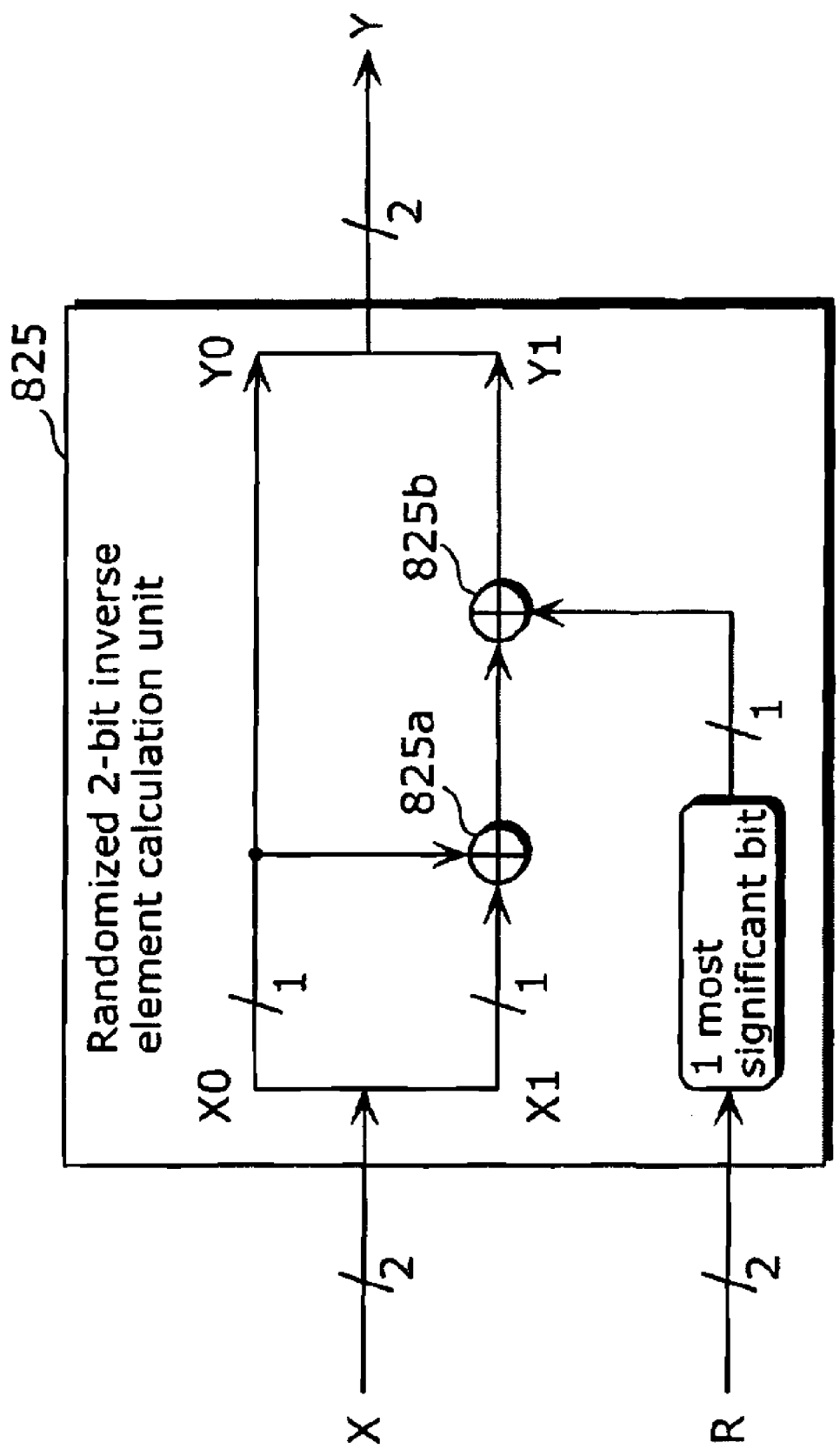
FIG. 7 is a block diagram showing a configuration of a randomized 2-bit inverse element calculation unit 825 according to a conventional technique.

1 Encryption device
1a Encryption unit
1b and 3b Round key generation unit
1c and 3c Key storage unit
10 and 30 Mask processing unit
11, 31, 123, 132, 322, and 332 AddRoundKey
12X Randomized Round_t
12 Randomized Round_n
Randomized Round_10
14 and 34 Unmask processing unit
15 and 35 Random number generation unit
16 and 36 Random number temporary storage unit
17 and 37 Random number update unit
100, 103, 170, and 303 Composite field conversion unit
101 Randomized 8-bit inverse element calculation unit
102 and 172 Extension field conversion and matrix conversion unit
104, 110a, 110e, 111c, 113, 115a, 118c, 118e, 140, 142a, 150a, 150e, 151c, 153, 154c, 155a, 158c, 158e, 171a, 204, 205, 207, 214, 215, and 216 Exclusive OR unit
110X, 110, 112, and 171b Seventeenth power calculation unit
20, 110b, 110c, 110d, 111a, 111b, 118a, 118b, 118d, 171d, and 171e 4-bit multiplication unit
111 4-bit correction term calculation unit
114 Randomized 4-bit inverse element calculation unit
115X, 115, and 117 Sixteenth power calculation unit
116 and 171c 4-bit inverse element calculation unit
118X, 118, and 119 4-bit output calculation unit
120X, 120, and 130 Randomized SubBytes
121X, 120a, 120b, 120c, and 120p Randomized S-Box
121 and 131 ShiftRows
122 MixColumns
141X, 141, 150, and 152 Fifth power calculation unit
142 and 156 2-bit inverse element calculation unit
21, 143, 144, 150b, 150c, 150d, 151a, 151b, 158a, 158b, 158d, 200, 201, 202, 203, and 206 2-bit multiplication unit
151 2-bit correction term calculation unit
154 Randomized 2-bit inverse element calculation unit
155X, 155, and 157 Fourth power calculation unit
158X, 158, and 159 2-bit output calculation unit
171 8-bit inverse element calculation unit
210, 211, 212, and 213 AND operation unit
3 Decryption device
3a Decryption unit
32 Randomized InvRound_n
33 Randomized InvRound_0
300 and 370 Composite field conversion and inverse matrix conversion unit
301 8-bit randomized composite field inverse element calculation unit
302 and 372 Extension field conversion unit
320 and 330 InvShiftRows
321 and 331 Randomized InvSubBytes
323 InvMixColumns
331a, 331b, 331c, and 331p Randomized InvS-Box
371 8-bit composite field inverse element calculation unit
81 Randomized 8-bit inverse element calculation unit
810 and 812 Seventeenth power calculation unit
811 4-bit correction term calculation unit
815 Randomized 4-bit inverse element calculation unit
816 and 817 4-bit output calculation unit
811a, 811b, 816a, 816b, 816c, and 816d 4-bit multiplication unit
820 and 822 Fifth power calculation unit
821 2-bit correction term calculation unit
825 Randomized 2-bit inverse element calculation unit
826 and 827 2-bit output calculation unit
821a, 821b, 826a, 826b, 826c, and 826d 2-bit multiplication unit
811c, 811d, 813, 814, 816e, 816f, 816g, 816h, 816i, 816j, 818, 819, 821c, 821d, 823, 824, 825a, 825b, 826e, 826f, 826g, 826h, 826i, 826j, 828, and 829 Exclusive OR unit

BEST MODE FOR CARRYING OUT THE INVENTION

An encryption device according to an aspect (of the present invention) is an encryption device which generates encrypted text from plain text using a key, the encryption device including: a random number generation unit configured to generate a random number; a randomized input data generation unit configured to receive the plain text, and generate randomized input data that is obtained by adding, to input data that is obtained by performing predetermined processing on the plain text using the key, a predetermined input mask value determined depending on the random number; a first randomized inverse element data generation unit configured to receive the randomized input data generated by the randomized input data generation unit and the input mask value, and generate randomized output data that is obtained by adding, to an inverse element of the input data in a predetermined first finite field, an output mask value that is an inverse element of the received input mask value in the first finite field; and an output data processing unit configured to receive the randomized output data generated by the first randomized inverse element data generation unit, and generate the encrypted text from the received randomized output data.

According to the present aspect, the following are performed in order to prevent an analysis of a key used for generating encrypted text from plain text through measurement of side information. Specifically, randomized output data to which an output mask value is added is generated from randomized input data that is obtained by adding, to input data on which predetermined processing is performed with the key, an input mask value. In addition, the output mask value is an inverse element of the input mask value at the time of the generation. Accordingly, the encryption device simple structure can have a simple structure and the smaller number of logical steps.

It is to be noted that the encryption device may further include a mask value generation unit which receives the generated random number and generates the input mask value from the received random number, and that the first randomization inverse element data generation unit may receive the generated input mask value and perform the generation. In this manner, a structure in which the input mask value is inputted from the outside to the encryption device becomes unnecessary, thereby simplifying a system structure.

In an encryption device according to an other aspect (of the present invention), the first randomized inverse element data generation unit includes: a first exponential operation unit configured to perform, with a predetermined first exponent, an exponential operation on the randomized input data and the input mask value, and generate, through the exponential operations, first exponential randomized input data and a first exponential input mask value, respectively; a correction data generation unit configured to generate predetermined correction data from the randomized input data and the input mask value; an addition unit configured to add the generated correction data to the calculated first exponential randomized input data, and generate side randomized input data; a second randomized inverse element data generation unit configured to receive the side randomized input data and the first exponential input mask value, and generate randomized side output data that is obtained by adding, to an inverse element of the side randomized input data in a predetermined second finite field, a mask value that is an inverse element of the first exponential input mask value in the second finite field; and a randomized output data generation unit configured to generate the randomized output data from the randomized side output data, the randomized input data, the input mask value, and the first exponential input mask value.

According to the other present aspect, the randomized output data is generated through a simple structure, and an encryption device can be realized with a simple structure having the smaller number of logical steps which reduces trouble and malfunction as well as facilitates design.

Furthermore, in an encryption device according to aspect A (an aspect of the present invention), a conventional operation of a randomized composite field inverse element calculation unit, in which X=M+R is converted into Y=M^(−1)+R, is replaced with an operation in which X=M+R is converted into Y=M^(−1)+R^(−1). Accordingly, it becomes possible to achieve an advantage of the conventional methods that compact implementation is possible while reducing the maximum number of logical steps more than the conventional methods.

Moreover, an encryption device according to aspect B (an other aspect of the present invention) is an encryption device which performs, on plain text, predetermined encryption processing based on a key, the encryption device including: a random number generation unit which generates a random number; a first randomized inverse element calculation unit which receives randomized input data and an input mask value, performs an inverse element calculation in a first finite field, and output randomized output data, wherein the randomized input data is a value that is masked by adding the input mask value and the input data, the randomized output data is a value that is masked by adding an output mask value and output data, the input mask value is a value that is determined depending on the random number, the output data is an inverse element in the first finite field of the input data, and the output mask value is an inverse element in the first finite field of the input mask value.

Here, in the encryption device according to aspect B, the first randomized inverse element calculation unit may include: a first exponential operation unit configured to perform, with a predetermined first exponent, an exponential operation on the randomized input data and the input mask value, and generate, through the exponential operations, first exponential randomized input data and a first exponential input mask value, respectively; a correction data generation unit configured to generate predetermined correction data from the randomized input data and the input mask value; an addition unit configured to add the generated correction data to the calculated first exponential randomized input data, and generate side randomized input data; a second randomized inverse element data generation unit configured to receive the side randomized input data and the first exponential input mask value, and generate randomized side output data that is obtained by adding, to an inverse element of the side randomized input data in a predetermined second finite field, a mask value that is an inverse element of the first exponential input mask value in the second finite field; and a randomized output data generation unit configured to generate the randomized output data from the randomized side output data, the randomized input data, the input mask value, and the first exponential input mask value.

Further, in the encryption device according to aspect B, the randomization output data generation unit may include: second exponential operation unit configured to perform, with a predetermined second exponent, an exponential operation on each of the randomized input data and the input mask value, and generate, through each of the exponential operations, second exponential randomized input data and a second exponential input mask value, respectively; an inverse element calculation unit configured to perform, on the first exponential input mask value, an inverse element calculation in the second finite field, and generate an inverse element exponential input mask value that is the inverse element of the first exponential input mask value in the second finite field; and a randomized output data generation unit configured to generate the randomized output data from the randomized side output data, the second exponential randomized input data, the second exponential input mask value, and the inverse element exponential input mask value.

Moreover, a decryption device according to aspect C (still another aspect of the present invention) is a decryption device which performs, on encrypted text, predetermined decryption processing based on a key, the decryption device including: a random number generation unit configured to generate a random number; a randomized input data generation unit configured to receive the encrypted text, and generate randomized input data that is obtained by adding, to input data that is obtained by performing predetermined processing on the encrypted text using the key, a predetermined input mask value determined depending on the random number; a first randomized inverse element data generation unit configured to receive the randomized input data generated by the randomized input data generation unit and the input mask value, and generate randomized output data that is obtained by adding, to an inverse element of the input data in a predetermined first finite field, an output mask value that is an inverse element of the received input mask value in the first finite field; and an output data processing unit configured to receive the randomized output data generated by to the first randomized inverse element data generation unit, and generate the decrypted text from the received randomized output data.

Embodiment

The following will describe an embodiment of the present invention with reference to the drawings.

It is to be noted that although operations in a composite field $GF(((2^2)^2)^2)$ and its subfields $GF((2^2)^2)$, and $GF(2)$ are used in the embodiment, the composite field and the subfields have the following relationships.

The $GF(2^2)$ is obtained by performing, with an irreducible polynomial $x^2+x+1$, secondary extension on the $GF(2)$.

The $GF((2^2)^2)$ is obtained by performing, with an irreducible polynomial $x^2+x+\phi$, the secondary extension on the $GF(2^2)$.

The $GF(((2^2)^2)^2)$ is obtained by performing, with an irreducible polynomial $x^2+x+\lambda$ (binary digit), the secondary extension on the $GF((2^2)^2)$.

Here, since $\phi=\alpha$ and $\lambda=\alpha^3+\alpha$, where a root of $x^2+x+1=0$ is $\alpha$, $\phi$ and $\lambda$ each are represented in bit notation as $\phi=10$ (binary digit) and $\lambda=1100$ (binary digit).

Summary of Embodiment

Before describing actual processing in detail, a summary of the embodiment will be initially described while comparing with the conventional approach disclosed in Non-patent Reference 1, that is, Conventional Technique 2.

In the conventional technique disclosed in Non-patent Reference 1, that is, Conventional Technique 2, the randomized 8-bit inverse element calculation unit 81 (FIG. 1 and the like) performs an inverse element calculation on input data X=M(+)R using random numbers R and r, and generates output data Y=M^(−1)(+)R. Here, X becomes a value that is obtained by masking original data M with the random number R, and the randomized 8-bit inverse element calculation unit 81 seeks an inverse element M^(−1) of M in $GF(((2^2)^2)^2)$, and outputs the value as (M^(−1)(+)R) that is the value masked with the random number R.

In the embodiment according to the present invention, the above randomized 8-bit inverse element calculation processing is performed on the input data X=M(+)R through the randomized inverse element calculation using the random number R, and output data Y=M^(−1)(+) R^(−1) is generated. Stated differently, whereas a random mask value of the output data is R in Conventional Technique 2, it is R^(−1) in the present invention. Since, as stated above, the structure of the present invention in which the output data is calculated has been made different from that of Conventional Technique 2, as will be described later, it becomes possible to reduce the maximum number of logical steps more than Conventional Technique 2.

FIGS. 8 to 38 each are a diagram showing an encryption device 1 according to the embodiment and each of components of the encryption device 1.

Figure 38:
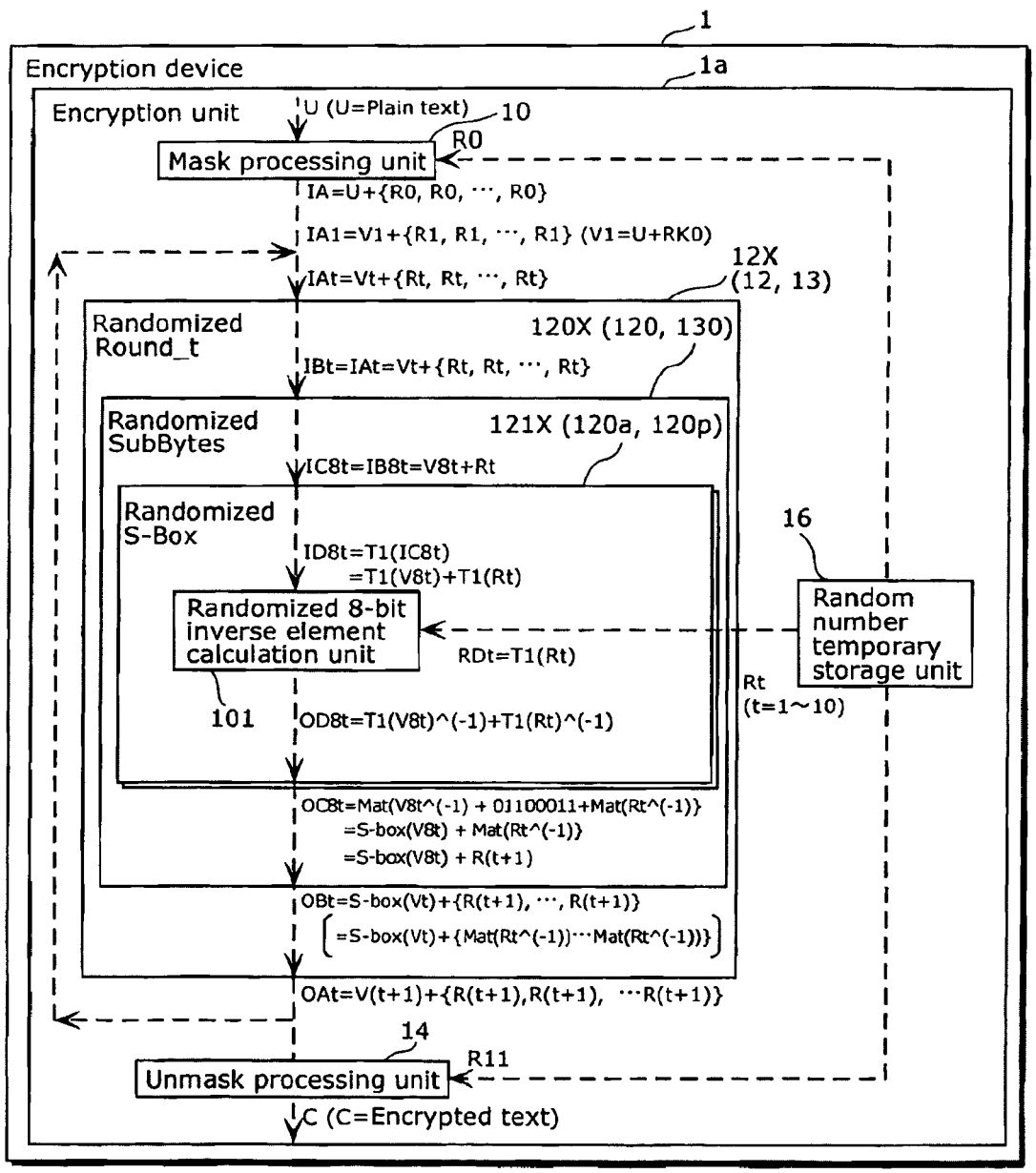
FIG. 38 is a diagram showing an inclusive relation between the encryption device 1 and components of the encryption device 1, and input and output data of the whole and between the components.

In addition, FIG. 38 is a diagram showing an inclusive relation between the whole encryption device 1 according to the embodiment and each component of the encryption device 1. The following will describe the encryption device 1 shown in FIGS. 1 to 23, with suitable reference to FIG. 38.

Figure 8:
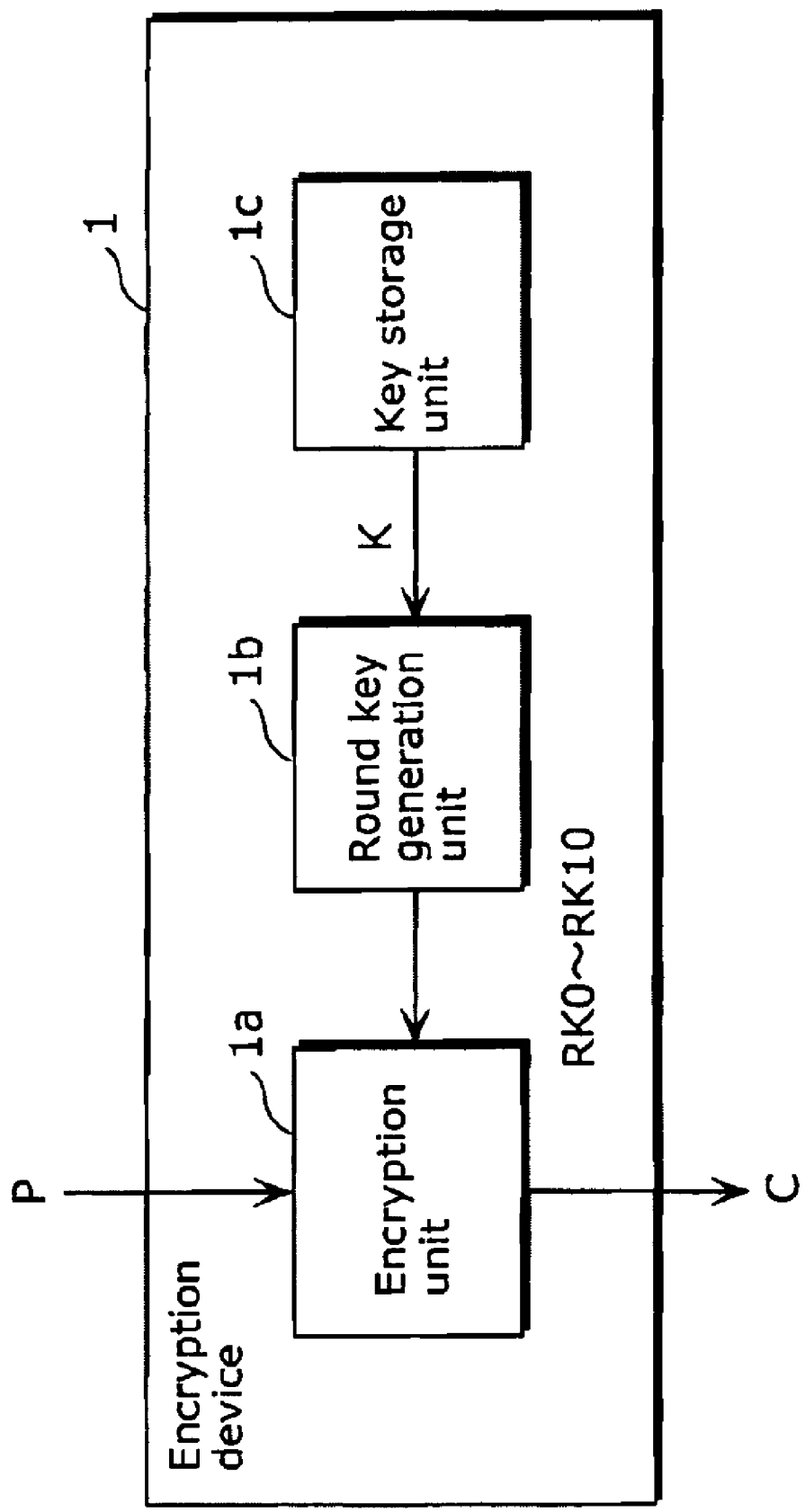
FIG. 8 is a block diagram showing a configuration of an encryption device 1 according to an embodiment of the present invention.
Figure 9:
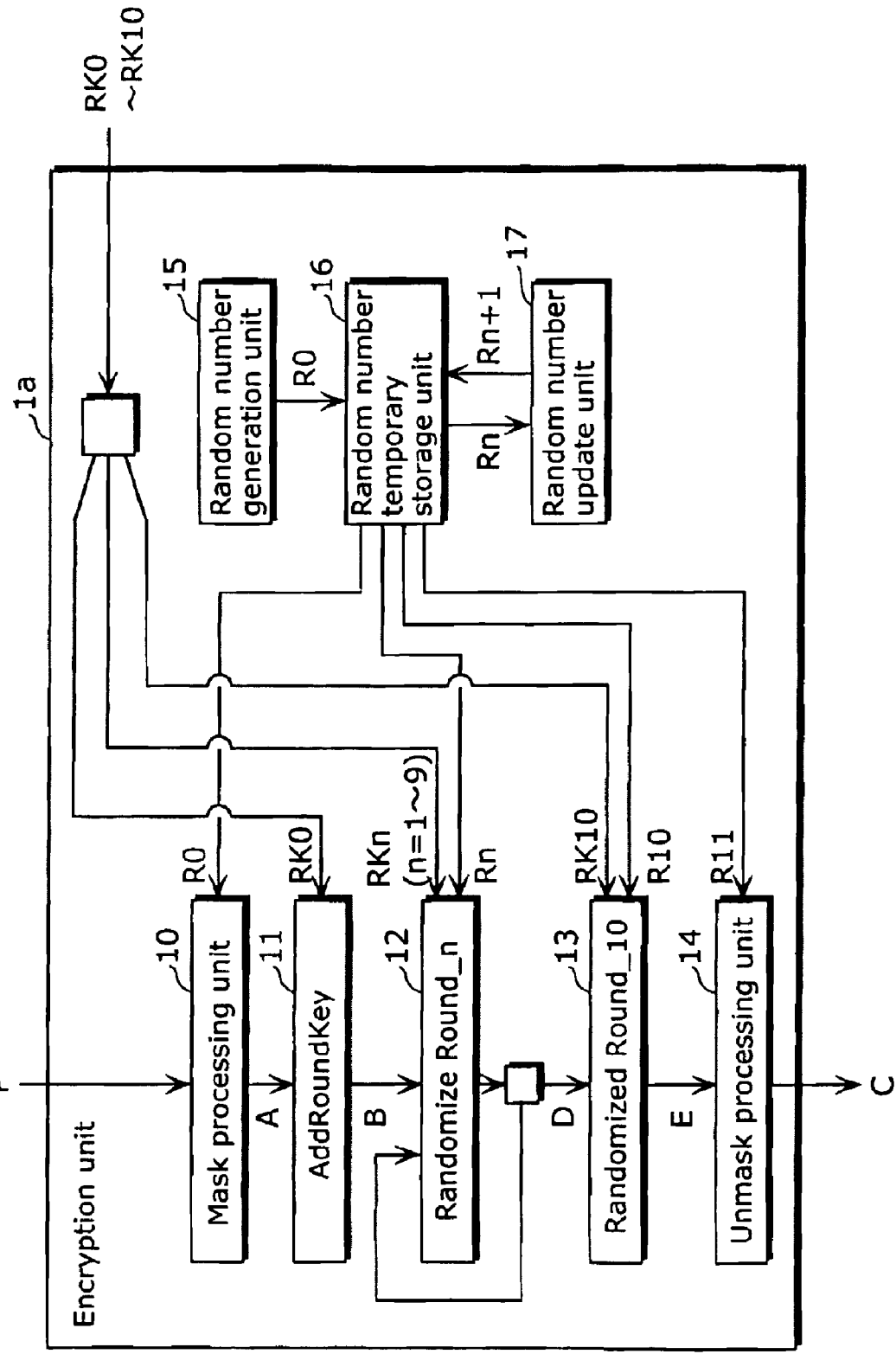
FIG. 9 is a block diagram showing a configuration of an encryption unit 1a according to the embodiment of the present invention.
Figure 12:
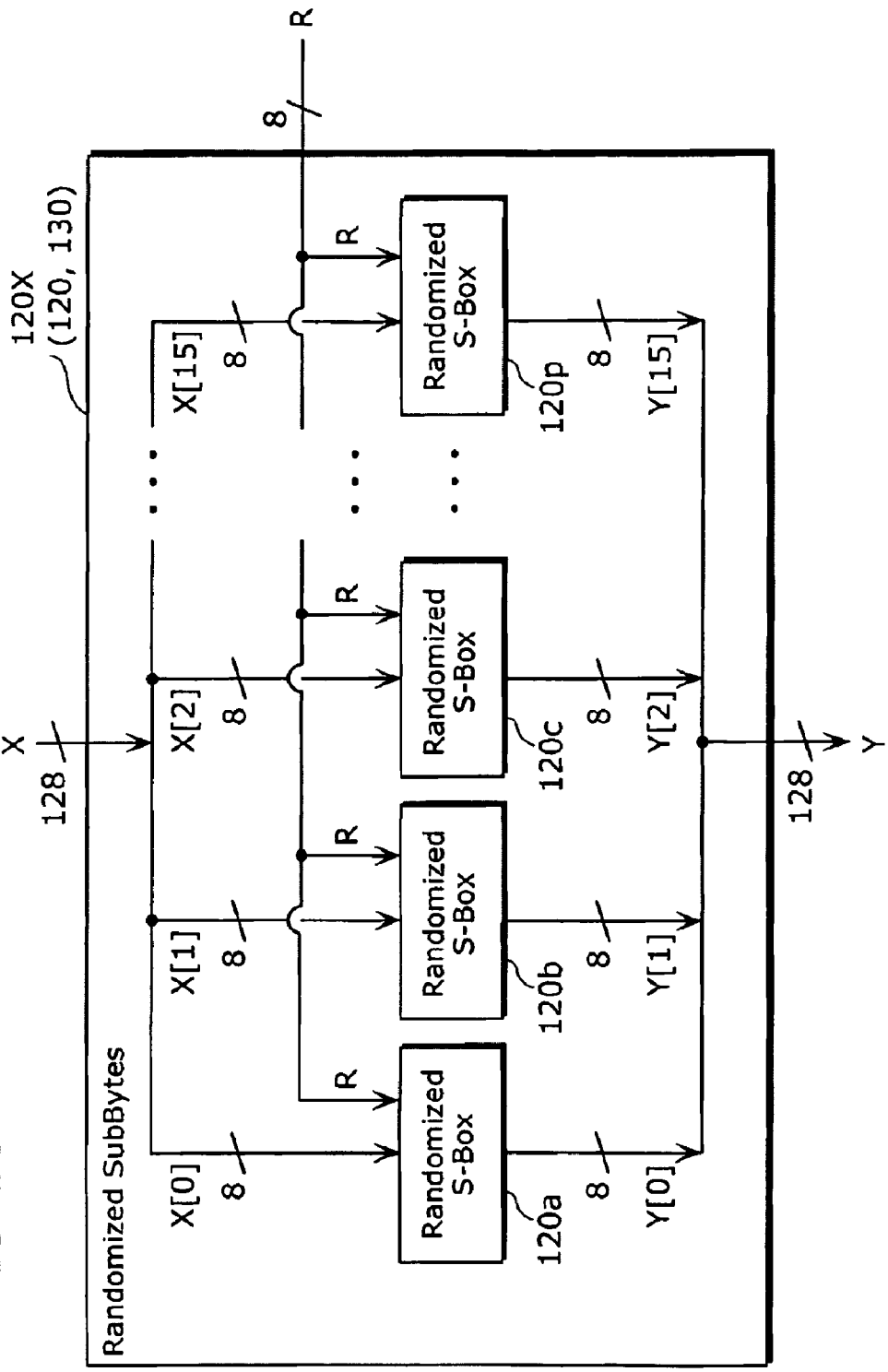
FIG. 12 is a block diagram showing a configuration of randomized SubBytes 120 and 130 according to the embodiment of the present invention.
Figure 13:
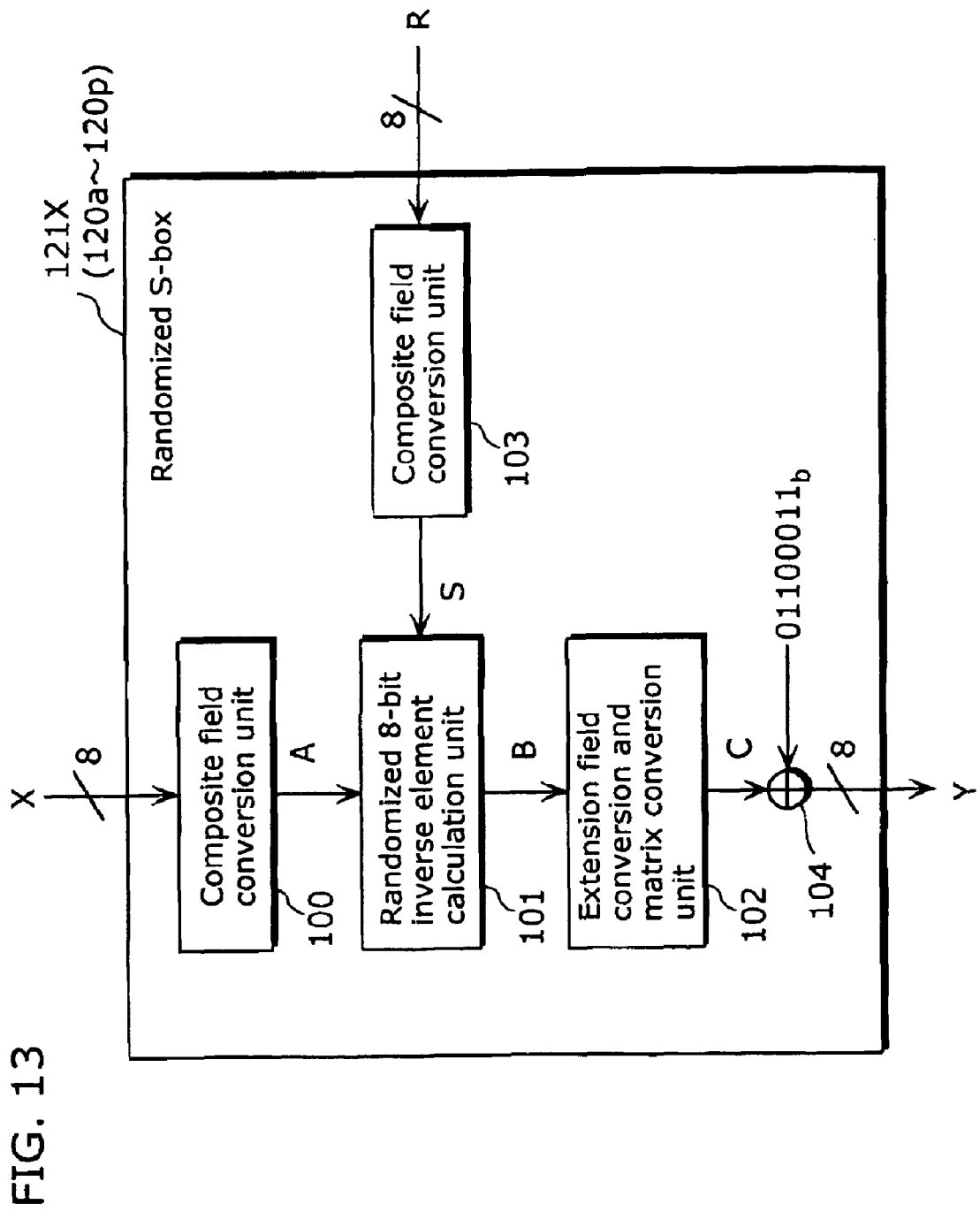
FIG. 13 is a block diagram showing a configuration of randomized S-boxes 120a to 120p according to the embodiment of the present invention.
Figure 14:
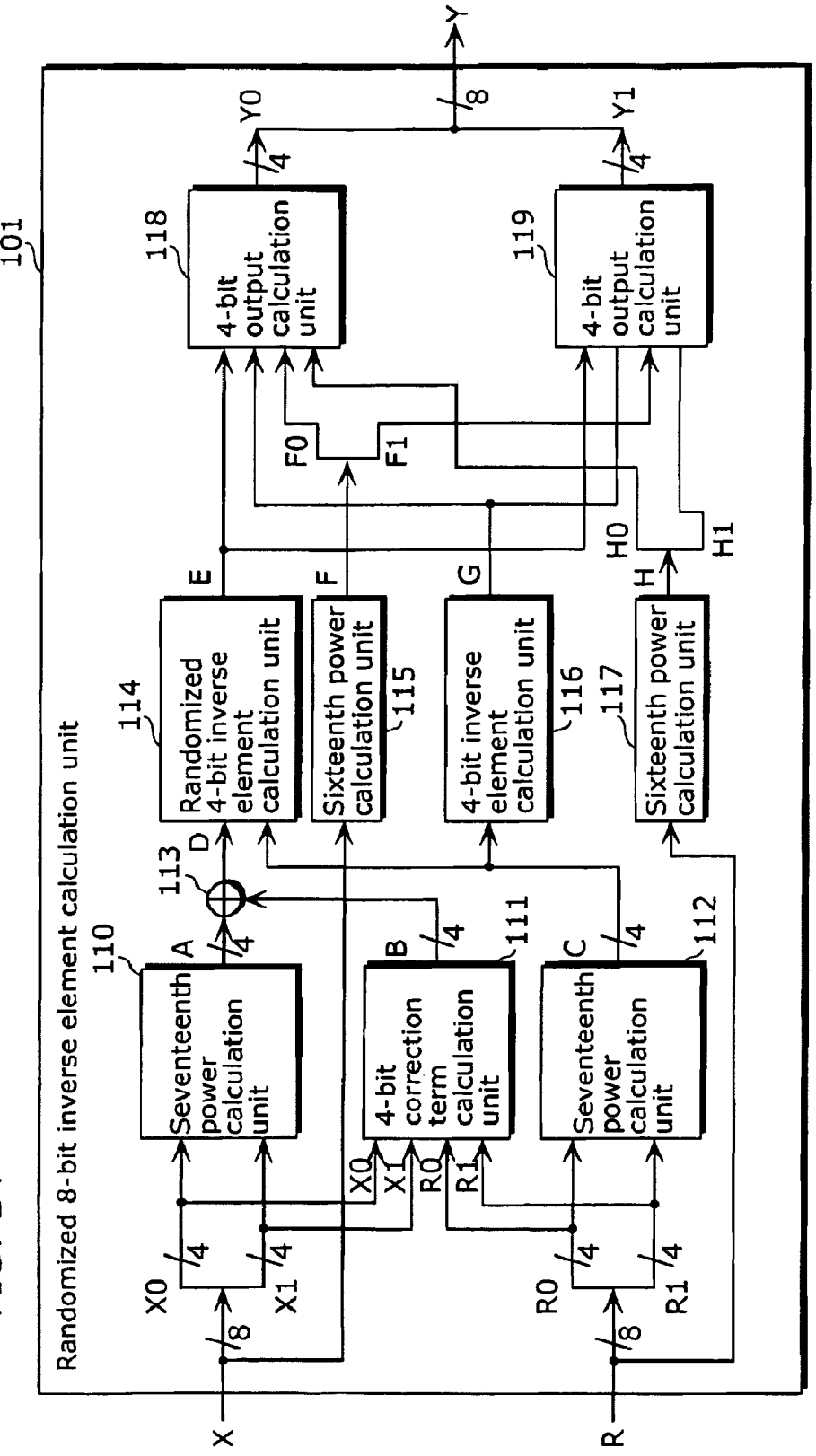
FIG. 14 is a block diagram showing a configuration of a randomized 8-bit inverse element calculation unit 101 according to the embodiment of the present invention.

As shown in FIG. 38, the encryption device 1 (FIG. 8) includes a randomized 8-bit inverse element calculation unit 101 (FIGS. 13 and 14). The encryption device 1 (FIG. 8) includes an encryption unit 1*a* (FIGS. 8 and 9). The encryption unit 1*a* includes a mask processing unit 10 (FIG. 9), randomized Round_t 12X (randomized Round_n 12 (FIGS. 9 and 10) and randomized Round_10 13 (FIGS. 9 and 11)), and a unmask processing unit 14 (FIG. 9). It is to be noted that some of the components of the encryption device 1 shown in FIGS. 8 to 37 are eliminated in FIG. 38.

Figure 10:
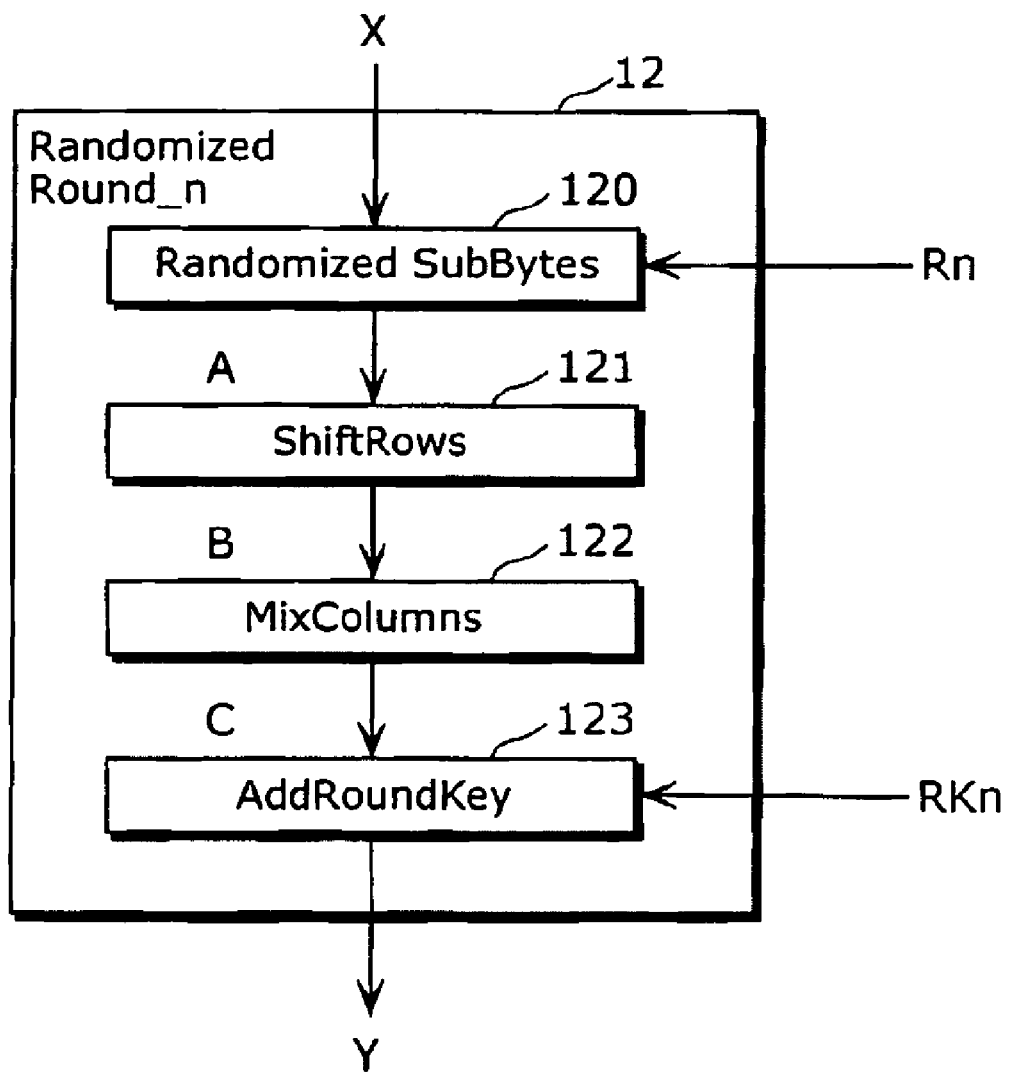
FIG. 10 is a block diagram showing a configuration of randomized Round_n 12 according to the embodiment of the present invention.
Figure 11:
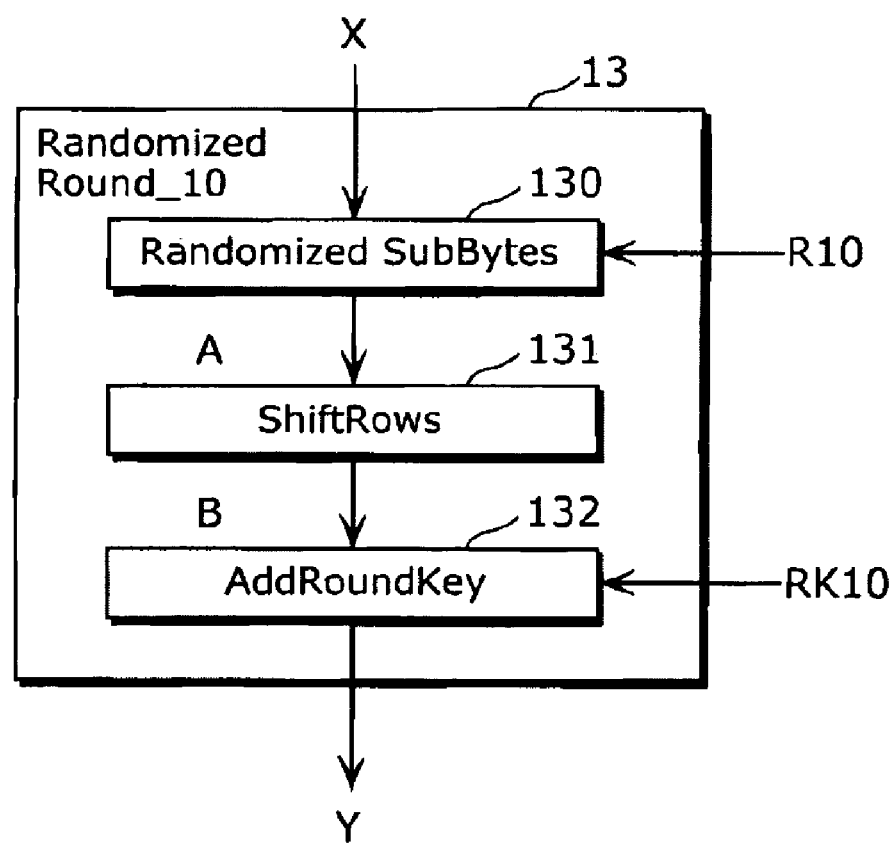
FIG. 11 is a block diagram showing a configuration of randomized Round_10 13 according to the embodiment of the present invention.

The randomized Round_t 12X (the randomized Round_n 12 shown in FIGS. 9 and 10, and the randomized Round_10 13 shown in FIGS. 9 and 11) shown in FIG. 38 includes randomized SubBytes 120X (FIGS. 10 to 12). The randomized SubBytes 120X includes a randomized S-Box 121X (randomized S-Boxes 120*a* to 120*p* shown in FIG. 12). Further, the randomized S-Box 121X includes the randomized 8-bit inverse element calculation unit 101 (FIGS. 13 and 14).

As shown in FIG. 38, randomized input data ID8*t*=T1(V8*t*)+T1(Rt) is inputted to the randomized 8-bit inverse element calculation unit 101 (FIG. 14, FIG. 38, and the like), the randomized 8-bit inverse element calculation unit 101 calculates randomized output data OD8*t*=T1(V8*t*)^(−1)+T1(Rt)^(−1) from the randomized input data ID8*t*=T1(V8*t*)+T1(Rt), and outputs the calculated OD8*t*, the randomized input data being obtained by masking T1(V8*t*) with a mask value including T1(Rt) that is based on Rt. In other words, the randomized 8-bit inverse element calculation unit 101 (FIGS. 13 and 14) performs, on the above input data X=M(+)R, a process for generating the output data Y=M^(−1)(+)R^(−1), with M=T1(V8*t*) and R=T1(Rt).

The encryption device 1 (FIGS. 8 and 38) according to the present embodiment includes such a randomized 8-bit inverse element calculation unit 101 that generates Y=M^(−1)(+)R^(−1) from X=M(+)R, and can reduce the maximum number of logical steps.

The following will describe the processing of the encryption device 1 in detail.

<Encryption Device 1>

FIG. 8 is a block diagram showing a configuration of the encryption device 1 according to the embodiment of the present invention.

The encryption device 1 (FIG. 8) includes the encryption unit 1*a* (FIG. 9), a round key generation unit 1*b*, and a key storage unit 1*c*.

The encryption device 1 (FIG. 8) performs, on plain text P (128 bits) to be inputted to the encryption device 1, randomized Advanced Encryption Standard (AES) encryption processing using a key K (128 bits) stored therein, and outputs encrypted text C (128 bits). The encrypted text C corresponds to the result of performing, on the plain text P, the AES encryption processing using the key K. Moreover, as an intermediate value for encryption processing in the encryption processing is randomized by a random number generated randomly each time the encryption processing is performed in the encryption device 1, it is difficult to analyze the key K with the power analysis attack. The following will describe a procedure of the encryption device 1.

It is to be noted that there are the Substitution Permutation Network (SPN) structure and the Feistel structure in which rounds of operations in encryption processing are repeated and that is a representative configuration method of so-called repeated encryption, and the AES encryption is more specifically encryption in which the former SPN structure is adopted.

Here, the encryption device 1 may be, for instance, included in an IC card.

The key storage unit 1*c* stores the key K that is pre-set in the encryption device 1. The key K may be set at the time of manufacturing of the encryption device 1 or may be generated in the encryption device 1 and set in the key storage unit 1c after the encryption device 1 is manufactured. When the plain text P is inputted, the encryption device 1 performs the following processing.

(1) The key storage unit 1c inputs the key K stored therein to the round key generation unit 1b.

(2) The round key generation unit 1b generates, from the key K, round keys RK0 to RK10 (each having 128 bits) according to round key generation processing of the AES encryption scheme, and inputs the round keys RK0 to RK10 to the encryption unit 1a. It is to be noted that, being described in Non-patent Reference 2 and publicly known, the round key generation processing will not be described here.

(3) The encryption unit 1a performs, on the plain text P, encryption processing to be described later using the round keys RK0 to RK10, generates encrypted text C, and outputs the encrypted text C.

Next, the processing performed by the encryption unit 1a will be described.

<Encryption Unit 1a>

FIG. 9 is a block diagram showing a configuration of the encryption unit 1a.

As shown in the figure, the encryption unit 1a (FIGS. 8 and 38) includes the mask processing unit 10, AddRoundKey 11, the randomized Round_n 12 (FIG. 10), the randomized Round_10 13 (FIG. 11), the unmask processing unit 14, a random number generation unit 15, a random number temporary storage unit 16, and a random number update unit 17.

The encryption unit 1a performs, on plain text P (128 bits), the encryption processing using the round keys RK0 to RK10 (128 bits×11), generates encrypted text C (128 bits), and outputs the encrypted text C. Among the round keys RK0 to RK10 to be inputted, the encryption unit 1a inputs the round key RK0 to the AddRoundKey 11, round keys RKn (n=1 to 9) to the randomized Round_n 12 (FIG. 10), and the round key RK10 to the randomized Round_10 13 (FIG. 11).

The encryption unit 1a performs the following processing.

(1) The random number generation unit 15 randomly generates a random number R0 (8 bis). Then, the random number generation unit 15 temporarily stores the generated random number R0 in the random number temporary storage unit 16. It is to be noted that, as an example, each time new plain text P is inputted to the encryption device 1 and the encryption device 1 starts new encryption processing, the random number generation unit 15 newly generates the random number R0 in time of the starting and causes the generated random number R0 to be stored.

(2) The mask processing unit 10 performs the following exclusive OR operation on the plain text P using the random number R0 stored in the random number temporary storage unit 16, and obtains data A (128 bits). The plain text P is masked with a random mask value R0 through the above processing.

$$A = P(+)(R0, R0, R0, \ldots, R0)$$

Here, (R0, R0, R0, . . . , R0) represents 128-bit data obtained by combining 16 pieces of R0 (8 bis). It is to be noted that hereinafter the 128-bit data obtained by combining 16 pieces of 8-bit data X will be shown as (X, X, X, . . . X), if not otherwise specified.

It is to be noted that P shown in FIG. 8 is indicated by a symbol U in FIG. 38. Furthermore, C shown in FIG. 8 is indicated by a symbol C in FIG. 38. Moreover, A shown in FIG. 9 is indicated by IA in FIG. 38. In addition, B and D shown in FIG. 9 are indicated by a symbol IAt (t=1 to 9 or t=10) in FIG. 38. Furthermore, E shown in FIG. 9 is indicated by a symbol OA10=OAt (t=10) in FIG. 38.

(3) The random number update unit 17 performs, on the random number R0 stored in the random number temporary storage unit 16, random number update processing, which will be described later, to generate R1, and updates the random number R0 to R1.

(4) The AddRoundKey 11 performs, on the above A obtained by the random number generation unit 15 in the above (2), key addition processing using the following RK0, and obtains B1. This is the AddRoundKey processing defined in the AES cipher algorithm specification.

$$B1 = A(+)RK0$$

(5) Next, the randomized Round_n 12 repeatedly performs the following processing in the case where n=1, 2, 3, . . . , 9.

(5-1) The randomized Round_n 12 performs, on Bn (nth B among B that are input data to the randomized Round_n 12), randomized Round_n processing, which will be described later, using a round key RKn and a random number Rn stored in the random number temporary storage unit, and generates Bn+1. Then, the randomized Round_n 12 inputs, to the randomized Round_10 13, D as D=B10, in the case where n=9, that is, B(n+1) to be generated is B(n+1)=B10, and inputs again, to the randomized Round_n 12, B(n+1) to be generated, in the case where n≠9, that is, n=1, 2, . . . , 9 and the B(n+1) to be generated is any one of B2, B3, . . . , B9.

(5-2) The random number update unit 17 performs, on the random number Rn stored in the random number temporary storage unit 16, the random number update processing to generate Rn+1, and updates the random number Rn to Rn+1. The random number update unit 17 generates, from the random number R0 generated by the random number generation unit 15, a random number R1, a random number R2, . . . , a random number 11 and updates each of the random numbers stored in the random number temporary storage unit 16 to a corresponding one of the random numbers generated, thereby providing each of the updated random numbers to a corresponding one of the mask processing unit 10, the randomized Round_n 12, the randomized Round_10 13, and the unmask processing unit 14. The random number update unit 17 provides, via the random number temporary storage unit 16, the random number R0 to the mask processing unit 10, the random numbers R1 to R9 to the randomized Round_n 12, the random number R10 to the randomized Round_10 13, and the random number R11 to the unmask processing unit 14.

(5-3) The encryption unit 1a completes a loop of repetition processing and moves to the next processing of the randomized Round_10 13 in the case where n=9, and adds 1 to a value n and performs again the above processes (5-1) to (5-3) in the case where n≠9.

(6) The randomized Round_10 13 performs, on the input data D (128 bits) to the randomized Round_10 13, randomized Round_10 processing, which will be described later, using the round key RK10 and the random number R10 stored in the random number temporary storage unit 16, the input data D being obtained through the above process (5). The randomized Round_10 13 inputs data E to the unmask processing unit 14.

Moreover, the random number update unit 17 performs, on the random number R10 stored in the random number temporary storage unit 16, the random number update processing, and updates the random number R10 to the random number R11. With the updating to the random number R11, the random number update unit 17 provides the random number R11 to the unmask processing unit 14.

(7) The unmask processing unit 14 performs, on the data E obtained from the randomized Round_10 13 in the above (6), the following exclusive OR operation, using the random number R11 stored in the random number temporary storage unit 16, and generates encrypted text C (128 bits). The data E that has been masked is unmasked (the effect of masking is removed) through the above process, and the encrypted text C that is not masked is obtained.

$$C=E(+)R11$$

(8) The encryption unit 1a outputs, as output data of the encryption unit 1a, the encrypted text C obtained in (7).

Next, the configurations of the randomized Round_n 12 and the randomized Round_10 13 that are used in the encryption unit 1a (FIG. 9) will be described.

<Randomized Round_n 12>

FIG. 10 is a block diagram showing the configuration of the randomized Round_n 12 (FIG. 9).

As shown in FIG. 10, the randomized Round_n 12 (FIGS. 9, 10, and 38) includes randomized SubBytes 120 (FIGS. 12 and 38), ShiftRows 121, MixColumns 122, and AddRoundKey 123.

The randomized Round_n 12 performs, on input data X to the randomized Round_n 12 (corresponding to the data Bn in the description (FIG. 9) of the processing of the encryption unit 1a), the randomized Round_n processing, using the random number Rn and the round key RKn (n=1, 2, . . . 9), and generates output data Y (corresponding to the data Bn+1 (FIG. 9) in the description of the processing of the encryption unit 1a).

It is to be noted that the randomized Round_n processing performed by the randomized Round_n 12 is nothing but processing for generating a round processing result Y=P(+)(Rn+1, Rn+1, . . . , Rn+1) by performing, on input data X=M(+)(Rn, Rn, . . . , Rn), one-round processing defined in the AES cipher algorithm specification, the processing result being obtained by masking P with a mask value (Rn+1, Rn+1, . . . , Rn+1), the input data being obtained by masking M with a mask value (Rn, Rn, . . . , Rn). P corresponds to a result of performing, on M, the one-round processing defined in the AES cipher algorithm specification. Here, X is the input data Bn (n=1, 2, . . . , 9) in the randomized Round_n processing in the description of FIG. 9, Y is the output data B(n+1) in the description of FIG. 9, and M and P are original values (Vt and V(t+1) in FIG. 38) that are Bn and Bn+1 from which effects of the mask values are removed, respectively.

It is to be noted that X in FIG. 10 is indicated by the symbol IAt (t=1, 2, . . . , 9), Y by a symbol OBt (t=1, 2, . . . , 9), and Rn by a symbol Rt (t=1, 2, . . . , 9) in FIG. 38.

Specifically, the randomized Round_n 12 (FIGS. 9 and 10) performs the following processing.

(1) The randomized SubBytes 120 (FIGS. 10 and 12) included in the randomized Round_n 12 performs, on the input data X (128 bits) to the randomized Round_n 12, randomized SubBytes processing, which will be described later, using the random number Rn (8 bis) to be obtained from the random number temporary storage unit 16, and generates data A (FIG. 10).

(2) The ShiftRows 121 (FIG. 10) performs, on the data A generated in the above (1), ShiftRows processing defined in the AES cipher algorithm specification, and generates data B (128 bits). It is to be noted that, being publicly known through Non-patent Reference 2, the ShiftRows 121 will not be described in detail.

(3) Next, the MixColumns 122 (FIG. 10) performs, on the data B generated in the above (2), MixColumns processing defined in the AES cipher algorithm specification, and generates data C (128 bits). It is to be noted that, being publicly known through Non-patent Reference 2, the MixColumns 122 will not be described in detail.

(4) Then, the AddRoundKey 123 performs, on the data C generated in the above (3), the AddRoundKey processing defined in the AES cipher algorithm specification, using the round key RKn, and generates data Y (128 bits). The AddRoundKey 123 outputs, as output data of the randomized Round_n 12, the generated data Y. It is to be noted that, being publicly known through Non-patent Reference 2, the AddRoundKey 123 will not be described in detail.

It is to be noted that the data A in FIG. 10 is indicated by the symbol OBt (t=1, 2, . . . , 9) in FIG. 38.

<Randomized Round_10 13>

FIG. 11 is a block diagram showing the configuration of the randomized Round_10 13.

The randomized Round_10 13 (FIGS. 9 and 11) includes randomized SubBytes 130 (FIGS. 11 and 12), ShiftRows 131, and AddRoundKey 132.

As shown in FIG. 11, the randomized Round_10 13 has the same configuration as the randomized Round_n 12 except that the MixColumns 122 has been removed. This is because the MixColumns processing is not performed for the final round according to the AES cipher algorithm specification. As the configuration is the same as the randomized Round_n 12 other than the above point, the randomized Round_10 13 will not be described in detail.

It is to be noted that the randomized Round_10 processing is nothing but processing for generating a final round processing result Y=P(+)(R11, R11, . . . , R11) by performing, on input data X=M(+)(R10, R10, . . . , R10), the final-round processing defined in the AES cipher algorithm specification, the final round processing result being obtained by masking P with a mask value (R11, R11, . . . , R11), the input data being obtained by masking M with a mask value (R10, R10, . . . , R10). P corresponds to a result of performing, on M, the final-round processing defined in the AES cipher algorithm specification.

It is to be noted that, here, X is the data D in the description of FIG. 9, Y is the output data E in the description of FIG. 9, and M and P are original values (V10 and V11 in FIG. 38) that are D and E from which effects of the mask values are removed, respectively.

On the other hand, the data A in FIG. 10 is indicated by a symbol OB10=OBt (t=10) in FIG. 38.

Next, the randomized SubBytes 120 and 130 (FIG. 12) that are used in the randomized Round_n 12 (FIGS. 9 and 10) and the randomized Round_10 13 (FIGS. 9 and 11) will be described in detail.

<Randomized SubBytes 120 and 130>

FIG. 12 is a block diagram showing a configuration of randomized SubBytes 120X (the randomized SubBytes 120 (FIGS. 9 and 10) and the randomized SubBytes 130 (FIGS. 9 and 11)). For instance, the randomized SubBytes 120X is the randomized SubBytes 120, and other randomized SubBytes 120 has the same configuration as the randomized SubBytes 120.

The randomized SubBytes 120X performs, on input data X (128 bits), randomized S-Box processing using a random number R (8 bis), and generates output data Y (128 bits). The input data X here corresponds to the data X in the description (FIG. 10) of the processing of the randomized Round_n 12, and to the data X in the description (FIG. 11) of the processing of the randomized Round_10 13. On the other hand, the random number R corresponds to the random number Rn in the description (FIG. 10) of the processing of the randomized Round_n 12, and to the random number R10 in the description (FIG. 11) of the processing of the randomized Round_10 13. In addition, the output data Y corresponds to the data A in the description (FIG. 10) of the processing of the randomized Round_n 12, and to the data A in the description (FIG. 11) of the processing of the randomized Round_10 13.

It is to be noted that X in FIG. 12 is indicated by a symbol IBt, Y by the symbol OBt, and R by the symbol Rt in FIG. 38.

The randomized SubBytes 120X includes randomized S-Boxes 120a to 120p.

The randomized SubBytes 120X (the randomized S-Boxes 120a to 120p) performs the following processing.

(1) The randomized SubBytes 120X divides, for every 8 bis from the high order, input data into X[0], X[1], ... X[15] (FIG. 12).

(2) The randomized S-Boxes 120a to 120p perform, on each of X[0], X[1], ..., X[15] that are obtained by the division, the randomized S-Box processing using the random number R, and each generate Y[0], Y[1], ..., Y[15]. The randomized S-Box processing will be described in detail later.

(3) Then, the randomized SubBytes 120X generates 128-bit data Y by concatenating the generated Y[0], Y[1], ..., Y[15] in descending order. The randomized SubBytes 120X then outputs, as output data thereof, the data Y.

It is to be noted that the processing performed by the randomized SubBytes 120 and 130 is nothing but processing for generating a processing result Y=P(+)(S, S, ..., S) by performing, on input data X=M(+)(R, R, ..., R), the SubBytes processing defined in the AES cipher algorithm specification, the processing result being obtained by masking P with a mask value (S, S, ..., S), the input data being obtained by masking M with a mask value (R, R, ..., R). P corresponds to a result of performing the SubBytes processing defined in the AES cipher algorithm specification, and the mask value S corresponds to a result of performing, on the mask value R, the random number update processing that is performed by the random number update unit 17.

It is to be noted that, in FIG. 38, M is indicated by Vt, and P by S-box (Vt).

Next, the randomized S-Boxes 120a to 120p that are used in the randomized SubBytes 120X (the randomized SubBytes 120 and 130) will be described in detail.

<Randomized S-Boxes 120a to 120p>

FIG. 13 is a block diagram showing a configuration of the randomized S-Box 121X (the randomized S-Boxes 120a to 120p in FIG. 12).

The randomized S-Box 121X (FIGS. 13 and 12) includes composite field conversion units 100 and 103 (Equation 1), the randomized 8-bit inverse element calculation unit 101 (FIGS. 11 and 38), an extension field conversion and matrix conversion unit 102 (Equation 2), and the exclusive OR unit 104.

The randomized S-Box 121X performs, on input data X (8 bis), the randomized S-Box processing using a random number R (8 bis), and obtains output data Y (8 bis). The input data X here corresponds to one of the data X[0], X[1], ... X[15] in the description of the processing of the randomized SubBytes 120X (FIG. 12), and the random number R corresponds to the random number R in the description (FIG. 12) of the processing of the randomized SubBytes 120X. In addition, the output data Y corresponds to one of the data Y[0], Y[1], ... Y[15] in the description (FIG. 12) of the processing of the randomized SubBytes 120X.

It is to be noted that, in FIG. 38, X is indicated by a symbol IC8t, Y by a symbol OC8t, and R by the symbol Rt.

The randomized S-Box 121X performs the following processing.

(1) The composite field conversion unit 100 divides, for every 1 bit from the high order, X (8 bis) into X7, X6, ..., X0. Then, the composite field conversion unit 100 performs a matrix calculation shown by the following Equation 1, and generates input data A (8 bis) of the composite field conversion unit 100 by concatenating, in descending order, A7, A6, ..., A0 obtained through the matrix operation. It is to be noted that the following matrix calculation is performed in mod 2. Stated differently, in the following matrix calculation, 0+0=1+1=0, and 0+1=1+0=1.

$$\begin{pmatrix} A7 \\ A6 \\ A5 \\ A4 \\ A3 \\ A2 \\ A1 \\ A0 \end{pmatrix} = \begin{pmatrix} 1 & 0 & 1 & 0 & 0 & 0 & 0 & 0 \\ 0 & 1 & 1 & 1 & 1 & 1 & 1 & 0 \\ 0 & 1 & 1 & 1 & 0 & 0 & 1 & 0 \\ 1 & 0 & 1 & 0 & 0 & 0 & 1 & 0 \\ 0 & 0 & 0 & 1 & 1 & 0 & 1 & 0 \\ 0 & 1 & 0 & 1 & 0 & 1 & 1 & 0 \\ 0 & 1 & 1 & 0 & 1 & 1 & 0 & 0 \\ 1 & 0 & 1 & 0 & 1 & 0 & 0 & 1 \end{pmatrix} \begin{pmatrix} X7 \\ X6 \\ X5 \\ X4 \\ X3 \\ X2 \\ X1 \\ X0 \end{pmatrix} \quad \text{[Equation 1]}$$

(2) Then, the other composite field conversion unit 103 divides, for every 1 bit from the high order, R (8 bis) in the same manner as the above (1), performs the matrix calculation shown by Equation 1, and generates S (8 bis) from R (8 bis).

(3) Next, the randomized 8-bit inverse element calculation unit 101 performs, on the input data A (8 bits) generated in the above (1), the randomized 8-bit inverse element calculation, which will be described later, using the random number S (8 bits) generated in the above (2), and generates output data B (8 bits).

(4) The extension field conversion and matrix conversion unit 102 divides, based on the matrix calculation shown by Equation 2, the data B (8 bits) generated in the above (3), in the same manner as the above (1), that is, for every 1 bit from the high order, performs the matrix calculation, and generates data C (8 bits).

$$\begin{pmatrix} C7 \\ C6 \\ C5 \\ C4 \\ C3 \\ C2 \\ C1 \\ C0 \end{pmatrix} = \begin{pmatrix} 0 & 1 & 1 & 1 & 0 & 1 & 0 & 0 \\ 1 & 1 & 0 & 1 & 0 & 0 & 0 & 0 \\ 0 & 0 & 1 & 0 & 1 & 1 & 0 & 0 \\ 1 & 1 & 1 & 0 & 1 & 0 & 0 & 1 \\ 1 & 0 & 1 & 1 & 0 & 1 & 0 & 1 \\ 1 & 0 & 0 & 1 & 0 & 0 & 1 & 1 \\ 1 & 0 & 1 & 1 & 0 & 1 & 1 & 1 \\ 1 & 1 & 1 & 1 & 0 & 1 & 0 & 1 \end{pmatrix} \begin{pmatrix} B7 \\ B6 \\ B5 \\ B4 \\ B3 \\ B2 \\ B1 \\ B0 \end{pmatrix} \quad \text{[Equation 2]}$$

(5) The exclusive OR unit 104 performs the bit-basis exclusive OR operation on the data C (8 bits) generated in the above (4) and constant 0110011 (binary digit), and generates data Y (8 bits).

The randomized S-box 121X outputs, as output data of the randomized S-Box 121X, Y generated in the above (5).

It is to be noted that the processing performed by the randomized S-Boxes 120a to 120p is nothing but processing for generating a processing result Y=P(+)(S, S, ..., S) by performing, on input data X=M(+)(R, R, ..., R), S-Box table conversion included in the SubBytes processing defined in the AES cipher algorithm specification, the processing result being obtained by masking P with the mask value (S, S, ..., S), the input data being obtained by masking M with the mask value (R, R, . . . , R). P corresponds to a result of performing the S-Box table conversion included in the SubBytes processing defined in the AES cipher algorithm specification, and the mask value S corresponds to a result of performing, on the mask value R, the random number update processing that is performed by the random number update unit 17.

It is to be noted that, in FIG. 38, M is indicated by a symbol V8*t*, and P by S-box (V8*t*). In FIG. 38, A is indicated by a symbol ID8*t*, and B is indicated by a symbol OD8*t*.

Next, the randomized 8-bit inverse element calculation unit 101 that is used in the respective randomized S-Boxes 120*a* to 120*p* will be described in detail.

<Randomized 8-Bit Inverse Element Calculation Unit 101>

FIG. 14 is a block diagram showing a configuration of the randomized 8-bit inverse element calculation unit 101.

The randomized 8-bit inverse element calculation unit 101 (FIGS. 13, 14, and 38) includes seventeenth power calculation units 110 and 112 (FIG. 15), a 4-bit correction term calculation unit 111 (FIG. 16), sixteenth power calculation units 115 and 117 (FIG. 17), 4-bit output calculation units 118 and 119 (FIG. 18), a 4-bit inverse element calculation unit 116 (FIG. 21), a randomized 4-bit inverse element calculation unit 114 (FIG. 23), and an exclusive OR unit 113.

The randomized 8-bit inverse element calculation unit 101 (FIGS. 13 and 14) performs, on input data X (8 bits), the randomized 8-bit inverse element calculation processing using a random number R (8 bits), and outputs output data Y (8 bits). The input data X here corresponds to the aforementioned data A in the description (FIG. 13) of the processing of the randomized S-Boxes 120*a* to 120*p*, and the random number R to the random number S in the description (FIG. 13) of the processing of the randomized S-Boxes 120*a* to 120*p*. In addition, the output data Y corresponds to the data B in the description (FIG. 13) of the processing of the randomized S-Boxes 120*a* to 120*p*.

It is to be noted that, in FIG. 38, X is indicated by the symbol ID8*t*, R by a symbol RDt, and Y by the symbol OD8*t*.

The randomized 8-bit inverse element calculation unit 101 performs the following processing.

(1) The randomized 8-bit inverse element calculation unit 101 first divides, for every 4 bits from the high order, the data X (8 bits) into X0 (4 bits) and X1 (4 bits). Then, the randomized 8-bit inverse element calculation unit 101 divides, for every 4 bits from the high order, the random number R (8 bits) into R0 (4 bits) and R1 (4 bits) likewise. Finally, the randomized 8-bit inverse element calculation unit 101 inputs X0 and X1 to the seventeenth power calculation unit 110, X0, X1, R0, and R1 to the 4-bit correction term calculation unit 111, and R0 and R1 to the seventeenth power calculation unit 112, respectively.

(2) Next, the seventeenth power calculation unit 110 performs, on X0 and X1 that are inputted, seventeenth power calculation processing, which will be described later, and generates output data A (4 bits). In the same manner, the other seventeenth power calculation unit 112 performs, on R0 and R1 that are inputted, the seventeenth power processing, and generates output data C (4 bits).

(3) On the other hand, the 4-bit correction term calculation unit 111 performs, on X0, X1, R0, and R1 that are inputted, 4-bit correction term calculation processing, which will be described later, and generates output data B (4 bits).

(4) Then, the exclusive OR unit 113 performs an exclusive OR operation on the data A generated in (2) and the data B generated in (3), and generates data D (8 bits).

(5) Next, the randomized 4-bit inverse element calculation unit 114 performs, on the data D generated in the above (4), randomized 4-bit inverse element calculation processing, which will be described later, using the data C (4 bits) generated in the above (2), and generates data E (4 bits).

(6) In addition, the sixteenth power calculation unit 115 performs, on the data X (8 bits) inputted to the randomized 8-bit inverse element calculation unit 101, sixteenth power calculation processing, which will be described later, and generates data F (8 bits). The randomized 8-bit inverse element calculation unit 101 then divides, for every 4 bits from the high order, the generated data F into F0 (4 bits) and F1 (4 bits). Likewise, the other sixteenth power calculation unit 117 performs the sixteenth power calculation processing on the data R (8 bits) inputted to the randomized 8-bit inverse element calculation unit 101, and generates data H. As with the above data F, the randomized 8-bit inverse element calculation unit 101 divides, for every 4 bits from the high order, the generated data H into H0 (4 bits) and H1 (4 bits).

(7) On the other hand, the 4-bit inverse element calculation unit 116 performs, on the data C (4 bits) generated in the above (2) by the seventeenth power calculation unit 112 shown at the bottom edge of FIG. 14, the 4-bit inverse element calculation processing, and generates data G (4 bits).

(8) Then, the 4-bit output calculation unit 118 performs, on the data E (4 bits) generated in the above (5), the data G generated in the above (7), the data F0 (4 bits) that is divided from the data F in the above (6), and the data H0 (4 bits) that is also divided from the data H in the above (6), 4-bit output calculation processing, which will be described later, and generates data Y0 (4 bits). Likewise, the other 4-bit output calculation unit 119 performs, on the data E (4 bits), the data G (4 bits), the data F1 (4 bits), and the data H1 (4 bits), the 4-bit output calculation processing, and generates data Y1 (4 bits). Then, the randomized 8-bit inverse element calculation unit 101 generates 8-bit data Y by concatenating, in descending order, the generated data Y0 and the generated data Y1. Lastly, the randomized 8-bit inverse element calculation unit 101 outputs, as output data thereof, the concatenated data Y.

It is to be noted that the processing performed by the randomized 8-bit inverse element calculation unit 101 is nothing but processing for generating a processing result $Y = X^{\wedge}(-1)(+)R^{\wedge}(-1)$ by performing, on input data $X = M(+)R$, an inverse element calculation in a composite field $GF(((2^2)^2)^2)$, the processing result being obtained by masking $X^{\wedge}(-1)$ with a mask value $R^{\wedge}(-1)$, the input data being obtained by masking M with a mask value R. $X^{\wedge}(-1)$ is an inverse element of X in the composite field $GF(((2^2)^2)^2)$, and the mask value $R^{\wedge}(-1)$ is an inverse element of R in the composite field $GF(((2^2)^2)^2)$.

Next, the seventeenth power calculation units 110 and 112 (a seventeenth power calculation unit 110X shown in FIG. 15), the 4-bit correction term calculation unit 111 (FIG. 16), the sixteenth power calculation units 115 and 117 (a sixteenth power calculation unit 115X shown in FIG. 17), and the 4-bit output calculation units 118 and 119 (a 4-bit output calculation unit 118X shown in FIG. 18) that are used in the randomized 8-bit inverse element calculation unit 101 will be described one after another in detail.

<Seventeenth Power Calculation Units 110 and 112>

Figure 15:
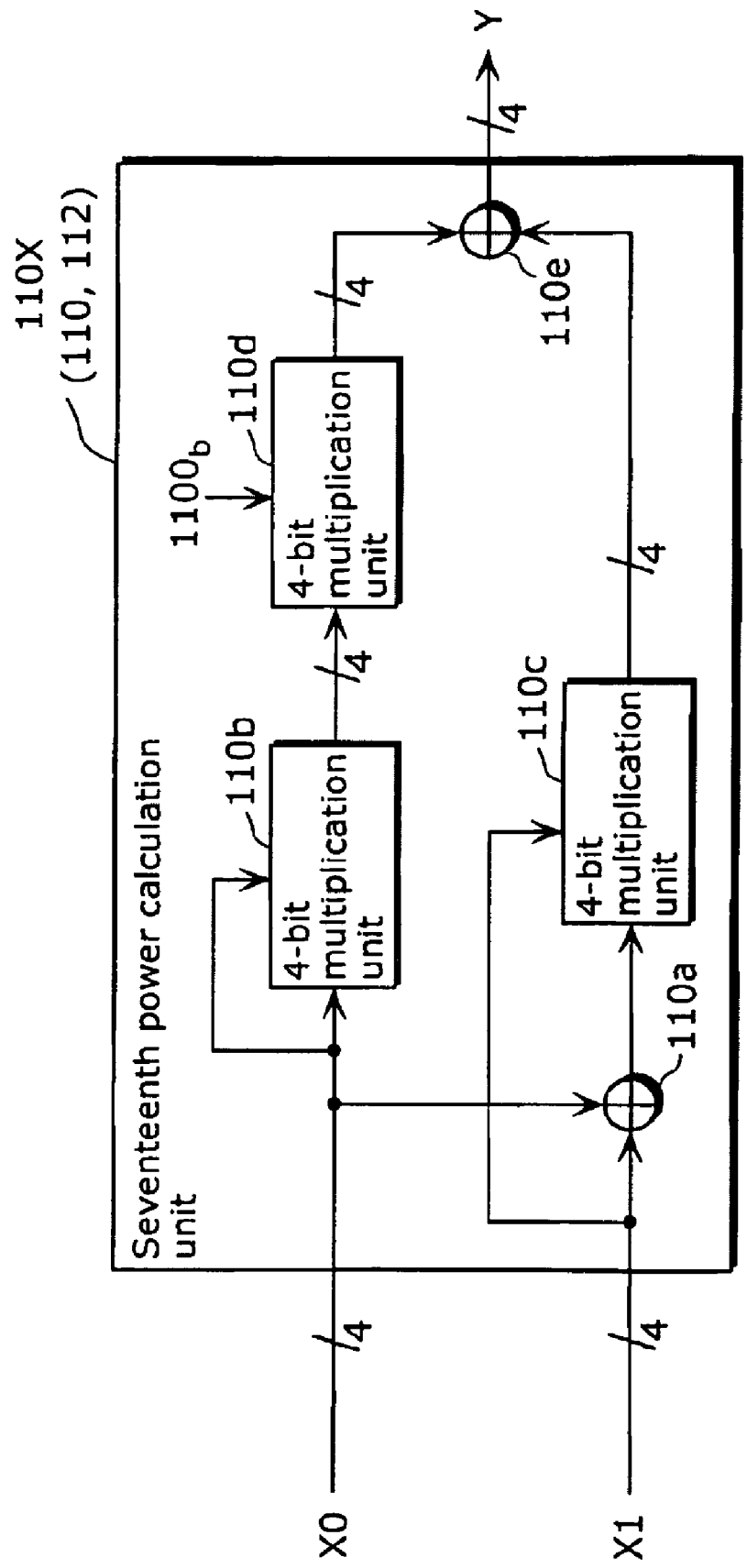
FIG. 15 is a block diagram showing a configuration of seventeenth power calculation units 110 and 112 according to the embodiment of the present invention.

FIG. 15 is a diagram showing the seventeenth power calculation unit 110X.

The seventeenth power calculation unit 110X (FIGS. 14 and 15) includes 4-bit multiplication units 110*b* to 110*d* (FIG. 19) and exclusive OR units 110*a* and 110*e*.

The seventeenth power calculation unit 110X performs, on input data X0 (4 bits) and X1 (4 bits), the seventeenth power calculation processing in the composite field $GF(((2^2)^2)^2)$, and generates a data processing result Y (4 bits). A result of performing, on 8-bit data X that is obtained by concatenating, in descending order, the input data X0 and X1, the seventeenth power calculation processing in the composite field $GF(((2^2)^2)^2)$ is Y, which is expressed as below.

$$Y = X^{\wedge}(17) \text{ in } GF(((2^2)^2)^2)$$

At this time, $Y^{\wedge}15=(X^{\wedge}17)^{\wedge}15=X^{\wedge}255$, and since X is an element in $GF(((2^2)^2)^2)$, $Y^{\wedge}15=X^{\wedge}255=1$. That is to say, and order of Y becomes 15, and Y becomes an element in the subfield $GF((2^2)^2)$. In short, Y becomes 4-bit data.

Moreover, the input data X0 and X1 here correspond to either the data X0 and X1 or R0 and R1 in the description (FIG. 14) of the processing of the randomized 8-bit inverse element calculation unit 101, respectively, and the output data Y corresponds to either the data A or C in the description (FIG. 14) of the processing of the randomized 8-bit inverse element calculation unit 101.

Here, the seventeenth power calculation unit 110X performs the following calculation in the subfield $GF((2^2)^2)$, and generates the output data Y.

$$Y = 1100(\text{binary digit}) \times (X0^2) + X1 \times (X0 + X1) \text{ in } GF((2^2)^2)$$

Figure 19:
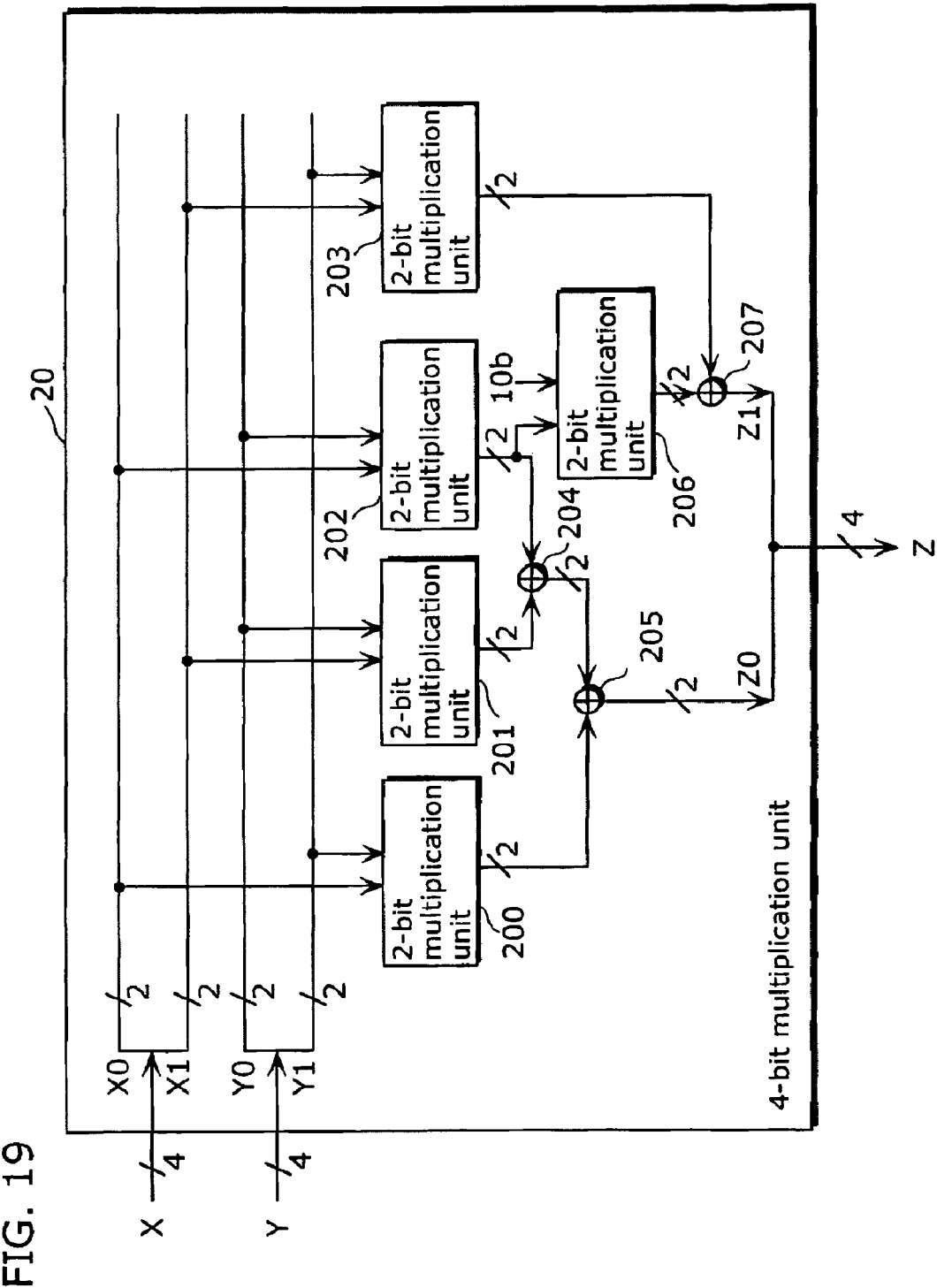
FIG. 19 is a block diagram showing a configuration of a 4-bit multiplication unit 20 according to the embodiment of the present invention.

Addition in $GF((2^2)^2)$ is a bit-basis exclusive OR operation (the exclusive OR units 110a and 110e). Multiplication (the 4-bit multiplication units 110b to 110d) in $GF((2^2)^2)$ will be described in detail later (FIG. 19).

<4-Bit Correction Term Calculation Unit 111>

Figure 16:
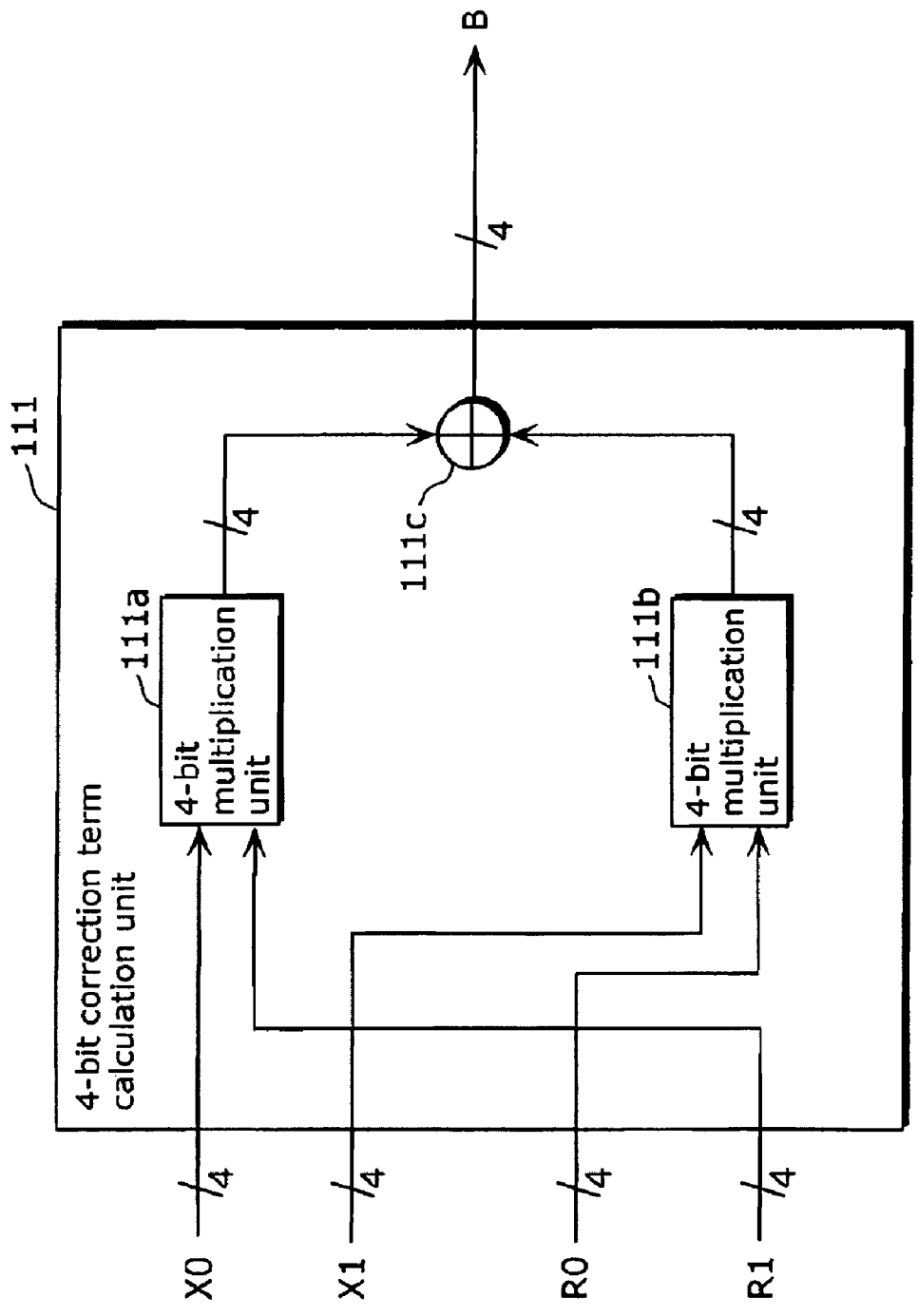
FIG. 16 is a block diagram showing a configuration of a 4-bit correction term calculation unit 111 according to the embodiment of the present invention.

FIG. 16 is a block diagram showing a configuration of the randomized 4-bit inverse element calculation unit 111.

The 4-bit correction term calculation unit 111 (FIGS. 14 and 16) includes 4-bit multiplication units 111a and 111b (FIG. 19) and an exclusive OR unit 111c.

The 4-bit correction term calculation unit 111 performs, on input data X0 (4 bits), X1 (4 bits), R0 (4 bits), and R1 (4 bits), the 4-bit correction term calculation processing, and generates output data B (4 bits). The input data X0, X1, R0, and R1 here correspond to the data X0, X1, R0, and R1 in the description (FIG. 14) of the processing of the randomized 8-bit inverse element calculation unit 101, respectively, and the output data B correspond to the data B in the description (FIG. 14) of the processing of the randomized 8-bit inverse element calculation unit 101.

Here, the 4-bit correction term calculation unit 111 performs the following calculation in the subfield $GF((2^2)^2)$, and generates the output data B.

$$B = X0 \times R1 + X1 \times R0 \text{ in } GF((2^2)^2)$$

Here, addition in $GF((2^2)^2)$ is a bit-basis exclusive OR operation (the exclusive OR units 111c). Multiplication (the 4-bit multiplication units 111a and 111b) in $GF((2^2)^2)$ will be described in detail later (FIG. 19).

<Sixteenth Power Calculation Units 115 and 117>

Figure 17:
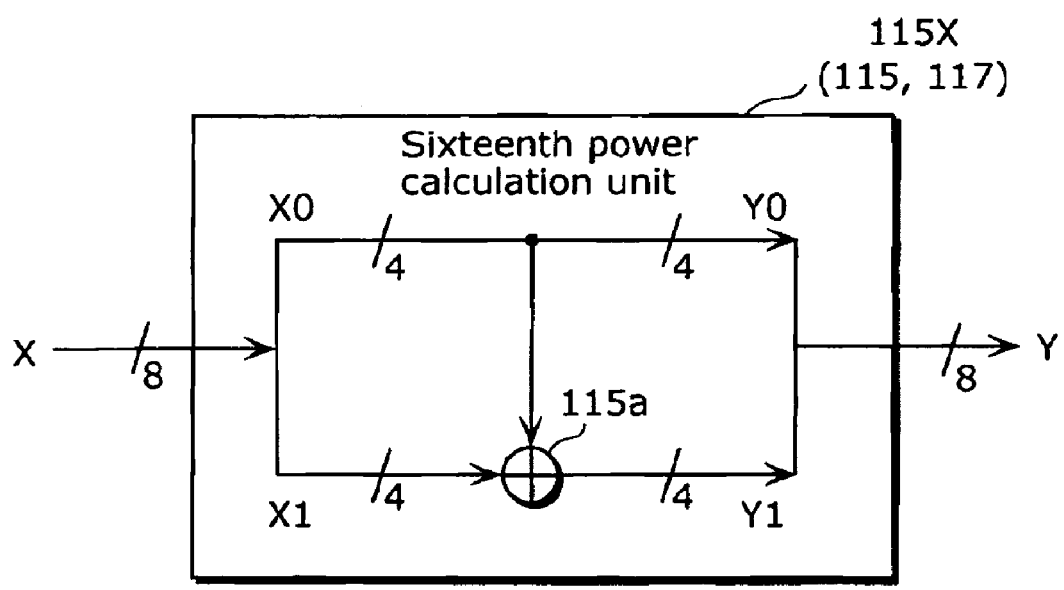
FIG. 17 is a block diagram showing a configuration of sixteenth power calculation units 115 and 117 according to the embodiment of the present invention.

FIG. 17 is a block diagram showing a configuration of a sixteenth power calculation unit 115X (the sixteenth power calculation units 115 and 117 (FIG. 14)).

The sixteenth power calculation unit 115X performs, on input data X (8 bits), the sixteenth power calculation in the composite field $GF(((2^2)^2)^2)$, and outputs a result of the calculation as Y (8 bits). The result of performing, on the input data X, the sixteenth power calculation in the composite field $GF(((2^2)^2)^2)$ is Y, which is expressed as below.

$$Y = X^{\wedge}(16) \text{ in } GF(((2^2)^2)^2)$$

Furthermore, the input data X here corresponds to either the data X or R in the description (FIG. 14) of the processing of the randomized 8-bit inverse element calculation unit 101, and the output data Y corresponds to either the data F or H in the description (FIG. 14) of the processing of the randomized 8-bit inverse element calculation unit 101.

Here, the sixteenth power calculation units 115 and 117 first divide, for every 4 bits from the high order, the input data X into X0 and X1, and then obtains Y0 and Y1 by performing the following calculation in $GF((2^2)^2)$.

$$Y0 = X0$$

$$Y1 = X0 + X1 \text{ in } GF((2^2)^2)$$

Here, addition in $GF((2^2)^2)$ is the bit-basis exclusive OR operation (the exclusive OR unit 115a). The sixteenth power calculation unit 115X generates 8-bit data Y by concatenating, in this order, Y0 and Y1 that are obtained in the above manner. Y becomes the output data of the sixteenth power calculation units 115 and 117.

<4-Bit Output Calculation Units 118 and 119>

Figure 18:
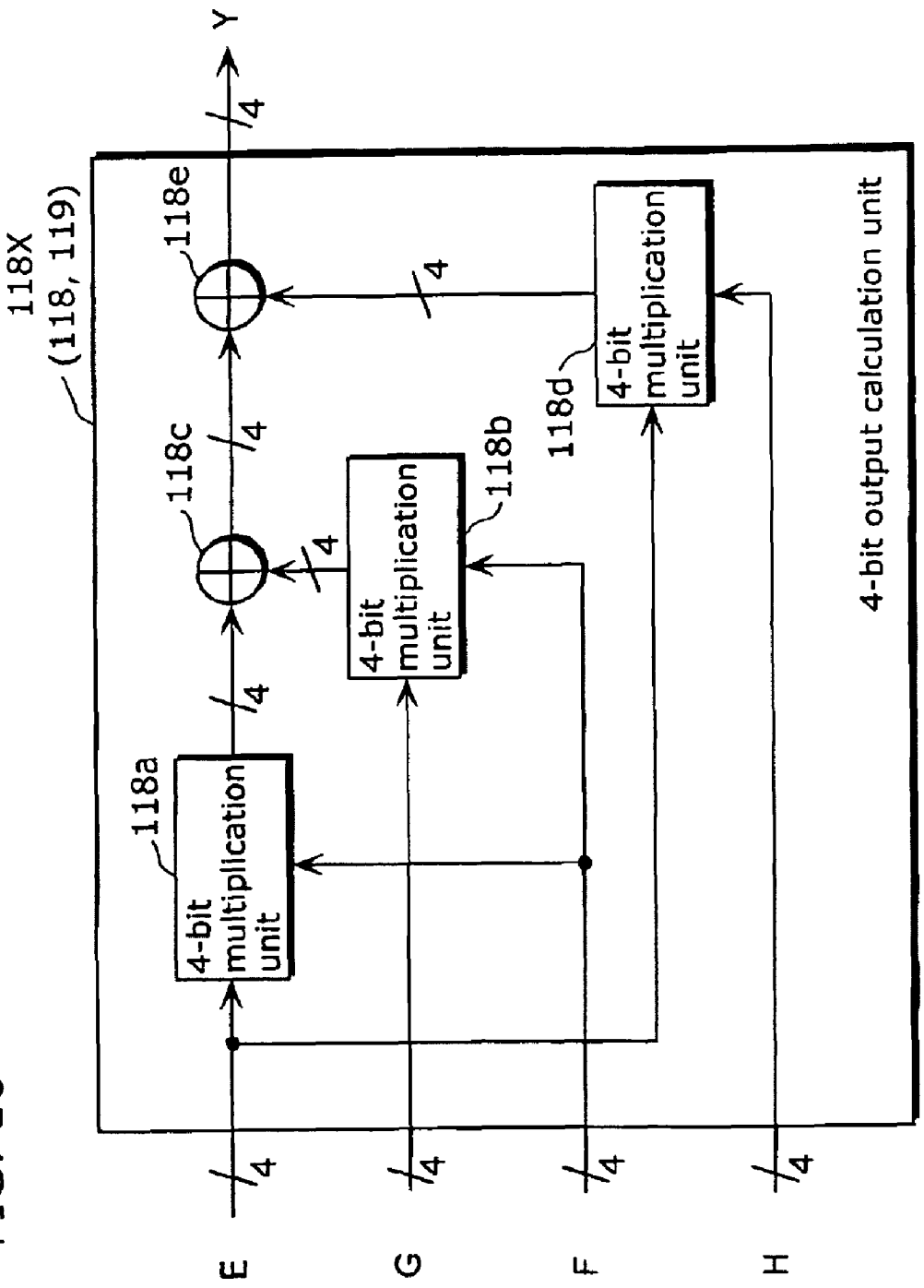
FIG. 18 is a block diagram showing a configuration of 4-bit output calculation units 118 and 119 according to the embodiment of the present invention.

FIG. 18 is a block diagram showing a configuration of a 4-bit output calculation unit 118X (the 4-bit output calculation units 118 and 119 (FIG. 14)).

The 4-bit output calculation unit 118X includes 4-bit multiplication units 118a, 118b, and 118d (FIG. 19) and exclusive OR units 118c and 118e.

The 4-bit output calculation unit 118X performs, on input data E (4 bits), G (4 bits), F (4 bits), and H (4 bits), the 4-bit output calculation processing, and generates output data Y. The input data E, G, F, and H here correspond to the input data E, G, F0, and H0 to the 4-bit output calculation unit 118 and to the input data E, G, F1, and H1 to the 4-bit output calculation unit 119, respectively, the input data E, G. F0, F1, H0, and H1 being in the description (FIG. 14) of the processing of the randomized 8-bit inverse element calculation unit 101. In addition, the output data Y corresponds to the output data Y0 of the 4-bit output calculation unit 118 and the output data Y1 of the 4-bit output calculation unit 119 in the description (FIG. 14) of the processing of the randomized 8-bit inverse element calculation unit 101. The 4-bit output calculation units 118 and 119 obtain Y by performing the following calculation in $GF((2^2)^2)$, and output the obtained Y.

$$Y = E \times F + G \times F + E \times H \text{ in } GF((2^2)^2)$$

Here, the addition in $GF((2^2)^2)$ is the bit-basis exclusive OR operation (the exclusive OR units 118c and 118e). The multiplication (the 4-bit multiplication units 118a, 118b, and 118d) in $GF((2^2)^2)$ will be described in detail later (FIG. 19).

Next, each 4-bit multiplication unit used in each kind of processing described above, that is, the 4-bit multiplication units 110b and 110c shown in FIG. 15, the 4-bit multiplication units 111a and 111b shown in FIG. 16, and the 4-bit multiplication units 118a, 118b, and 118d shown in FIG. 18 will be described in detail. It is to be noted that the 4-bit multiplication units 171d and 171e included in the 8-bit inverse element calculation unit 171 shown in FIG. 30 are the same as the above units. It is also to be noted that the 8-bit inverse element calculation unit 171 including the 4-bit multiplication unit 171d and the like and shown in FIG. 30 is a part of the random number update unit 17 shown in FIG. 29 (FIG. 14).

<4-Bit Multiplication Unit 20>

FIG. 19 is a block diagram showing a configuration of a 4-bit multiplication unit 20.

Although the 4-bit multiplication unit 20 is described here, the 4-bit multiplication units that are used in each kind of the processing described above have the same configuration as the 4-bit multiplication unit 20. It is to be noted that the above point is the same as a point that the above 4-bit output calculation units 118 and 119 have the same configuration as the 4-bit output calculation unit 118X shown in FIG. 18.

The 4-bit multiplication unit 20 includes 2-bit multiplication units 200 to 203 and 206 (FIG. 19), and exclusive OR units 204, 205, and 207.

The 4-bit multiplication unit 20 performs, on input data X (4 bits) and Y (4 bits), multiplication in $GF((2^2)^2)$, and outputs a result of the multiplication Z (4 bits). At this time, $Z=X\times Y$ in $GF((2^2)^2)$.

The 4-bit multiplication unit 20 divides, for every 2 bits from the high order, the input data X into X0 (2 bits) and X1 (2 bits) and the input data Y into Y0 (2 bits) and Y1 (2 bits). Then, Z0 and Z1 are obtained by performing the following calculation in $GF(2^2)$.

$$Z0=X0\times Y1+X1\times Y0+X0\times Y0 \text{ in } GF(2^2)$$

$$Z1=10 \text{ (binary digit)} \times X0\times Y0+X1\times Y1 \text{ in } GF(2^2)$$

The 4-bit multiplication unit 20 outputs, as an output thereof, 4-bit data Z that is generated by concatenating Z0 and Z1 in descending order.

Here, addition in $GF(2^2)$ is a bit-basis exclusive OR operation (the exclusive OR units 204, 205, and 207). Multiplication (the 2-bit multiplication unit s 200 to 203 and 206 in FIG. 19) in $GF(2^2)$ will be described in detail below.

<2-Bit Multiplication Unit 21>

Figure 20:
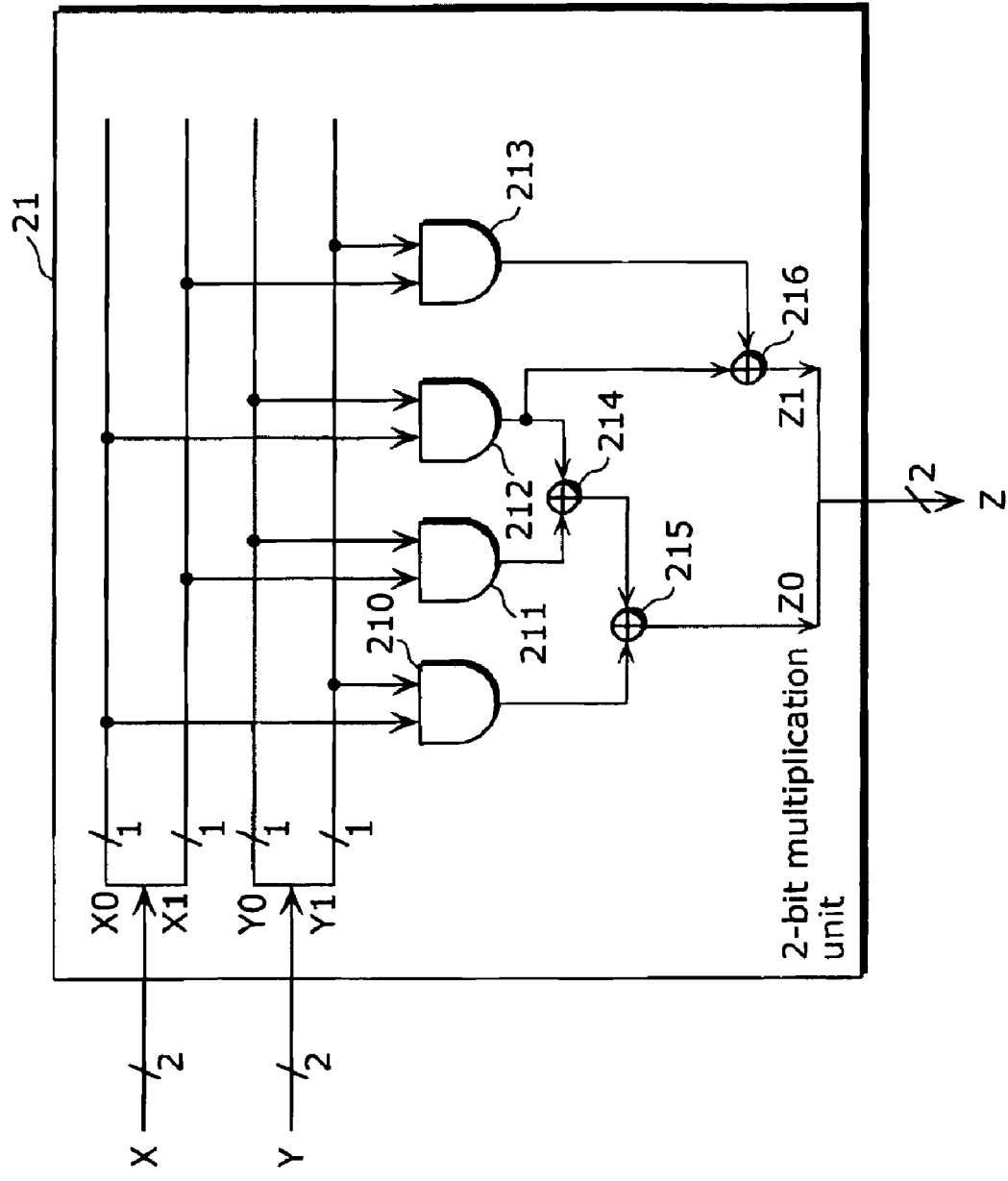
FIG. 20 is a block diagram showing a configuration of a 2-bit multiplication unit 21 according to the embodiment of the present invention.

FIG. 20 is a block diagram showing a configuration of a 2-bit multiplication unit 21.

Although the 2-bit multiplication unit 21 is described here, the 2-bit multiplication units that are used in each kind of the processing described above have the same configuration as the 4-bit multiplication unit 21. It is to be noted that the 2-bit multiplication units 143 and 144 shown in FIG. 21, the 2-bit multiplication units 150b to 150d shown in FIG. 24, the 2-bit multiplication units 151a and 151b shown in FIG. 25, the 2-bit multiplication units 158a, 158b, and 158d shown in FIG. 27 have the same configuration as the 2-bit multiplication unit 21 shown in FIG. 20.

The 2-bit multiplication unit 21 includes AND units 210 to 213 and exclusive OR units 214 to 216.

The 2-bit multiplication unit 21 performs, on input data X (2 bits) and Y (2 bits), multiplication in $GF(2^2)$, and outputs a result of the multiplication Z (2 bits). At this time, $Z=X\times Y$ in $GF(2^2)$.

The 2-bit multiplication unit 21 then divides, for every 1 bit from the high order, the input data X into X0 (1 bit) and X1 (1 bit) and the input data Y into Y0 (1 bit) and Y1 (1 bit). The 2-bit multiplication unit 21 then obtains Z0 and Z1 by performing the following calculation in GF(2).

$$Z0=X0\times Y1+X1\times Y0+X0\times Y0 \text{ in } GF(2)$$

$$Z1=X0\times Y0+X1\times Y1 \text{ in } GF(2)$$

The 2-bit multiplication unit 21 then concatenates Z0 and Z1 in descending order to generate 2-bit data Z, and outputs, as an output thereof, the concatenated 2-bit data Z.

Here, addition in GF(2) is the bit-basis exclusive OR operation (the exclusive OR units 214 to 216). Multiplication in GF(2) is AND (the AND units 210 to 213).

Next, the 4-bit inverse element calculation unit 116 that is used in the randomized 8-bit inverse element calculation unit 101 (FIG. 14) will be described in detail.

<4-Bit Inverse Element Calculation Unit 116>

Figure 21:
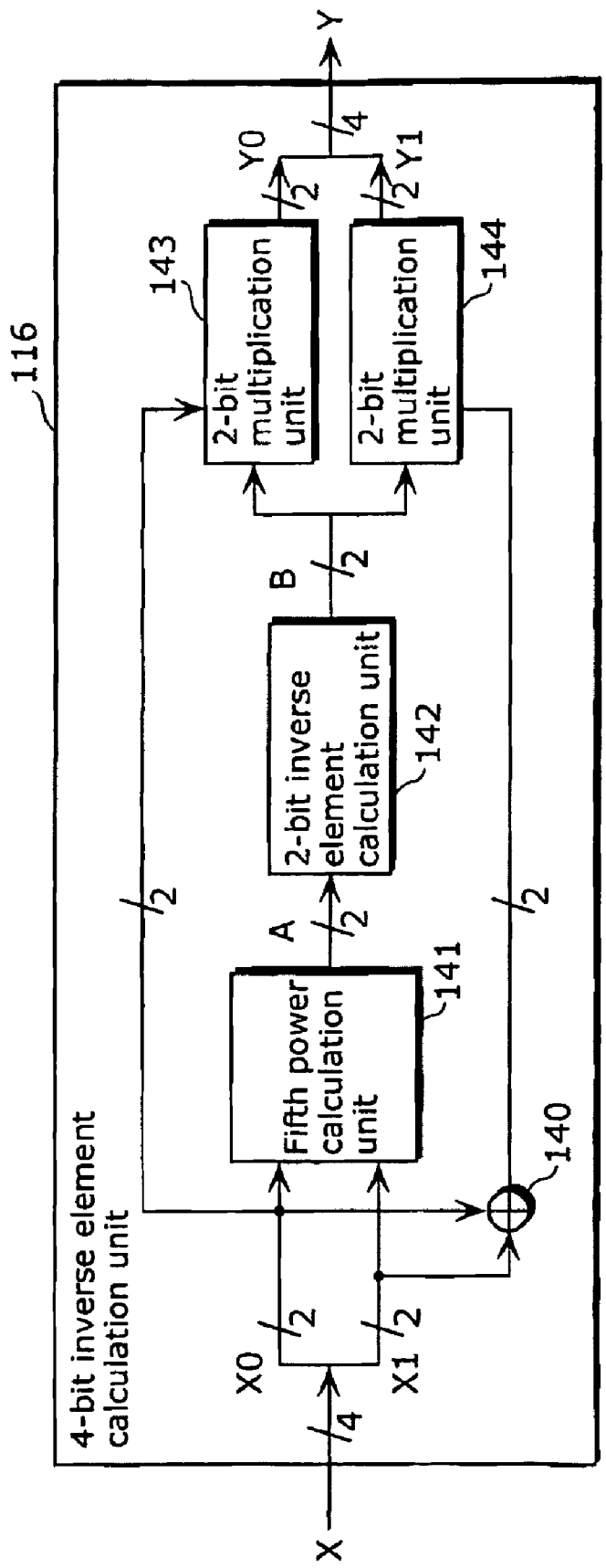
FIG. 21 is a block diagram showing a configuration of a 4-bit inverse element calculation unit 116 according to the embodiment of the present invention.

FIG. 21 is a block diagram showing a configuration of the 4-bit inverse element calculation unit 116 (FIG. 14). It is to be noted that a 4-bit inverse element calculation unit 171c shown in FIG. 30 is the same as the 4-bit inverse element calculation unit 116.

The 4-bit inverse element calculation unit 116 includes a fifth power calculation unit 141 (FIG. 24), a 2-bit inverse element calculation unit 142 (FIG. 22), and 2-bit multiplication units 143 and 144 (FIG. 20), and an exclusive OR unit 140.

The 4-bit inverse element calculation unit 116 then performs, on input data X (4 bits), an inverse element calculation in $GF((2^2)^2)$, and generates output data Y (4 bits) that is a result of the calculation. Here, the calculation is expressed as below:

$$Y=X^{(-1)} \text{ in } GF((2^2)^2)$$

The input data X here corresponds to the input data C to the 4-bit inverse element calculation unit 116 in the description (FIG. 14) of the processing of the randomized 8-bit inverse element calculation unit 101, and the output data Y corresponds to the output data G of the 4-bit inverse element calculation unit 116 in the description (FIG. 14) of the processing of the randomized 8-bit inverse element calculation unit 101. The 4-bit inverse element calculation unit 116 performs the following processing.

(1) The 4-bit inverse element calculation unit 116 first divides, for every 2 bits from the high order, the input data X into X0 and X1. The 4-bit inverse element calculation unit 116 then inputs X0 that is obtained by the division to the exclusive OR unit 140, the fifth power calculation unit 141, and the 2-bit multiplication unit 143. In addition, the 4-bit inverse element calculation unit 116 inputs X1 that is also obtained by the division to the exclusive OR unit 140 and the fifth power calculation unit 141.

(2) The fifth power calculation unit 141 performs, on X0 and X1 that are inputted, the fifth power calculation in $GF((2^2)^2)$, and obtains a result of the calculation A (2 bits). Here, a result of raising data X that is obtained by combining X0 and X1 in this order to the fifth power in $GF((2^2)^2)$ is A, which is expressed as below.

$$A=X^5 \text{ in } GF((2^2)^2)$$

Figure 24:
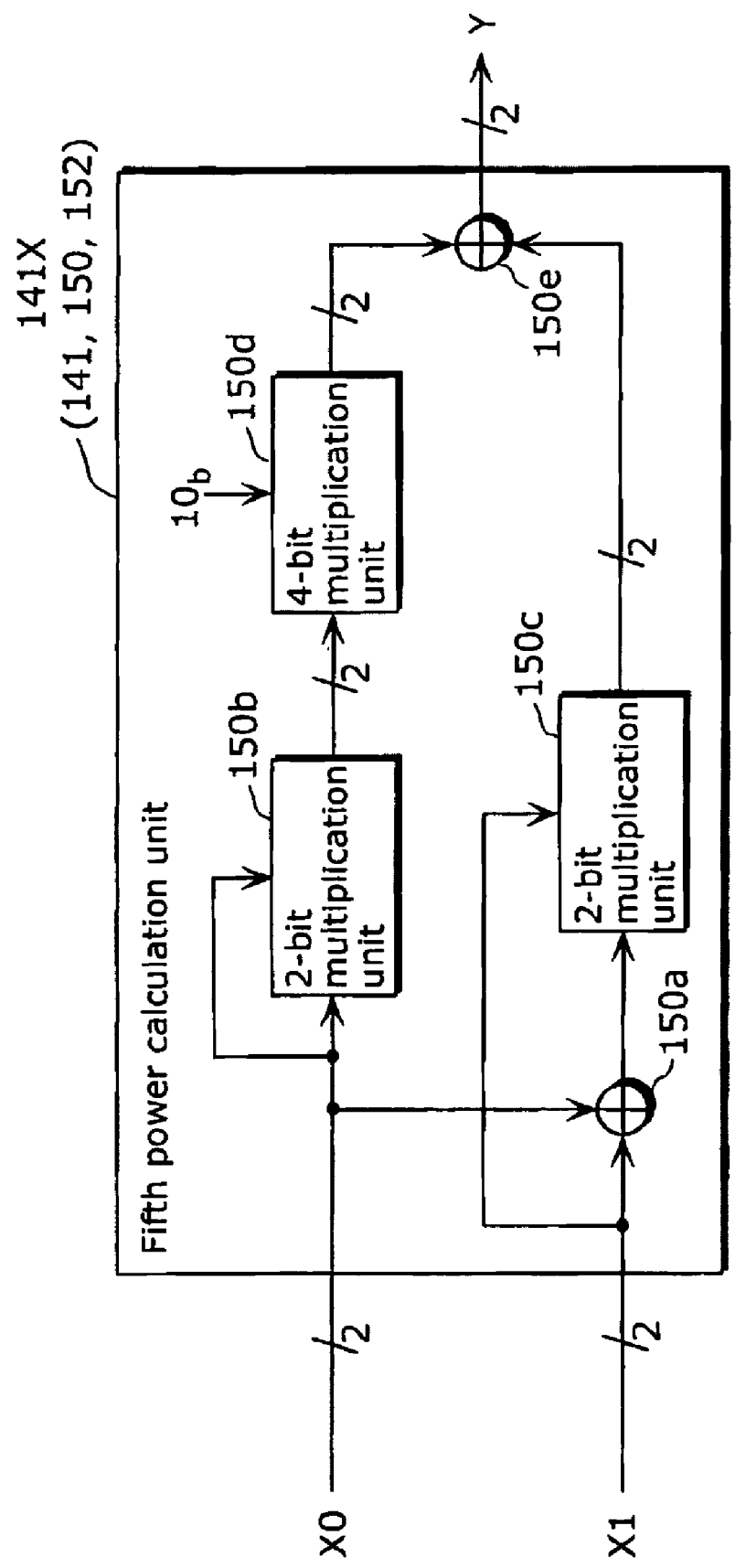
FIG. 24 is a block diagram showing a configuration of fifth power calculation units 141, 150, and 152 according to the embodiment of the present invention.

Furthermore, since an order of A is 3 as $A^3=X^{15}=1$ in $GF((2^2)^2)$, A is also an element in $GF(2^2)$. Thus, A is 2-bit data power calculation unit 141 will be described in detail later (FIG. 24).

(3) Then, the 2-bit inverse element calculation unit 142 included in the 4-bit inverse element calculation unit 116 shown in FIG. 21 generates data B (2 bits) by performing, on A (2 bits) that is obtained by the fifth power calculation unit 141 in the above (2), an inverse element calculation in $GF(2^2)$, and outputs the generated data B, which is expressed as below.

$$B=A^{(-1)} \text{ in } GF(2^2)$$

Figure 22:
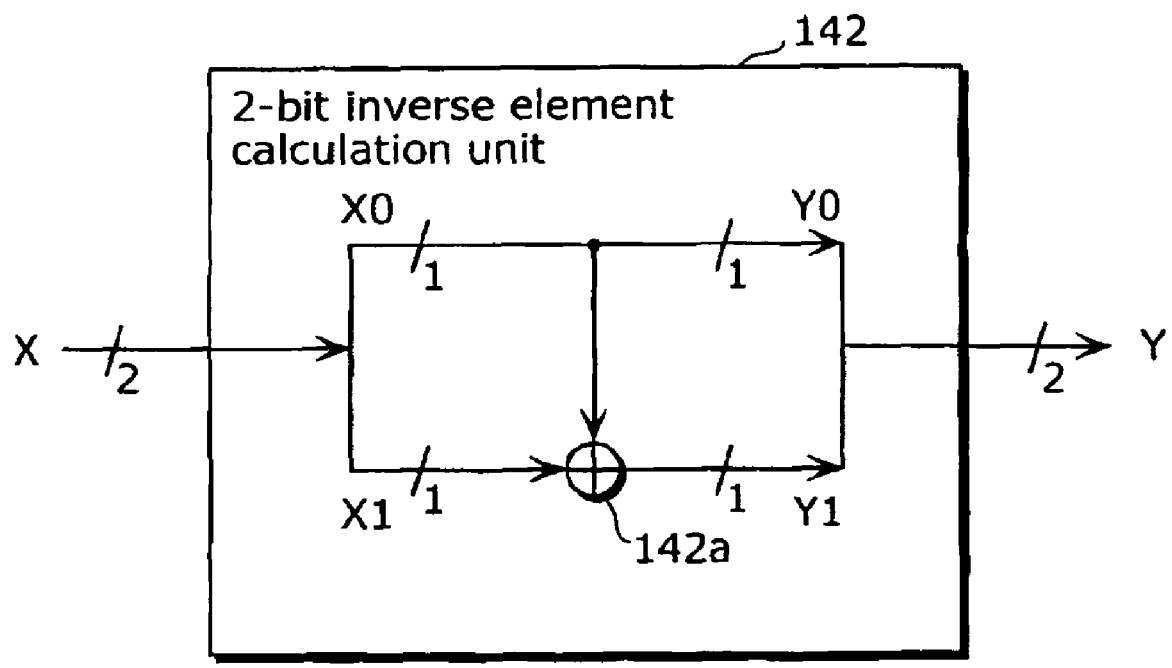
FIG. 22 is a block diagram showing a configuration of a 2-bit inverse element calculation unit 142 according to the embodiment of the present invention.

The 2-bit inverse element calculation unit 142 will be described in detail later (FIG. 22).

(4) Next, based on the results of the above calculations, the 2-bit multiplication units 143 and 144 included in the 4-bit inverse element calculation unit 116 shown in FIG. 21 obtains Y0 (2 bits) and Y1 (2 bits), respectively, through the following calculations, using the data B generated in the above (3) by the 2-bit inverse element calculation unit 142 and X0 and X1 that are obtained by the division in the above (1).

$$Y0=X0\times B \text{ in } GF(2^2)$$

$$Y1=(X0+X1)\times B \text{ in } GF(2^2)$$

Then, the 4-bit inverse element calculation unit 116 outputs, as an output thereof, 4-bit data Y that is obtained by concatenating, in descending order, Y0 and Y1 obtained in the above manner.

Here, the addition in GF($2^2$) is the bit-basis exclusive OR operation (the exclusive OR unit 140). The multiplication (the 2-bit multiplication units 143 and 144) in GF($2^2$) is as described in detail above (the 2-bit multiplication unit 21 shown in FIG. 20).

Next, the 2-bit inverse element calculation unit 142 that is used in the 4-bit inverse element calculation unit 116 (FIG. 21) will be described in detail.

<2-Bit Inverse Element Calculation Unit 142>

FIG. 22 is a block diagram showing a configuration of the 2-bit inverse element calculation unit 142.

The 2-bit inverse element calculation unit 142 includes an exclusive OR unit 142a.

The 2-bit inverse element calculation unit 142 performs, on input data X (2 bits), the inverse element calculation in GF($2^2$), and outputs a result of the calculation Y (2 bits), which is expressed as below.

$$Y = X^{\wedge}(-1) \text{ in } GF(2^2)$$

The 2-bit inverse element calculation unit 142 divides a higher-order 1 bit and a lower-order 1 bit of X as X0 and X1, respectively, and obtains X0 and Y1 through the following equations.

$$Y0 = X0$$

$$Y1 = X1 + X0$$

2-bit data Y that is obtained by combining Y0 and Y1 in this order is outputted.

Next, the randomized 4-bit inverse element calculation unit 114 that is used in the randomized 8-bit inverse element calculation unit 101 (FIG. 14) will be described in detail.

<Randomized 4-Bit Inverse Element Calculation Unit 114>

Figure 23:
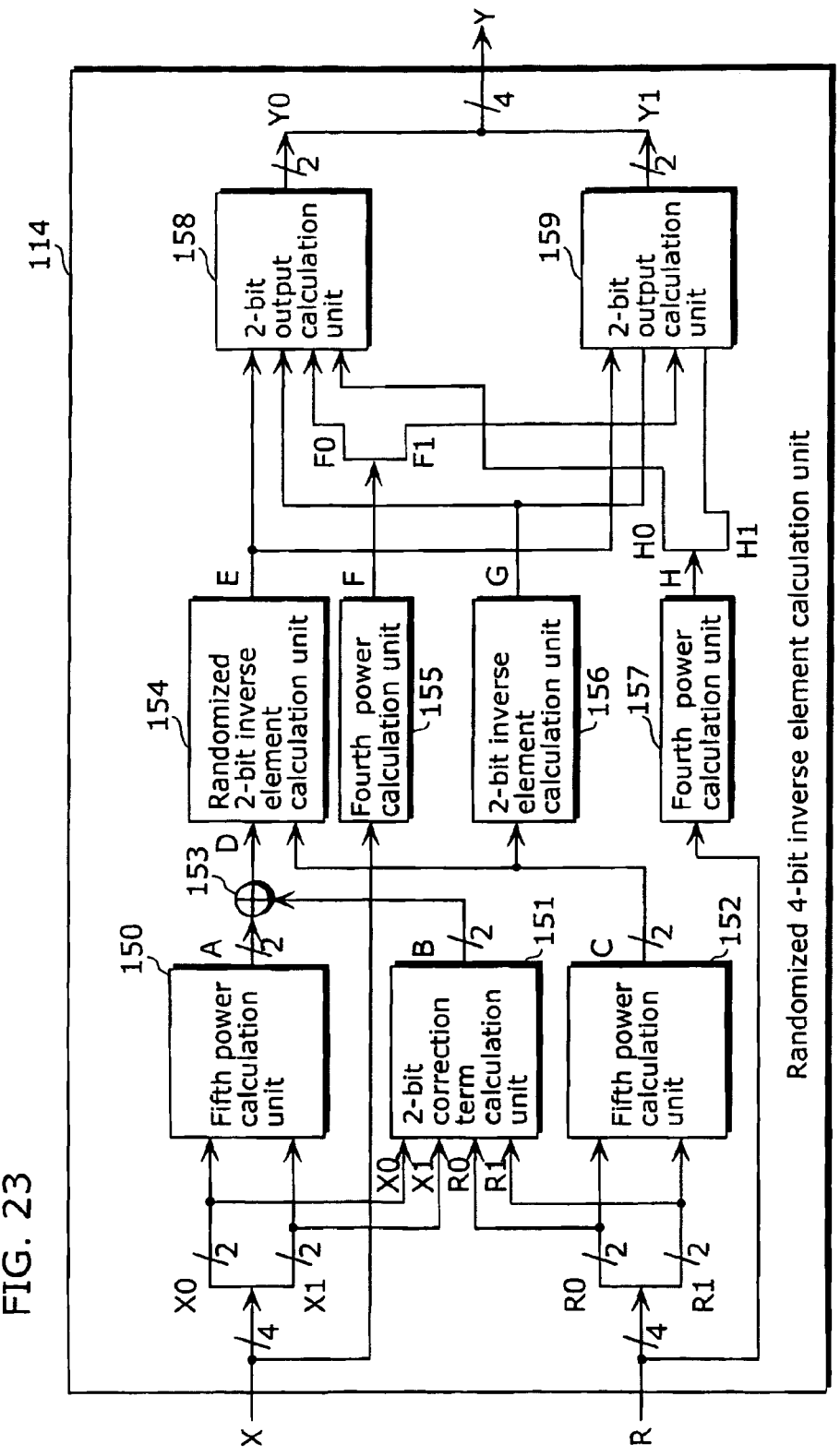
FIG. 23 is a block diagram showing a configuration of a randomized 4-bit inverse element calculation unit 114 according to the embodiment of the present invention.

FIG. 23 is a block diagram showing a configuration of the randomized 4-bit inverse element calculation unit 114 (FIG. 14).

The randomized 4-bit inverse element calculation unit 114 (FIGS. 14 and 23) includes fifth power calculation units 150 and 152 (FIG. 24), a 2-bit correction term calculation unit 151 (FIG. 25), fourth power calculation units 155 and 157 (FIG. 26), 2-bit output calculation units 158 and 159 (FIG. 27), a randomized 2-bit inverse element calculation unit 154 (FIG. 28), a 2-bit inverse element calculation unit 156, and an exclusive OR unit 153.

The randomized 4-bit inverse element calculation unit 114 generates output data Y (4 bits) by performing randomized 4-bit inverse element calculation processing on input data X using a random number R (4 bits). The input data X here corresponds to the input data D to the randomized 4-bit inverse element calculation unit 114 in the description (FIG. 14) of the randomized 8-bit inverse element calculation unit 101, and the random number R corresponds to C. Moreover, the output data Y corresponds to E. The randomized 4-bit inverse element calculation unit 114 performs the same calculation processing in GF($(2^2)^2$) as the randomized 8-bit inverse element calculation unit 101 performs. It is to be noted that although the output data C of the seventh power calculation unit 112 is also inputted to the randomized 4-bit inverse element calculation unit 114 in the randomized 8-bit inverse element calculation unit 101, the randomized 4-bit inverse element calculation unit 114 does not input the output data C to the randomized 2-bit inverse element calculation unit 154. In addition, data sizes of data to be inputted to each of processing units, exponents for exponentiation, and the like differ. As a procedure of the randomized 4-bit inverse element calculation unit 114 is the same as that of the randomized 8-bit inverse element calculation unit 101 except the above description, the procedure will not be described in detail.

It is to be noted that the processing performed by the randomized 4-bit inverse element calculation unit 114 is nothing but processing for generating a processing result Y=X^(−1)(+)R^(−1) by performing, on input data X=M(+)R, an inverse element calculation in a composite field GF($(2^2)^2$), the processing result being obtained by masking X^(−1) with a mask value R^(−1), the input data being obtained by masking M with a mask value R. X^(−1) is an inverse element of X in GF($(2^2)^2$), and the mask value R^(−1) is an inverse element of R in GF($(2^2)^2$).

<Fifth Power Calculation Units 141, 150, and 152>

FIG. 24 is a block diagram showing a configuration of a fifth power calculation unit 141X (the fifth power calculation units 141 (FIG. 21), 150 (FIG. 23), and 152 (FIG. 23)).

The fifth power calculation unit 141X includes 2-bit multiplication units 150b to 150d and exclusive OR units 150a and 150e. Here, the 2-bit multiplication units 150b to 150d each have the same configuration as the 2-bit multiplication unit 21 shown in FIG. 20.

The fifth power calculation 141X (the fifth power calculation units 141, 150, and 152) performs, on input data X0 (2 bits) and X1 (2 bits), fifth power calculation processing in GF($(2^2)^2$), and outputs output data Y (2 bits). The input data X0 and X1 here correspond to X0 and X1 in the description (FIG. 21) of the 4-bit inverse element calculation unit 116, and to X0 and X1 and R0 and R1 in the description (FIG. 23) of the randomized 4-bit inverse element calculation unit 114, respectively. Moreover, the output data Y corresponds to A in the description (FIG. 21) of the 4-bit inverse element calculation unit 116, and to A and C in the description (FIG. 23) of the randomized 4-bit inverse element calculation unit 114.

In addition, when 4-bit data that is obtained by concatenating the input data X0 and X1 in this order is X, the output data Y is expressed as below.

$$Y = X^{\wedge}5 \text{ in } GF((2^2)^2)$$

Here, as Y^3=X^15=1 in GF($(2^2)^2$), an order of Y is 3, and Y is an element in GF($2^2$). Thus, Y becomes 2-bit data.

It is to be noted that since a flow of the processing performed by the fifth power calculation unit 141X (the fifth power calculation units 141 (FIG. 21), 150 (FIG. 23), and 152 (FIG. 23)) is basically the same as that of the processing performed by the above-mentioned seventeenth power calculation unit 110X (the seventeenth power calculation units 110 and 112 shown in FIG. 15), the former will not be described in detail. Furthermore, the exclusive OR units 150a and 150e (FIG. 24) perform the bit-basis exclusive OR operation, and the processing performed by the 2-bit multiplication units 150b to 150d (FIG. 24) is the same as the processing performed by the above-mentioned 2-bit multiplication unit 21 (FIG. 20).

<2-Bit Correction Term Calculation Unit 151>

Figure 25:
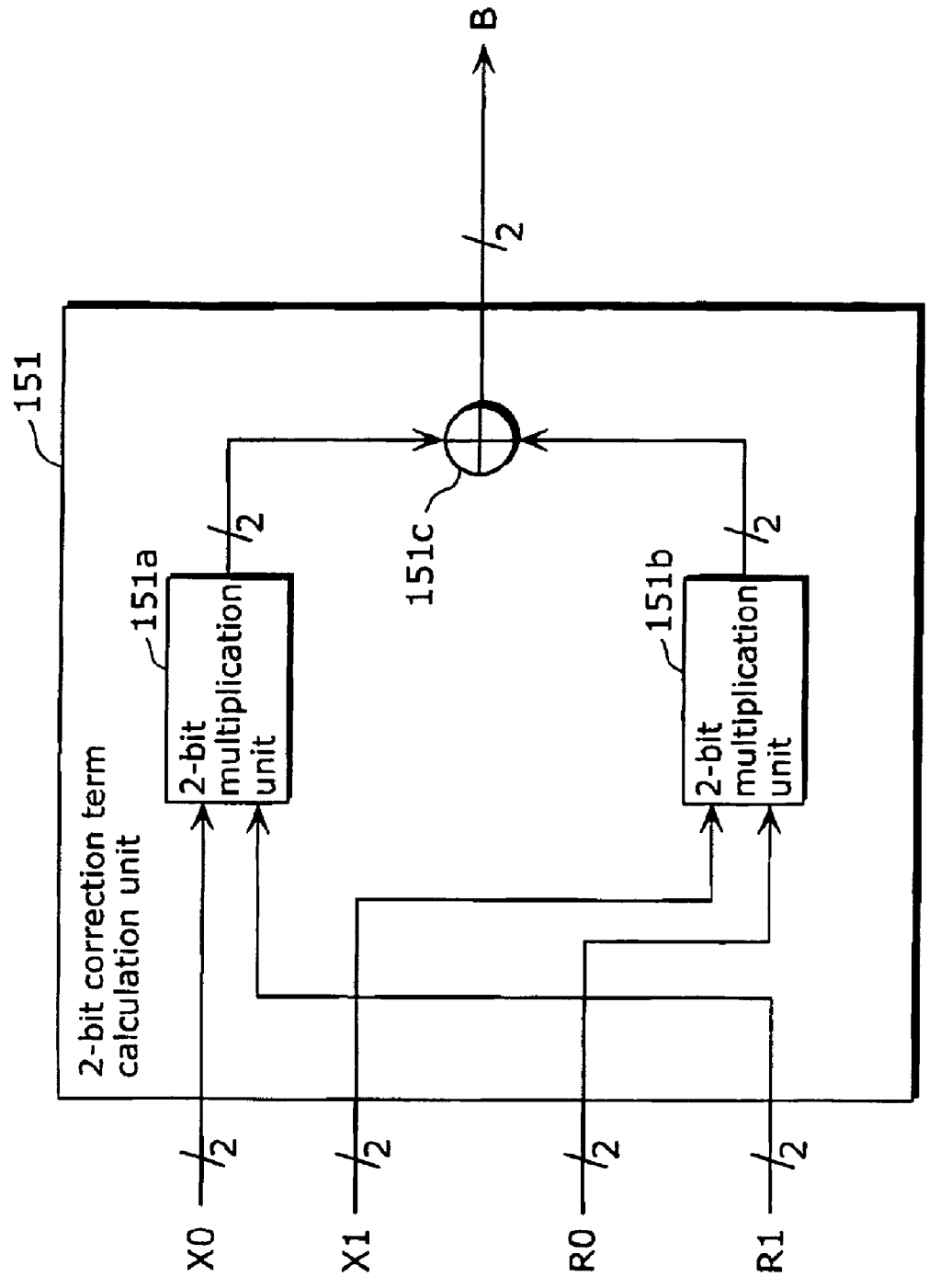
FIG. 25 is a block diagram showing a configuration of a 2-bit correction term calculation unit 151 according to the embodiment of the present invention.

FIG. 25 is a block diagram showing a configuration of a 2-bit inverse element calculation unit 151 (FIG. 23).

The 2-bit correction term calculation unit 151 includes the 2-bit multiplication units 151a and 151b (FIG. 20) and an exclusive OR unit 151c.

The 2-bit correction term calculation unit 151 performs, on input data X0 (2 bits), X1 (2 bits), R0 (2 bits), and R1 (2 bits), correction term calculation processing in GF($(2^2)^2$), and outputs output data B (2 bits). The input data X0, X1, R0, and R1 here correspond to X0, X1, R0, and R1 in the description (FIG. 23) of the randomized 4-bit inverse element calculation unit 114, respectively.

Here, since a flow of processing performed by the 2-bit correction term calculation unit 151 is basically the same as that of the processing performed by the above-mentioned 4-bit correction term calculation unit 111 (FIG. 16), the former will not be described in detail. In addition, the exclusive OR unit 151c performs the bit-basis exclusive OR operation, and processing of the 2-bit multiplication units 151a and 151b is the same as that of the above-mentioned 2-bit multiplication unit 21 (FIG. 20).

<Fourth Power Calculation Units 155 and 157>

Figure 26:
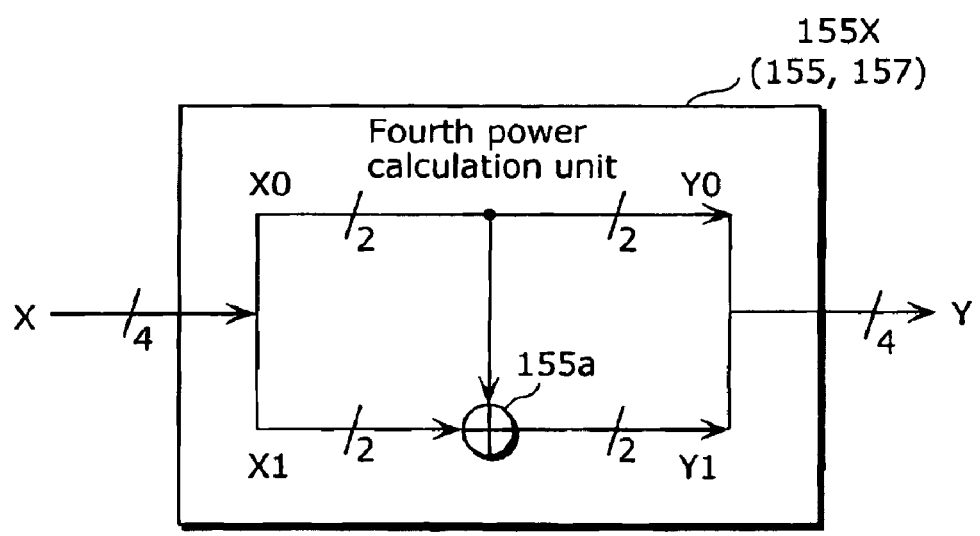
FIG. 26 is a block diagram showing a configuration of fourth power calculation units 155 and 157 according to the embodiment of the present invention.

FIG. 26 is a block diagram showing a configuration of a fourth power calculation unit 155X (the fourth power calculation units 155 and 157 shown in FIG. 23).

The fourth power calculation unit 155X includes an exclusive OR unit 155a.

The fourth power calculation unit 155X performs, on input data X (4 bits), fourth power calculation in a composite field $GF((2^2)^2)$, and outputs a result of the calculation Y (4 bits). A result of performing, on the input data X, the fourth power calculation in the composite field $GF((2^2)^2)$ is Y, which is expressed as below.

$Y=X^4$ in $GF((2^2)^2)$

Moreover, the input data X here corresponds to either the data X or R in the description (FIG. 23) of the processing of the randomized 4-bit inverse element calculation unit 114, and the output data Y corresponds to either the data F or H in the description (FIG. 23) of the processing of the randomized 4-bit inverse element calculation unit 114.

Then, the fourth power calculation unit 155X divides, for every 2 bits from the high order, the input data X into X0 and X1, and obtains Y0 and Y1 by performing the following calculations in $GF(2^2)$.

$Y0=X0$ $Y1=X0+X1$ in $GF(2^2)$

Here, the addition in $GF(2^2)$ is a bit-basis exclusive OR operation (the exclusive OR unit 155a). The sixteenth power calculation unit 155X generates 8-bit data Y by concatenating the obtained Y0 and Y1 in this order. Y becomes the output data of the fourth power calculation units 155 and 157.

<2-Bit Output Calculation Units 158 and 159>

Figure 27:
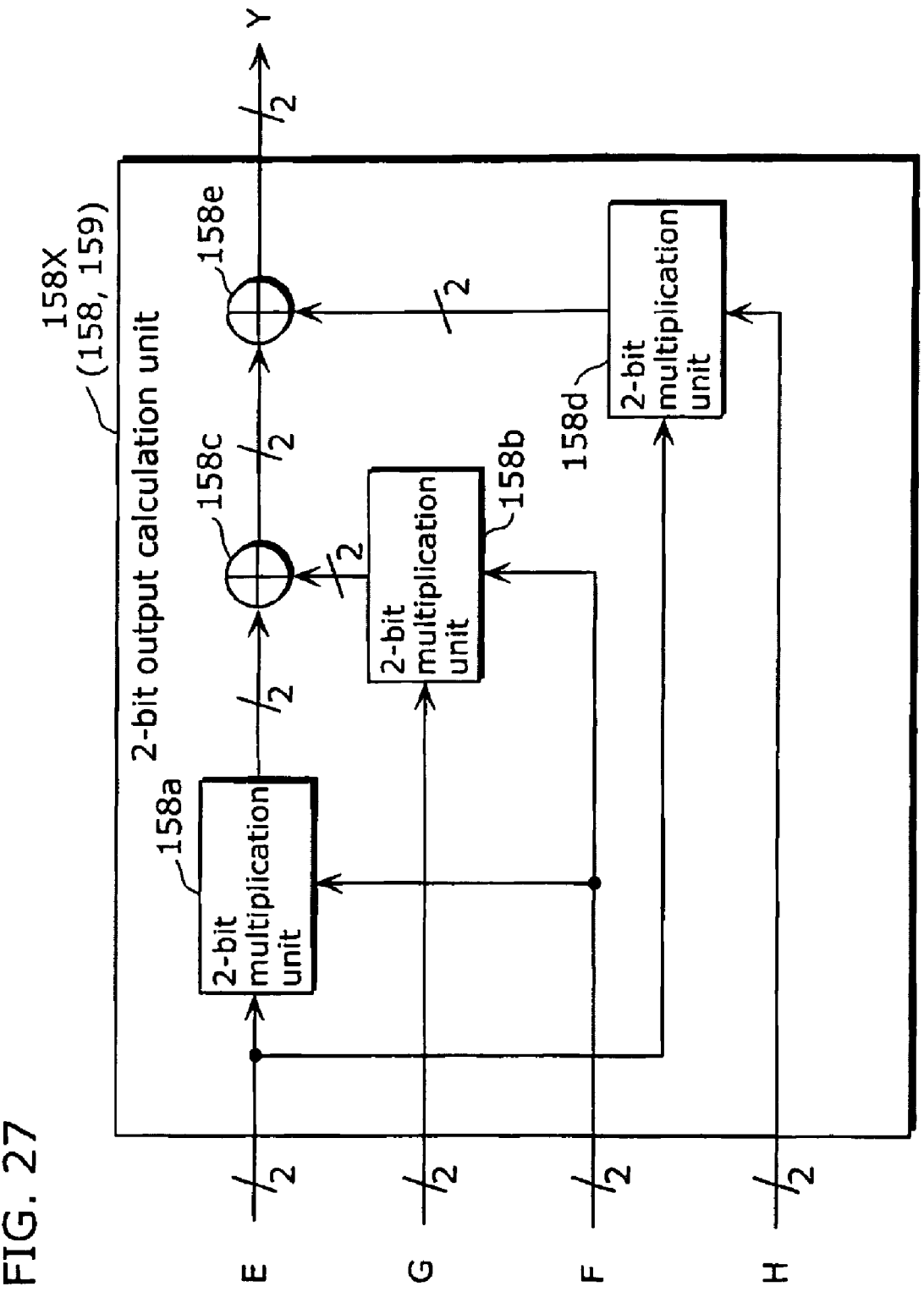
FIG. 27 is a block diagram showing a configuration of 2-bit output calculation units 158 and 159 according to the embodiment of the present invention.

FIG. 27 is a block diagram showing a configuration of a 2-bit output calculation unit 158X (the 2-bit output calculation units 158 and 159 shown in FIG. 23).

The 2-bit output calculation unit 158X includes the 2-bit multiplication units 158a, 158b, and 158d (FIG. 20) and exclusive OR units 158c and 158e.

The 2-bit output calculation unit 158X performs, on input data E (2 bits), G (2 bits), F (2 bits), and H (2 bits), 2-bit output calculation processing, using each of the above components, and generates output data Y. The input data E, G, F, and H here correspond to the input data E, G, F0, and H0 to the 2-bit output calculation unit 158 and to the input data E, G, F1, and H1 to the 2-bit output calculation unit 159, respectively, the input data E, G. F0, F1, H0, and H1 being in the description (FIG. 23) of the processing of the randomized 4-bit inverse element calculation unit 114. In addition, the output data Y corresponds to the output data Y0 of the 2-bit output calculation unit 158 and the output data Y1 of the 2-bit output calculation unit 159 that are in the description (FIG. 23) of the processing of the randomized 4-bit inverse element calculation unit 114. The 2-bit output calculation unit 158X obtains Y by performing the following calculation in $GF(2^2)$, and outputs Y.

$Y=E \times F+G \times F+E \times H$ in $GF(2^2)$

Here, the addition in $GF(2^2)$ is the bit-basis exclusive OR operation (the exclusive OR units 158c and 158e). Multiplication (the 2-bit multiplication units 158a, 158b, and 158d) in $GF(2^2)$ is the same as the multiplication performed by the 2-bit multiplication unit 21 (FIG. 23).

<Randomized 2-Bit Inverse Element Calculation Unit 154>

Figure 28:
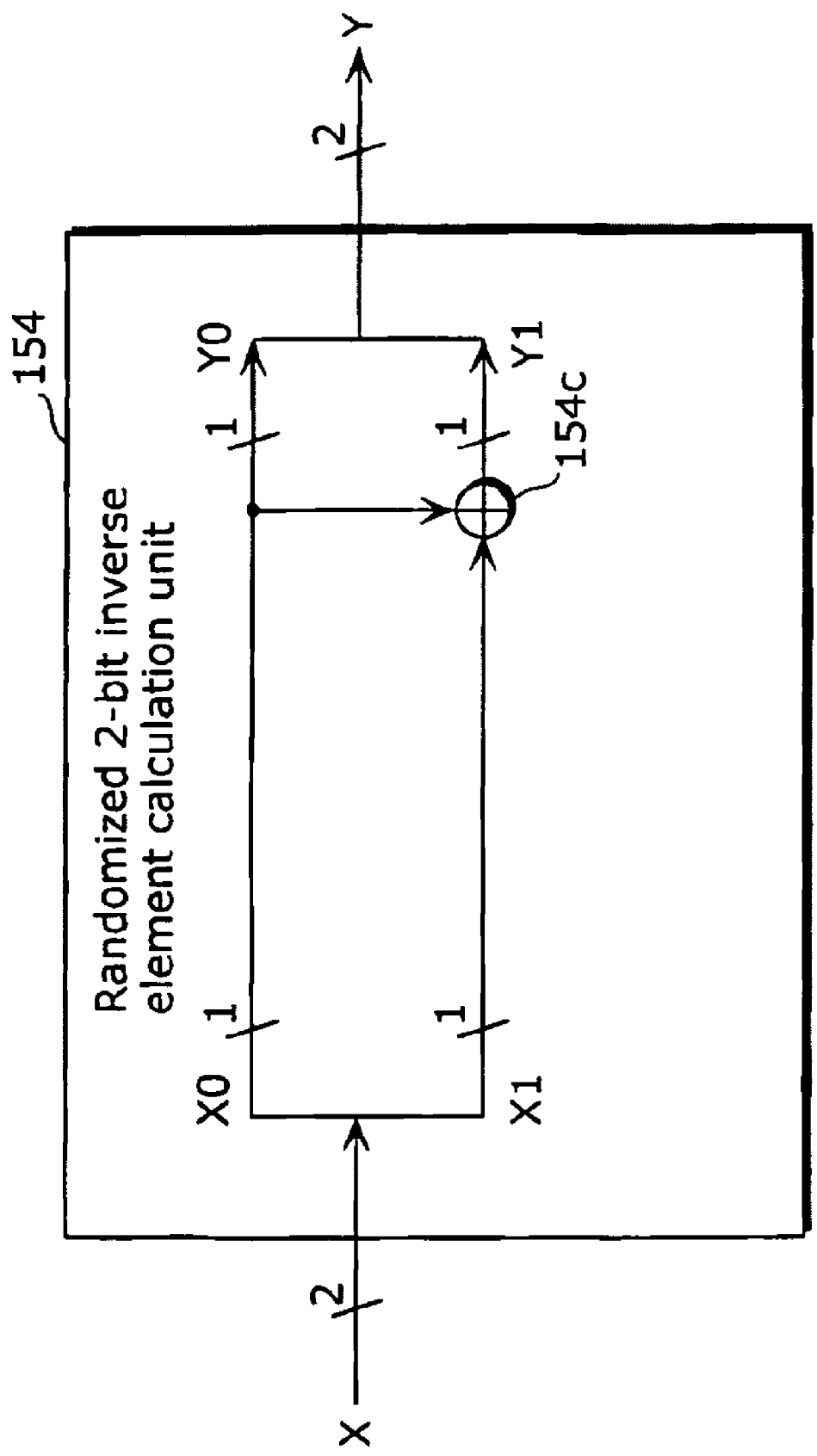
FIG. 28 is a block diagram showing a configuration of a randomized 2-bit inverse element calculation unit 154 according to the embodiment of the present invention.

FIG. 28 is a block diagram showing a configuration of the randomized 2-bit inverse element calculation unit 154.

The randomized 2-bit inverse element calculation unit 154 includes an exclusive OR unit 154c.

The randomized 2-bit inverse element calculation unit 154 generates output data Y (2 bits) by performing randomized 2-bit inverse element calculation processing on input data X (2 bits) using the exclusive OR unit 154c. The input data X here corresponds to the input data D to the randomized 2-bit inverse element calculation unit 154 (FIGS. 23 and 28) in the description (FIG. 23) of the randomized 4-bit inverse element calculation unit 114. Furthermore, the output data Y corresponds to E. The randomized 2-bit inverse element calculation unit 154 calculates Y0 and Y1 using the following calculations, with X0 being a higher-order 1 bit of X and X1 being a lower-order 1 bit of X.

$Y0=X0$ $Y1=X0+X1$ in $GF(2^2)$

Here, the addition in $GF(2^2)$ is an exclusive OR operation (the exclusive OR unit 154c). Data Y that is obtained by combining Y0 and Y1 in descending order is outputted.

It is to be noted that the processing of the randomized 2-bit inverse element calculation unit 154 is nothing but processing for generating a processing result $Y=X^{(-1)}(+)R^{(-1)}$ by performing, on input data $X=M(+) R$, the inverse element calculation in the composite field $GF(2^2)$, the processing result being obtained by masking $X^{(-1)}$ with a mask value $R^{(-1)}$, the input data being obtained by masking M with a mask value R. $X^{(-1)}$ is an inverse element of X in $GF(2^2)$, and the mask value $R^{(-1)}$ is an inverse element of R in $GF(2^2)$.

Next, the random number update unit 17 (FIG. 9) that is used in the encryption unit 1a will be described in detail. As stated above, the random number update unit 17 (FIG. 9) updates a random number stored in the random number temporary storage unit 16 (FIGS. 9 and 38).

<Random Number Update Unit 17>

FIG. 20 is a block diagram showing a configuration of the random number update unit 17.

The random number update unit 17 includes a composite field conversion unit 170, an 8-bit inverse element calculation unit 171, and an extension field conversion and matrix conversion unit 172.

The random number update unit 17 performs random number update processing on an input random number X (input data X) (8 bits), and outputs an updated random number Y as output data. The input data X here corresponds to the input random number Rn (8 bits) in the description (FIG. 9) of the encryption unit 1a, and the output data Y corresponds to the output random number Rn+1 (8 bits) in the description (FIG. 9) of the encryption unit 1a. The random number update unit 17 performs the following processing.

(1) First, the composite field conversion unit 170 divides, for every 1 bit from the high order, the input data X into X7, X6, ..., X0, and obtains A7, A6, ..., A0 by performing the matrix calculation of the above-mentioned Equation 1. Then, the composite field conversion unit 170 generates 8-bit data A that is obtained by concatenating, in descending order, A7, A6, ..., A0.

(2) Next, the 8-bit inverse element calculation unit 171 obtains B (8 bits) by performing, on A generated in the above (1), inverse element calculation processing in GF(((2^2)^2)^2), which is expressed as below.

$$B=A\textasciicircum(-1) \text{ in } GF(((2\textasciicircum2))\textasciicircum2)\textasciicircum2)$$

The inverse element calculation processing in GF(((2^2)^2)^2) will be described in detail later.

(3) Then, the extension field conversion and matrix conversion unit 172 divides, for every 1 bit from the high order, B calculated in the above (2) into B7, B6, ..., B0, and obtains Y7, Y6, ..., Y0 by performing the matrix calculation of the above-mentioned Equation 2.

Then, the extension field conversion and matrix conversion unit 172 outputs, as output data of the random number update unit 17, 8-bit data Y that is obtained by concatenating, in this order, Y7, Y6, ..., Y0 that have been obtained in the above manner.

Next, the 8-bit inverse element calculation unit 171 that is used in the random number update unit 17 will be described in detail.

<8-Bit Inverse Element Calculation Unit 171>

Figure 29:
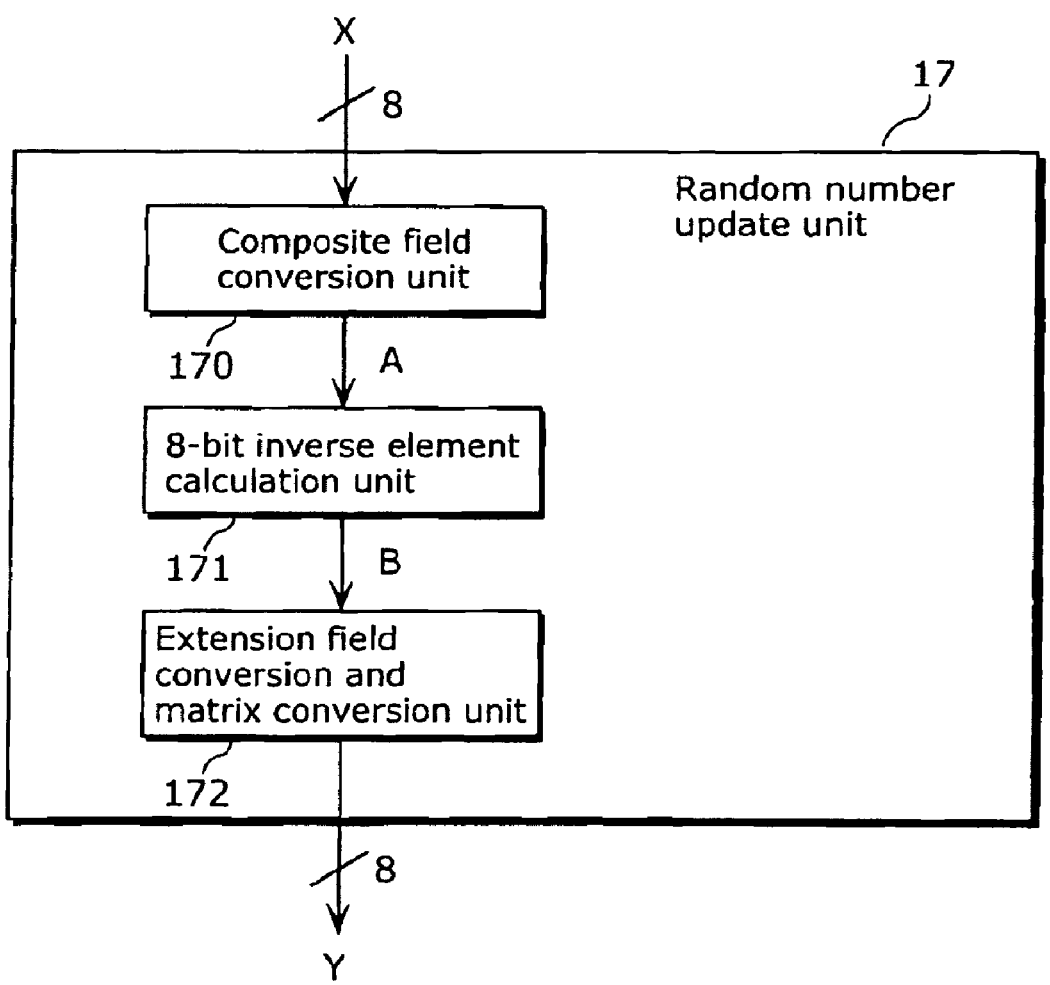
FIG. 29 is a block diagram showing a configuration of a random number update unit 17 according to the embodiment of the present invention.
Figure 30:
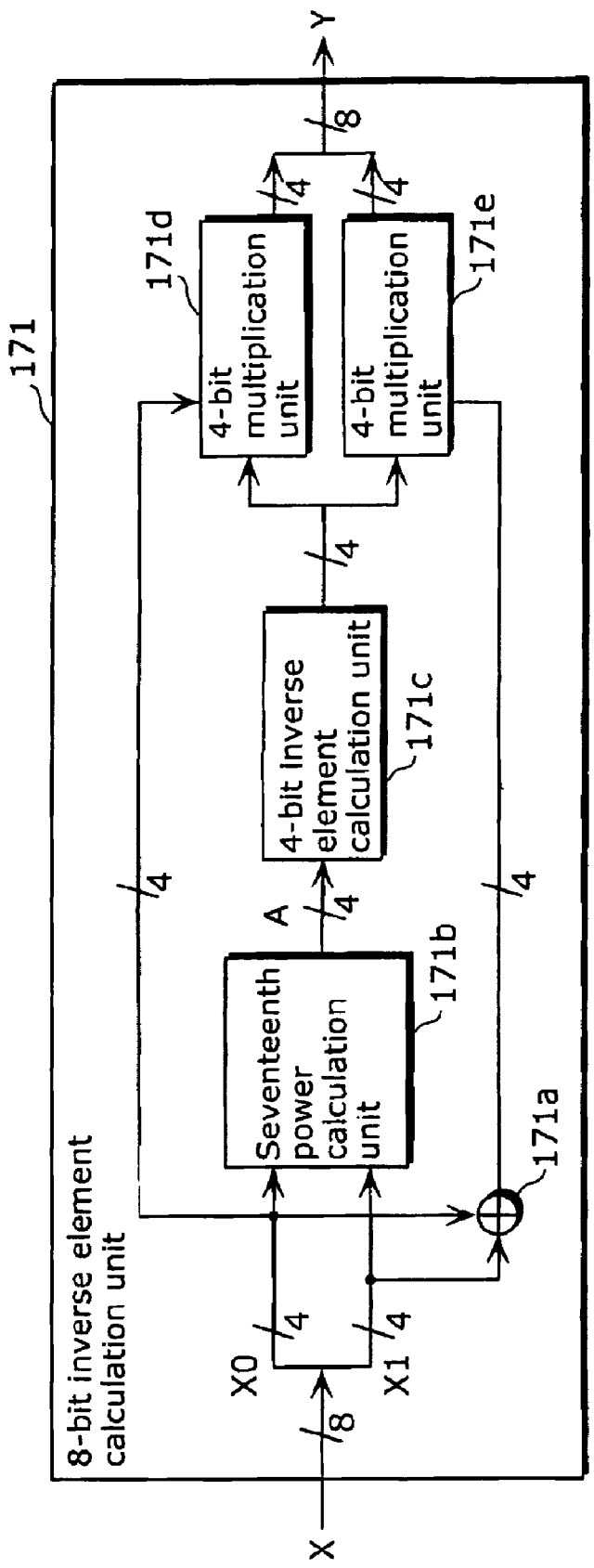
FIG. 30 is a block diagram showing a configuration of an 8-bit inverse element calculation unit 171 according to the embodiment of the present invention.
Figure 31:
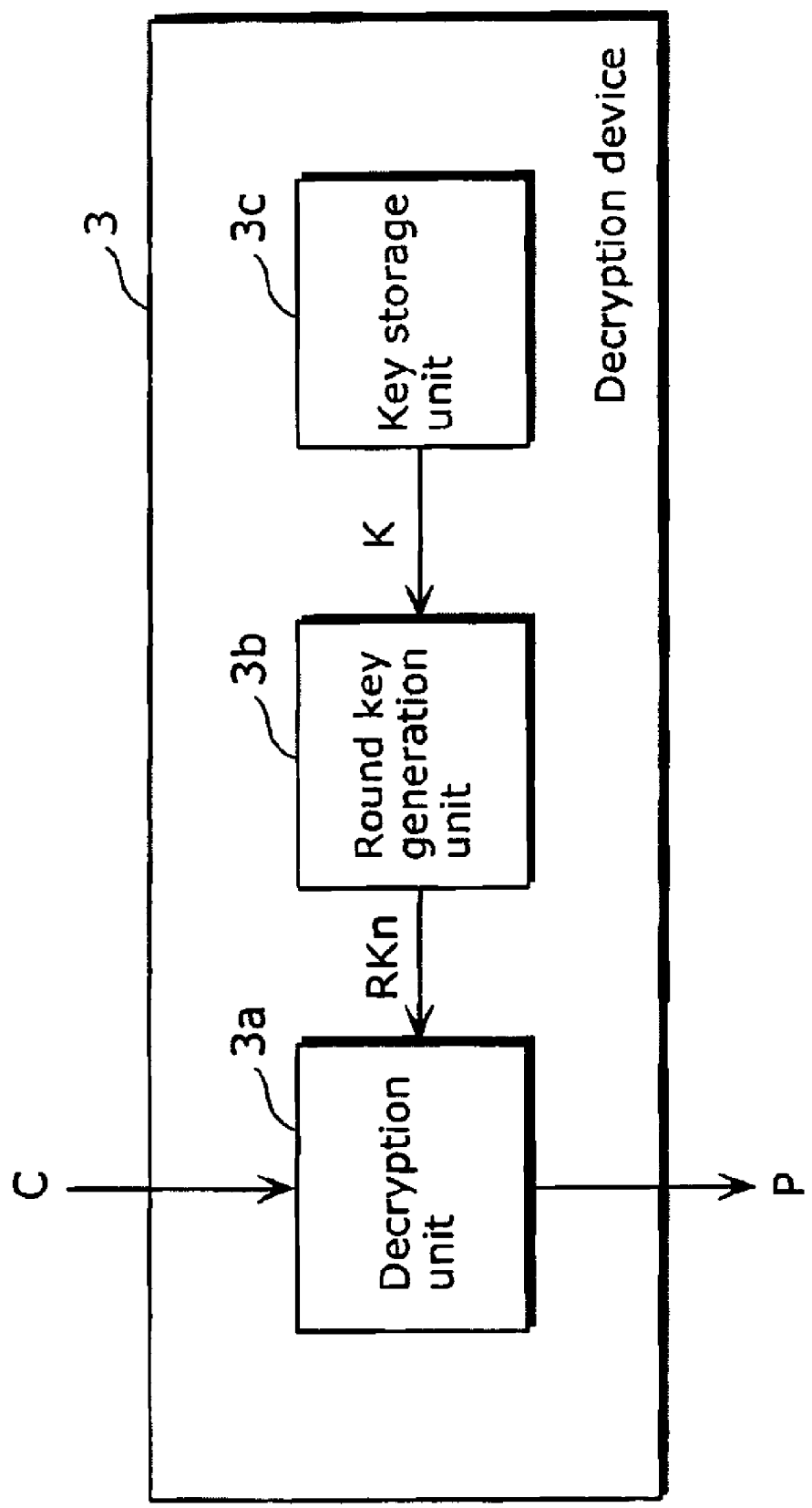
FIG. 31 is a block diagram showing a configuration of a decryption device 3 according to the embodiment of the present invention.
Figure 32:
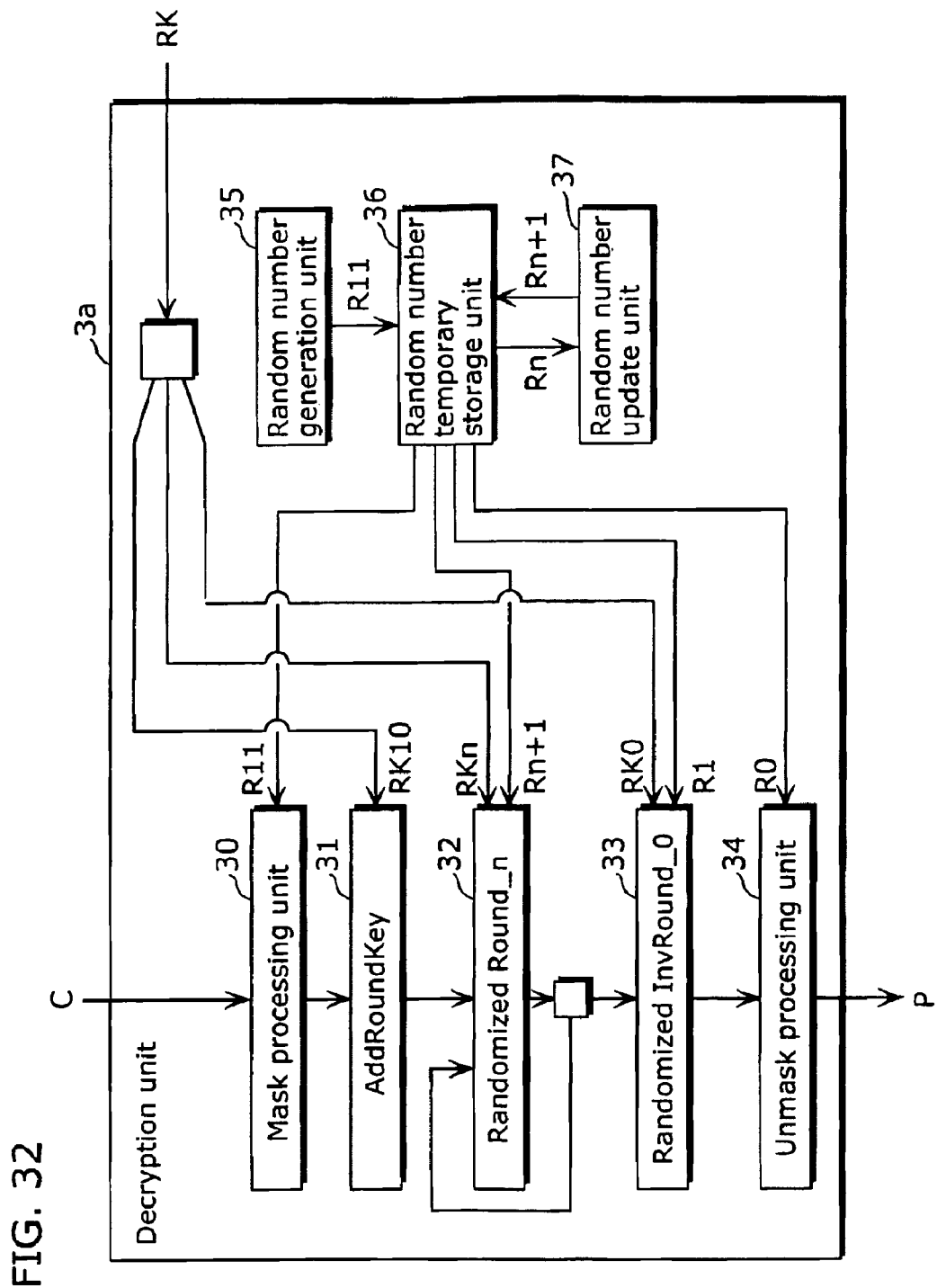
FIG. 32 is a block diagram showing a configuration of a decryption unit 3a according to the embodiment of the present invention.
Figure 33:
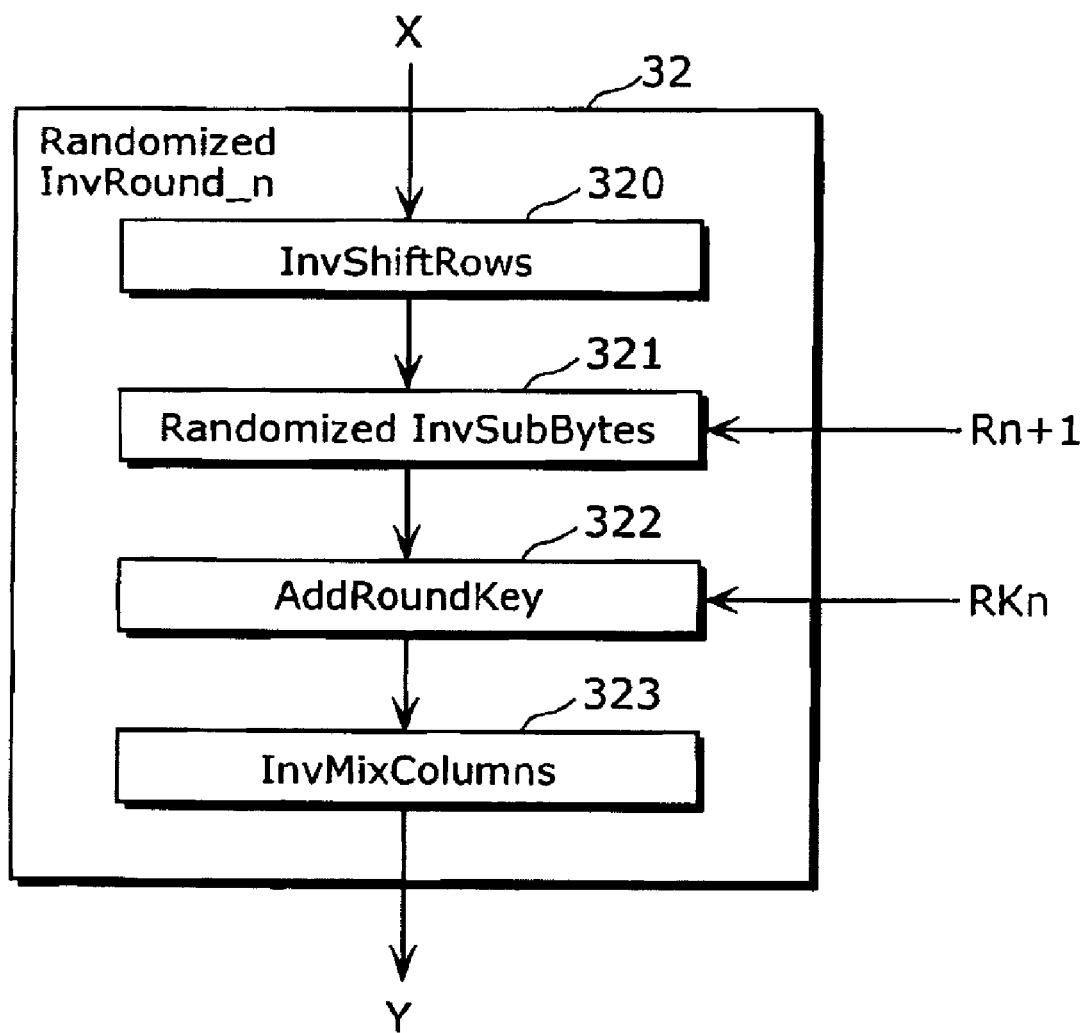
FIG. 33 is a block diagram showing 8 configuration of randomized InvRound_n 32 according to the embodiment of the present invention.
Figure 34:
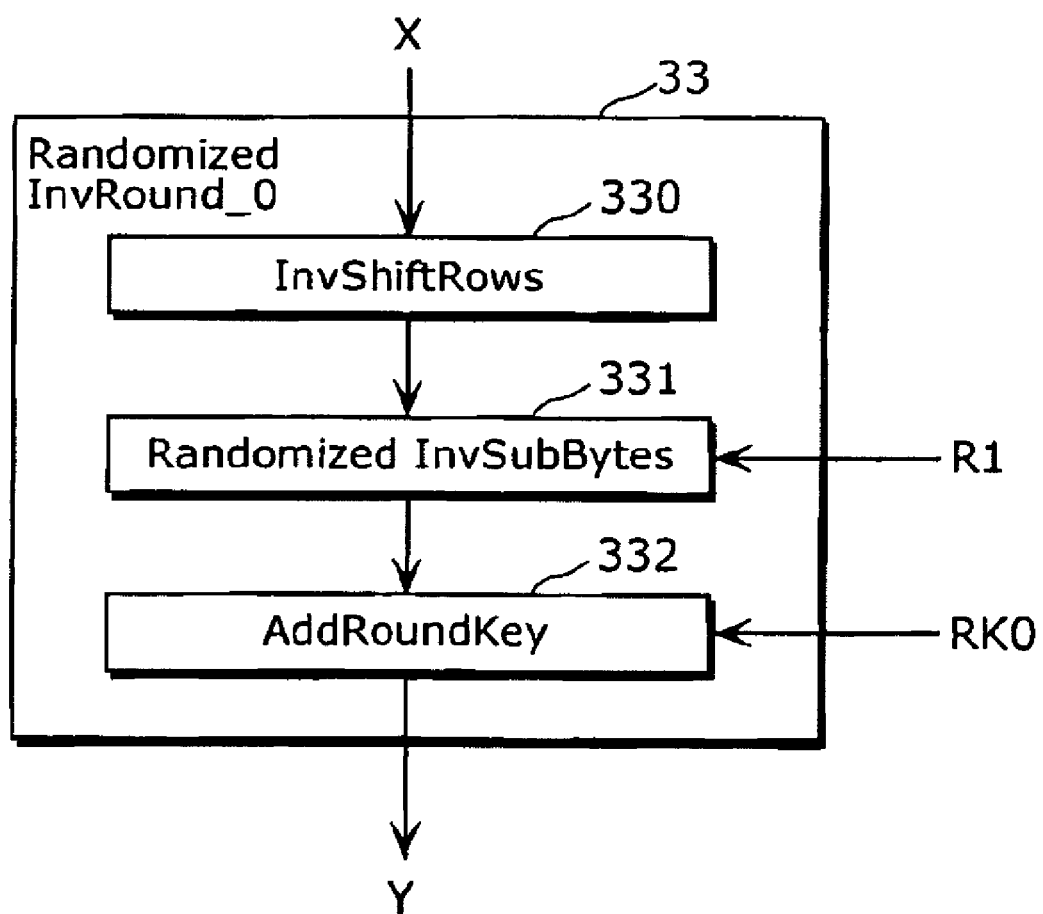
FIG. 34 is a block diagram showing a configuration of randomized InvRound_0 33 according to the embodiment of the present invention.
Figure 35:
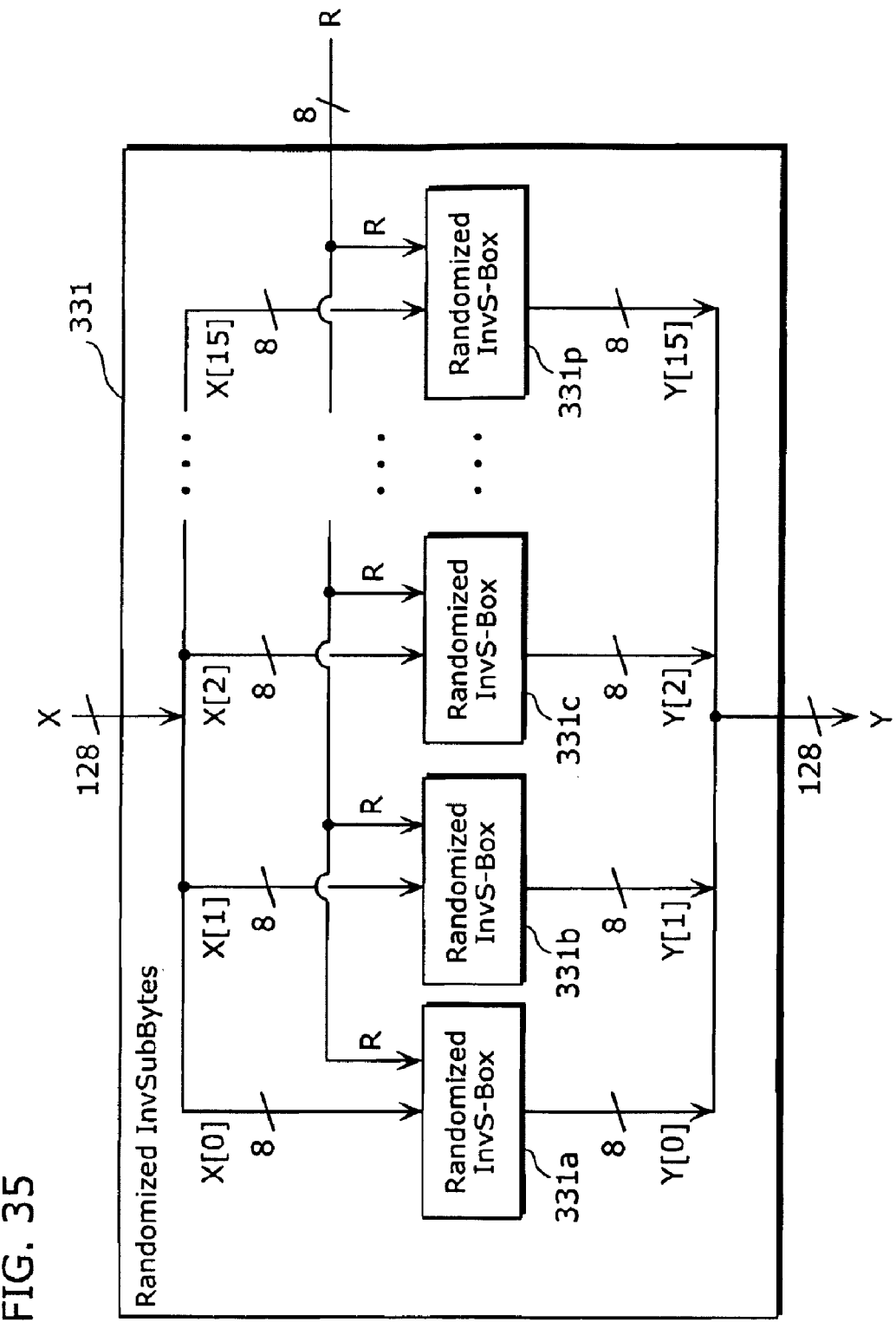
FIG. 35 is a block diagram showing a configuration of randomized InvSubBytes 331 according to the embodiment of the present invention.

FIG. 30 is a block diagram showing a configuration of the 8-bit inverse element calculation unit 171 (FIG. 29).

The 8-bit inverse element calculation unit 171 (FIGS. 29 and 30) includes a seventeenth power calculation unit 171b (FIG. 15), 4-bit inverse element calculation units 171c to 171e (FIG. 19), and an exclusive OR unit 171a.

The 8-bit inverse element calculation unit 171 performs, on input data X (8 bits), an inverse element calculation in GF(((2^2)^2)^2), and generates output data Y (8 bits) that is a result of the calculation, which is expressed as below.

$$Y=X\textasciicircum(-1) \text{ in } GF((2\textasciicircum2)\textasciicircum2)$$

The input data X here corresponds to the input data A to the 8-bit inverse element calculation unit 171 in the description (FIG. 29) of the processing of the random number update unit 17, and the output data Y corresponds to the output data B of the 8-bit inverse element calculation unit 171. The 8-bit inverse element calculation unit 171 performs the following processing.

(1) The 8-bit inverse element calculation unit 171 first divides, for every 4 bits from the high order, the input data X into X0 and X1. Then, the 8-bit inverse element calculation unit 171 inputs, to the exclusive OR unit 171a, the seventeenth power calculation unit 171b, and the 4-bit multiplication unit 171d, X0 that is obtained by the division. Furthermore, the 8-bit inverse element calculation unit 171 inputs, to the exclusive OR unit 171a and the seventeenth power calculation unit 171b, X1 that is obtained by the division.

(2) Then, the seventeenth power calculation unit 171b performs, on X0 and X1 that are inputted thereto, a seventeenth power calculation in GF(((2^2)^2)^2), and obtains a result of the calculation A (4 bits). He result of raising, to the seventeenth power in GF(((2^2)^2)^2), data X (8 bits) that is obtained by combining X0 and X1 in this order, which is expressed as below.

$$A=X\textasciicircum17 \text{ in } GF(((2\textasciicircum2)\textasciicircum2)\textasciicircum2)$$

In addition, since an order of A is 15 as A^15=X^255=1 in GF(((2^2)^2)^2), A is an element in GF((2^2)^2). Thus, A is 4-bit data. Details of the seventeenth power calculation unit 171b are the same as those of the above-mentioned seventeenth power calculation unit 110X (FIG. 15) (the seventeenth power calculation units 110 and 112 (FIG. 16)).

(3) Next, the 4-bit inverse element calculation unit 171c (FIG. 30) generates data B (4 bits) by performing, on A (4 bits) generated in the above (2), an inverse element calculation in GF((2^2)^2), and outputs the data B, which is expressed as below.

$$B=A\textasciicircum(-1) \text{ in } GF(((2\textasciicircum2)\textasciicircum2)\textasciicircum2)$$

Details of the 4-bit inverse element calculation unit 171c are the same as those of the above-mentioned 4-bit inverse element calculation unit 116 (FIG. 21).

(4) Then, the 8-bit inverse element calculation unit 171 causes the 4-bit multiplication units 171d and 171e to obtain the following Y0 (4 bits) and Y1 (4 bits), respectively, through the following calculations, using B (4 bits) generated in the above (3) and X0 and X1 that are obtained by the division in the above (1).

$$Y0=X0\times B \text{ in } GF((2\textasciicircum2)\textasciicircum2)$$

$$Y1=(X0+X1)\times B \text{ in } GF(2\textasciicircum2)\textasciicircum2)$$

Then, the 8-bit inverse element calculation unit 171 outputs, as an output thereof, 8-bit data Y that is obtained by concatenating Y0 and Y1 in descending order.

Addition in GF((2^2)^2) is a bit-basis exclusive OR operation (the exclusive OR unit 171a). The multiplication (the 4-bit multiplication units 171d and 171e) in GF((2^2)^2) is as described in detail above (the 4-bit multiplication unit 20 shown in FIG. 19).

As seen above, all of the details of the operations of the encryption device 1 have been described.

Next, that the randomized S-boxes 120a to 120p (FIG. 13) mask data in processing while maintaining compatibility with an S-box for AES cipher will be described.

<Principle of Randomized 8-Bit Inverse Element Calculation Unit 101>

The randomized 8-bit inverse element calculation unit 101 (FIG. 14) outputs Y=M^(-1)+R^(-1) (OD8t=T1(V8t)^(-1)+T1(Rt)^(-1) in FIG. 38) with element X=M+R in the composite field GF(((2^2)^2)^2) (ID8t=T1(V8t)+T1(Rt), M=T1(V8t), R=T1(Rt) in FIG. 38) being an input. Here, M^(-1) and R^(-1) indicate an inverse element of M and an inverse element of R in GF(((2^2)^2)^2), respectively. The following will describe the above point.

An output value A of the seventeenth power calculation unit 110 (FIGS. 14 and 15) is expressed, using a nature of an extension field and the like, as below.

$$\begin{aligned} A &= X\wedge 17 \\ &= (M+R)\wedge 17 \\ &= (M+R)\times (M+R)\wedge 16 \\ &= (M+R)\times (M\wedge 16 + R\wedge 16) \\ &= M\wedge 17 + R\wedge 17 + M\wedge 16\times R + M\times R\wedge 16 \end{aligned}$$

Here, since GF(((2^2)^2)^2) is GF((2^2)^2) that is secondary extended by irreducible polynomial x^2+x+1100 (binary digit), when a root of x^2+x+1100 (binary digit)=0 is α, M and R can be expressed as below.

$$M: M0\times \alpha + M1$$

$$R: R0\times \alpha + R1$$

M^16×R+M×R^16 can be calculated, using the nature of the extension field and the like, as below.

$$(M0 \times \alpha + M1)^{\wedge}16(R0 \times \alpha + R1) + (M0 \times \alpha + M1)(R0 \times \alpha + R1)^{\wedge}16 =$$
$$\{M0 \times \alpha + (M0 + M1)\} \times (R0 \times \alpha + R1) + (M0 \times \alpha + M1) \times$$
$$\{R0 \times \alpha + (R0 + R1)\} = (M0 + R0) \times R1 + (M1 + R1) \times R0$$

The above calculation is equal to X0×R1+X1×R0 in the processing of the randomized 8-bit inverse element calculation unit 101 shown in FIG. 14, which can thus be expressed as below.

$$A = M^{\wedge}17 + R^{\wedge}17 + X0 \times R1 + X1 \times R0$$

In the meantime, since the 4-bit correction term calculation unit 111 (FIGS. 14 and 16) is supposed to calculate B=X0×R1+X1×R0, the input data D to the randomized 4-bit inverse element calculation unit 114 (FIGS. 14 and 23) is actually expressed as below.

$$D = A + B = M^{\wedge}17 + R^{\wedge}17$$

As described later, the randomized 4-bit inverse element calculation unit 114 outputs an output E=M^(−17)+R^(−17) with respect to an input D=M^17+R^17, C=R^17. This is equal to the following calculations being separately performed by the 4-bit output calculation units 118 and 119 for every higher-order 4 bits and lower-order 4 bits.

$$Y = E \times F + G \times F + H \times E = \{M^{\wedge}(-17) + R^{\wedge}(-17)\} \times (M + R)^{\wedge}16 +$$
$$R^{\wedge}(-17) \times (M + R)^{\wedge}16 + R^{\wedge}16 \times \{M^{\wedge}(-17) + R^{\wedge}(-17)\}$$

Calculating the above equation results in Y=M^(−1)+R^(−1), and it becomes obvious that the randomized 8-bit inverse element calculation unit 101 converts X=M+R into Y=M^(−1)+R^(−1).

Since the randomized 4-bit inverse element calculation unit 114 (FIGS. 14 and 23), which is one of the components of the randomized 8-bit inverse element calculation unit 101 that converts X=M+R into Y=M^(−1)+R^(−1), performs the above-mentioned processing in GF((2^2)^2), the same description as above holds true. Thus, it is obvious that E=M^(−17)+R^(−17) is outputted with respect to the inputs D=M^17+R^17 and C=R^17. Further, performing actual calculations on combinations of all of the values of X and R verifies that the same holds true for the randomized 4-bit inverse element calculation unit 114.

As stated above, that the randomized 8-bit inverse element calculation unit 101 converts the element X=M+R in the composite field GF(((2^2)^2)^2) into Y=M^(−1)+R^(−1) has been described.

<Operating Principle of Randomized S-Boxes 120a to 120p>

Next, an operating principle of the randomized S-boxes 120a to 120p (FIGS. 12 and 13) will be described. In FIG. 13, where X=M+R (IC8*t*=V8*t*+Rt, M=V8*t*, and R=Rt in FIG. 38), an output of the composite field conversion unit 100 is A=T(X)=T(M)+T(R) (ID8*t*=T1(V8*t*)+T1(Rt) in FIG. 38). Here, T(X) (T1 in FIG. 38) is a result of converting an element in GF(2^8) into an element in the composite field GF(((2^2)^2)^2). Likewise, the other composite field conversion unit 103 converts R (Rt in FIG. 38) into S=T(R) (RDt=T1(Rt) in FIG. 38).

Next, as described earlier, the randomized 8-bit inverse element calculation unit 101 generates B=T(M)^(−1)+T(R)^(−1) (OD8*t*=T1(V8*t*)^(−1)+T1(Rt)^(−1) in FIG. 38) from inputs A=T(M)+T(R) and S=T(R). Next, the extension field conversion and matrix conversion unit 102 (FIG. 13) first converts the element in the composite field GF(((2^2)^2)^2) into the element in GF(2^8), and then outputs a result of performing only a portion of a matrix calculation included in the affine transformation defined in the S-box for AES cipher. In other words, $$C = \text{Mat}(M^{\wedge}(-1)) + \text{Mat}(R^{\wedge}(-1))$$

(Mat(V8*t*^(−1))+Mat(R^(−1)) is outputted. Here, Mat(X) is a result of performing, on X, the above matrix operation, that is, the matrix calculation included in the affine transformation defined in the S-box for AES cipher. Although the exclusive OR unit 104 (FIG. 13) performs addition of the above-mentioned C that is inputted and constant 01100011 (binary digit) in GF(2^8), the constant is a constant of constant addition which is defined in the affine transformation defined in the S-box for AES cipher. To put it differently, an output result Y of the exclusive OR unit 104 is as follows.

$$Y = \{\text{Mat}(M^{\wedge}(-1)) + 011000111\} + \text{Mat}(R^{\wedge}(-1))$$

The above equation corresponds to Mat(V8*t*^(−1))+ 0110011+Mat(Rt^(−1)) in FIG. 38. The { } portion in the above equation is nothing but a result of performing S-box for AES cipher conversion on M, which can be expressed as below.

$$Y = S\text{-box}[M] + \text{Mat}(R^{\wedge}(-1))$$

The above equation corresponds to S-box(V8*t*)+Mat(Rt^(−1)) in FIG. 38. Here, S-box[X] indicates a result of performing the S-box for AES cipher conversion on X.

<Operating Principle of Encryption Device 1>

Next, that the encryption device 1 maintains AES cipher algorithm and compatibility will be described.

First, plain text data P (128 bits) is masked with a random number R0 (8 bits) in FIG. 9. A processing result A of the mask processing unit 10 is A=P+(R0, R0, ..., R0). Next, A is converted into B=P+RK0+(R0, R0, ..., R0) with a processing result of the AddRoundKey 11. Here, P+RK0 is an AddRoundKey processing result when the masking is not performed, and where M is P+RK0, B=M+(R0, R0, ..., R0). Next, although processing of the randomized Round_n 12 is performed on n=1 to 9, the processing will be described with reference to FIG. 10.

Where an input value (that is, an original value) of the randomized Round_n 12 when the masking is not performed is M, an input X can be expressed as X=M+(R0, R0, ..., R0) in FIG. 10. The randomized SubBytes 120 includes the randomized S-boxes as shown in FIG. 12. Now, where M is divided, for every 8 bits from the high order, into M0, M1, ..., M15, $$X = (M0, M1, \ldots, M15) + (R0, R0, \ldots, R0)$$

Here, based on the above description of the operating principle of the randomized S-boxes 120a to 120p, an output Y of the randomized SubBytes 120 can be expressed as Y=(S-box [M0], S-box[M1], ..., S-box[M15])+(Mat[R0^(−1)], Mat [R0^(−1)], ..., Mat[R0^(−1)]). In other words, $$Y = \text{SubBytes}(M) + (\text{Mat}[R0^{\wedge}(-1)], \text{Mat}[R0^{\wedge}(-1)], \ldots, \text{Mat}[R0^{\wedge}(-1)])$$

Stated differently, the output data of the randomized SubBytes 120 has been masked with (Mat[R0^(−1)], Mat[R0^(−1)], ..., Mat[R0^(−1)]). Next, it becomes obvious that a ShiftRows processing result and a MixColumn processing result, in which the output data are masked with (Mat[R0^(−1)], Mat[R0^(−1)], ..., Mat[R0^(−1)]), are obtained by performing, on an output of the ShiftRows 121 and an output of the MixColumn 122, the ShiftRows processing and the MixColumn processing that are defined in the AES cipher algorithm. Thus, when the input value of the processing of the randomized Round_n 12 is masked with R, an output value of the randomized Round_n 12, which is masked with Mat[R0^(−1)], is outputted. Thus, when the processing of the randomized Round_n 12 is performed, where n=1, the input data that is masked with R1=Mat[R0^(−1)] is outputted as the output data that is masked with R2=Mat[R1^(−1)]. It is to be noted that the processing Mat[R0^(−1)] and Mat[R1^(−1)] is nothing but the random number update processing shown in FIG. 29. When the above performances are repeated to the processing of the randomized Round_10 13, the output data of the randomized Round_10 13 (FIGS. 9 and 11) is outputted as data that is masked with R1=Mat[R10^(−1)] with respect to encrypted text C that is obtained as a result of performing, on the plain text P, the AES encryption processing. Thus, the unmask processing unit 14 obtains the encrypted text C (FIG. 9) by performing exclusive OR processing with R11.

Moreover, as is obvious from the description of the operating principle, intermediate data in encryption processing is always masked with either the random number R0 or a value that is calculated with a predetermined operation starting from R0. Therefore, it is difficult to analyze a key in the encryption device 1 with the power analysis attack.

FIG. 38 is a diagram showing an inclusive relation between the encryption device 1 and components of the encryption device 1, and input and output data of the whole and between the components. The inclusive relation and the input and output data that are shown in the above description will be organized with reference to FIG. 38.

Plain text U is inputted to the encryption unit 1a (FIGS. 9 and 31), and the encryption unit 1a outputs encrypted text C.

Here, a symbol Vt (t=1 to 11) shown in FIG. 38 is intermediate data that is obtained by performing, on the plain text U, processing up to a round t. The encryption unit 1a generates, through processing up to a round (t−1), randomized output data OAt=Vt+{Rt, Rt, ..., Rt} that is obtained by masking Vt with a random number Rt.

The random number temporary storage unit 16 (FIG. 9) provides the random number R0 to the mask processing unit 10, the random numbers R1 to R10 to the randomized S-box 121X including the randomized 8-bit inverse element calculation unit 101, and the random number R11 to the unmask processing unit 14.

IAt=Vt+{Rt, Rt, ..., Rt} (B or D in FIG. 9 and X in FIGS. 10 and 11) and the random number Rt (Rn in FIG. 9, Rn in FIG. 10, and R10 in FIG. 11) each are inputted to the randomized Round_t 12X (FIGS. 9 to 11) in each of rounds of processing, and the randomized Round_t 12X outputs Oat=V(t+1)+{R(t+1), R(t+1), ..., R(t+1)} that is obtained by masking, with a random number R(t+1), intermediate data V(t+1) that is obtained by performing the tth round of processing on an intermediate value Vt that is an original value indicated by the inputted IAt. Here, the original value from which an effect of the mask value of the randomized output data OAt is the above intermediate data V on which the tth round of processing has been performed.

IBt=IAt=Vt+{Rt, Rt, ..., Rt} (X in FIGS. 10 to 12) that is the input IAt to the randomized Round_t 12X and the random number Rt (R in FIG. 12, Rn in FIG. 10, and R10 in FIG. 11) are inputted to the randomized SubBytes 120X (FIGS. 10 to 12), and the randomized SubBytes 120X outputs OBt=S-box (Vt)+{R(t+1), R(t+1), ..., R(t+1)} (A in FIGS. 10 and 11 and Y in FIG. 12) on which the tth round of SubBytes processing has been performed.

8-bit IC8t=IB8t=V8t+Rt (one of X[0], X[1], ..., X[15] in FIG. 12, and X in FIG. 13) that is obtained by dividing the input IBt to the randomized SubBytes 120X and the random number Rt (R in FIGS. 12 and 13) are inputted to the randomized S-Box 121X (FIGS. 12 and 13), and the randomized S-Box 121X outputs OC8t=S-box(V8t)+R(t+1) (one of Y[0], Y[1], ..., Y[15] in FIG. 12, and Y in FIG. 13) that is obtained by performing the tth round of S-Box processing on the 8 bits.

ID8t=T1(IC8t)+T1(Rt) that is based on the above IC8t inputted to the randomized S-Box 121X and RDt=T1(Rt) (S in FIG. 13 and R in FIG. 14) that is based on the random number Rt of the random number temporary storage unit 16 are inputted to the randomized 8-bit inverse element calculation unit 101 (FIGS. 13 and 14), with the symbol T1 indicating the matrix calculation of Equation 1 (refer to the descriptions of the composite field conversion units 100 and 103), and the randomized 8-bit inverse element calculation unit 101 outputs OD8t=T1(V8t)^(−1)+T1(Rt)^(−1) (B in FIG. 13 and Y in FIG. 14) that is a result of performing an operation from M+P to M^(−1)+P^(−1) based on those inputs.

Here, the randomized S-Box 121X (FIGS. 12 and 13) obtains OC8t={Mat(V8t^(−1)+Mat(Rt^(−1)+01100011={Mat(V8t^(−1))+01100011}+Mat(Rt^(−1))=S-box(V8t)+Mat(Rt^(−1))=S-box(V8t)+R(t+1) by causing the extension field conversion and matrix conversion unit 102 and the exclusive OR unit 104 to perform a calculation based on the output OD8t=T1(V8t)^(−1)+T1(Rt)^(−1) (B in FIG. 13 and Y in FIG. 14) of the randomized 8-bit inverse element calculation unit 101, and outputs the obtained OC8t (one of Y[0], Y[1], ..., Y[15] in FIG. 12, and Y in FIG. 13).

Then, the randomized SubBytes 120X (FIGS. 10 to 12) concatenates a plurality of OC8t each of which is outputted from a corresponding one of randomized S-boxes 120X (a corresponding one of the randomized S-boxes 120a to 120p), and outputs output data OBt=S-box(Vt)+{R(t+1), R(t+1), ..., R(t+1)} (A in FIGS. 10 and 11, and Y in FIG. 12).

Accordingly, the randomized Round_t 12X calculates, from the outputted OBt, OAt=V(t+1)+{R(t+1), R(t+1), ..., R(t+1)} by, for example, performing the ShiftRows processing, and inputs, as randomized input data IAt of a next round of the randomized Round_t 12X, that is, the tth+1 round, the calculated OAt to the randomized Round_t 12X.

As a result, OAt=OA10=V11+{R11, R11, ..., R11} is inputted to the unmask processing unit 14 by the randomized Round_t 12X when t=10 and a random number R11 (E in FIG. 9 and Y in FIG. 11) is also inputted from the random number temporary storage unit 16 to the unmask processing unit 14, and the unmask processing unit 14 performs, on the inputted OA10=V11+{R11, R11, ..., R11}, an exclusive OR operation with the random number R11 and outputs encrypted text C=V11.

As described above, the encryption device 1 generates the encrypted text C (FIG. 38) from the plain text U (FIG. 38) using the key (such as RK0), the encryption device 1 being structured to include: the random number generation unit 15 which generates the random number R0; a randomized input data generation unit (the mask processing unit 10 (FIGS. 9 and 38, the AddRoundKey 11 (FIG. 9), and the composite field conversion unit 100 in the randomized Round_n 12 (FIG. 13), the extension field conversion and matrix conversion unit 102 (FIG. 13), and the exclusive OR unit 104 (FIG.

13)) which receives the plain text U and generates randomized input data T1(V8$t$)+T1(Rt) that is obtained by adding, to input data T1(V8$t$) that is obtained by performing, on the plain text U, predetermined processing with the key (such as RK0), a predetermined input mask value T1(Rt) determined depending on the random number R0; the randomized 8-bit inverse element calculation unit 101 which receives the randomized input data ID8$t$ generated by the randomized input data generation unit and the input mask value T1(Rt)=RDt, and which generates randomized output data T1(V8$t$)^(−1)+ T1(Rt)^(−1) that is obtained by adding, to an inverse element T1(V8$t$)^(−1) of the input data T1(V8$t$) in the first finite field, an output mask value T1(Rt)^(−1) that is an inverse element of the received input mask value in the predetermined first finite field; and an output unit (the extension field conversion and matrix conversion unit 102 (FIG. 13) in the randomized Round_10 13, the exclusive OR unit 104 (FIG. 13), the ShiftRows 131 (FIG. 11), the AddRoundKey 132 (FIG. 11), the unmask processing unit 14 (FIGS. 9 and 38)) which receives the randomized output data OD8$10$ (t=10) generated by the randomized 8-bit inverse element calculation unit 101, and which generates the encrypted text C from the received randomized output data.

Furthermore, in the encryption device 1, the randomized 8-bit inverse element calculation unit 101 includes: the seventeenth power calculation units 110 and 112 (FIG. 14) which generate the first exponentiation randomized input data (A in FIG. 14) and the first exponentiation input mask value (C in FIG. 14), respectively, by performing, on each of the randomized input data ID8$t$ (X in FIG. 14) and the input mask value (T1(Rt) and R in FIG. 14), an exponential operation with the predetermined first exponential (the seventeenth power); the 4-bit correction term calculation unit 111 (FIGS. 14 and 16) which generates predetermined correction data (B in FIG. 14) from the randomized input data (X in FIG. 14) and the input mask value (R in FIG. 14); the exclusive OR unit 113 (FIG. 14) which generates side randomized input data (D in FIG. 14) by adding the generated correction data (B in FIG. 14) to the generated first exponentiation randomized input data (A in FIG. 14); the randomized 4-bit inverse element calculation unit 114 (FIGS. 14 and 23) which receives the side randomized input data (D in FIG. 14) and the first exponentiation input mask value (C in FIG. 14), randomized side output data (E=D^(−1)+C^(−1)) that is obtained by adding, to output data (D^(−1)) that is an inverse element of the side randomized input data (D in FIG. 14) in the second finite field, and which generates a mask value (C^(−1)) that is an inverse element of the first exponentiation input mask value (C in FIG. 14) in the second finite field; and other components which generate the randomized output data (Y in FIG. 14) from the randomized side output data (E in FIG. 14), the randomized input data (X in FIG. 14), and the input mask value (R in FIG. 14).

Here, the "other components" include: the sixteenth calculation units 115 and 117 which generate the second exponentiation randomized input data (F in FIG. 14) and the second exponentiation input mask value (H in FIG. 14), respectively, by performing, on the randomized input data (X in FIG. 14) and the input mask value (R in FIG. 14), an exponential operation with the predetermined second exponential (the sixteenth power); the 4-bit inverse element calculation unit 116 (FIGS. 15 and 21) which generates an inverse element exponentiation input mask value (G in FIG. 14) that is an inverse element of the first exponentiation input mask value (C in FIG. 14) in the second infinite field, by performing an inverse element calculation in the second infinite field on the first exponentiation input mask value (C in FIG. 14); and other components (the 4-bit output calculation units 118 and 119) which generate the randomized output data (Y in FIG. 14) from the randomized side output data (E in FIG. 14), the second exponentiation randomized input data (F in FIG. 14), the second exponentiation input mask value (H in FIG. 14), and the inverse element exponentiation input mask value (G in FIG. 14).

Moreover, the encryption device 1 performs the Advanced Encryption Standard (AES) cipher encryption processing on the plain text U and generates the encrypted text C with the AES cipher. The inverse element T1(V8$t$)^(−1) of the input data is a result of performing, on the input data T1(V8$t$), an inverse calculation, between the inverse calculation and an affine that are equivalent to the Sbox table for AES cipher.

For this reason, the encryption device 1 can perform the inverse element calculation for the AES cipher encryption due to its simple structure and the smaller number of logical steps, and further perform the AES cipher encryption processing.

In addition, the encryption device 1 Further includes a mask value generation unit (the random number update unit 17 and the composite field conversion unit 103 (FIGS. 9, 13, and 29)) which generates the input mask value RDt that is used by the randomized 8-bit inverse element calculation unit 101.

This allows an input mask value to be generated in the encryption device 1, which simplifies a system configuration.

Furthermore, in the encryption device 1, the mask input data generation unit includes: the first component (the mask processing unit 10 (FIGS. 38 and 39), the AddRoundKey 11 (FIG. 9), and the composite field conversion unit 100 (FIG. 13)) which generates the first randomized input data ID8$t$=ID81=T1(V81)+T1(R1) from the plain text U; and the second component (the extension field conversion and matrix conversion unit 102 (FIG. 13), the exclusive OR unit 104 (FIG. 13), the ShiftRows 121 in the randomized Round_n 12 (FIG. 10), MixColumns 122 (FIG. 10), the AddRoundKey 123 (FIG. 10), and the composite field conversion unit 100) which receives the (t−1)th randomized output data OD8($t$−1), and which generates the tth randomized input data ID8$t$=T1 (V8$t$)+T1(Rt) (2≦t≦J) by adding the predetermined tth input mask value T1(Rt)=T1(Mat(Rt^(−1)) that is determined by the (t−1)th output mask value RD(t−1)^(−1)=T1(Rt) to the received (t−1)th randomized output data, wherein the mask value generation unit generates the first input mask value RD1 to the Jth input mask value RDJ (J=10) from the generated random number R0, and the randomized 8-bit inverse element calculation unit 101 generates the first randomized output data OD81 from the first randomized input data ID81 generated by the first component and the generated first input mask value RD1 as well as the tth randomized output data OD8$t$ from the tth randomized input data ID8$t$ (2≦t≦J) generated by the second component and the generated tth input mask value RDt.

It is to be noted that here, in the encryption device 1, the first component (the mask processing unit 10 (FIGS. 9 and 38), the AddRoundKey 11 (FIG. 9), and the composite field conversion unit 100 (FIG. 13)) obtains, from the mask value generation unit (the random number update unit 17), specification data R0 for specifying the first input mask value RD1=T1(R1), and generates, from the obtained specification data R0 and the plain text U, the first randomized input data ID8$t$=ID81=T1(V81)+T1(R1) by adding the first input mask value RD1=T1(R1) to T1(V81); the mask value generation unit (the random number update unit 17) generates specification data R11 for specifying the Jth output mask value T1(R10)^(−1); and the output unit receives the generated specification data R11 and the Jth randomized output data OD8*t* generated by adding T1(V8*t*)^(−1) and the Jth output mask value T1(R10)^(−1) specified by the specification data R11, and generates the encrypted text C from these data.

It is to be noted that the mask value generation unit includes: a holding unit (the random number temporary storage unit 16 (FIG. 9)) which holds a value and holds, when the random number R0 is generated, the generated random number R0; a holding control unit (the random number update unit 17 (FIG. 9)) which generates, from a random number R(t−1) to be held, a random number Rt with which the tth input mask value is calculated through a predetermined calculation, and causes the holding unit to hold the generated random number Rt; and a calculation unit (the composite field conversion unit 103 (FIG. 13) which calculates, from the held random number Rt, the tth input mask value (t=1, 2, . . . , J) with the above calculation.

Accordingly, since the random number Rt is held, the (t+1) th input mask value is calculated from the held random number Rt through simple processing, and each of input mask values can be calculated through the simple processing.

It is to be noted that the "random number generation unit" recited in CLAIMS may correspond to, for instance, all of the random number generation unit 15, the random number temporary storage unit 16, and the random number update unit 17. In this case, the "mask value generation unit" recited in CLAIMS may be thought to correspond not to the random number update unit 17 and the composite field conversion unit 103 as described above but to only the composite field conversion unit 103.

It is to be noted that the encryption device 1 may include an integrated circuit which includes circuits achieving each of the above components, and the integrated circuit may execute the above-mentioned method by causing each component to perform the above-mentioned functions.

<Decryption Device 3>

Figure 36:
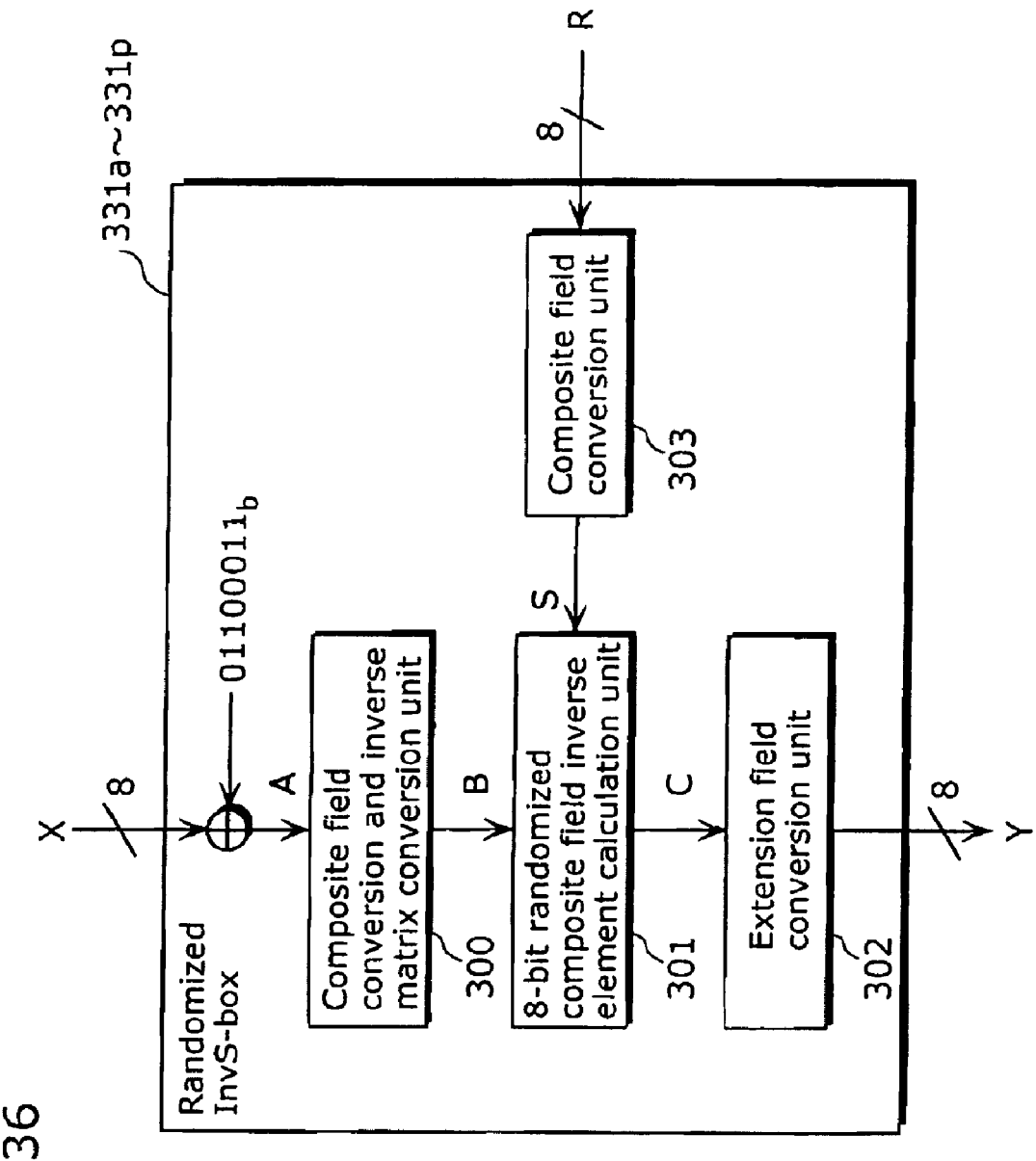
FIG. 36 is a block diagram showing a configuration of randomized InvS-Boxes 331a to 331p according to the embodiment of the present invention.
Figure 37:
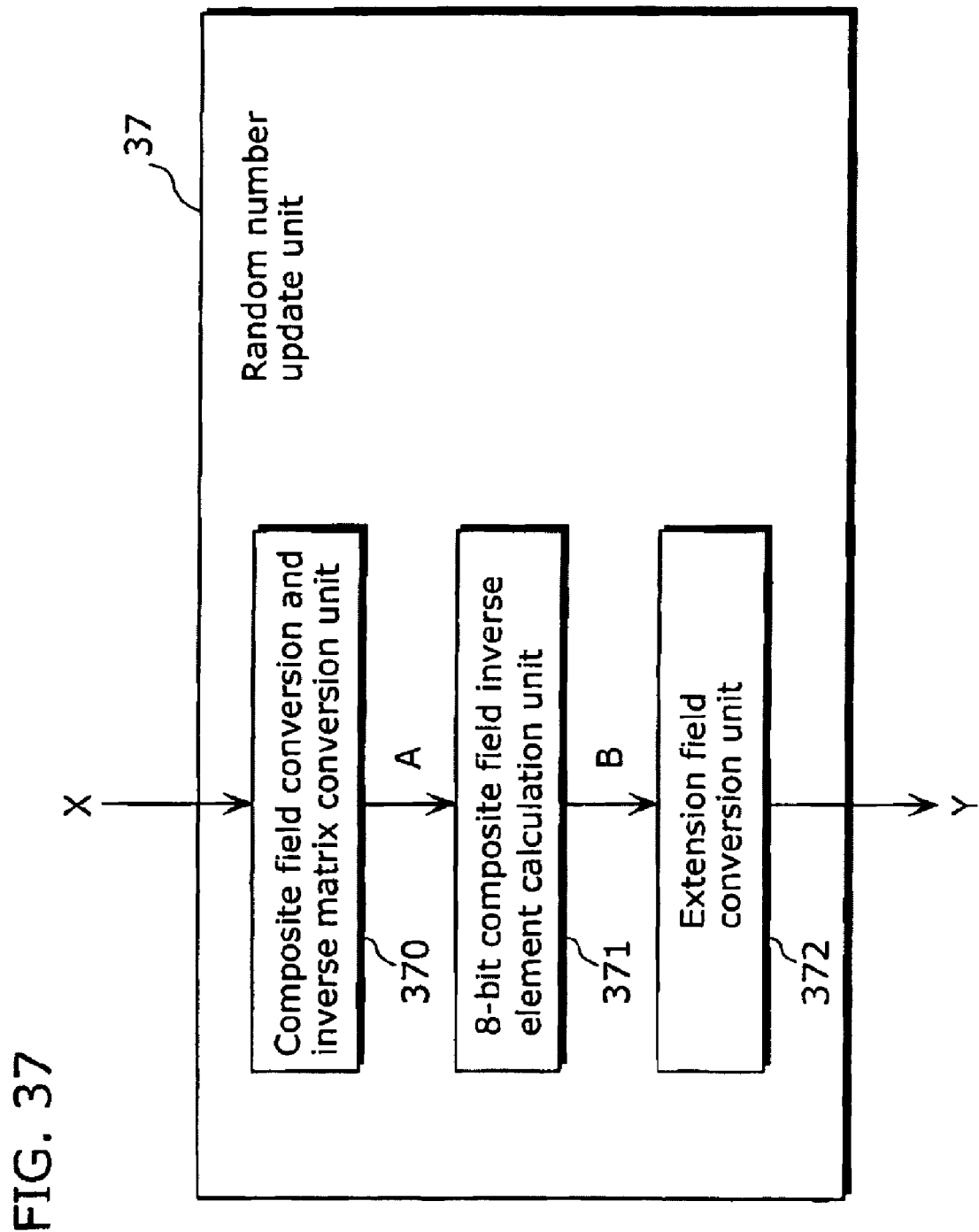
FIG. 37 is a block diagram showing a configuration of a random number update unit 37 according to the embodiment of the present invention.

FIGS. 31 to 37 each show a configuration of a decryption device 3 corresponding to the encryption device 1. Since processing of the decryption device 3 is inverse conversion processing of the processing of the encryption device 1 and a basic processing flow of the decryption device 3 is the same as that of the encryption device 1 described above, the processing and the processing flow of the decryption device 3 will not be described in detail. It is to be noted that the following matrix operation is used in an extension field conversion and inverse matrix conversion unit 300 of randomized InvS-Boxes 331*a* to 331*p* shown in FIG. 36

$$\begin{pmatrix} A7 \\ A6 \\ A5 \\ A4 \\ A3 \\ A2 \\ A1 \\ A0 \end{pmatrix} = \begin{pmatrix} 1 & 1 & 0 & 0 & 0 & 1 & 1 & 0 \\ 0 & 0 & 0 & 0 & 1 & 0 & 0 & 1 \\ 1 & 0 & 1 & 1 & 1 & 1 & 1 & 0 \\ 1 & 0 & 0 & 0 & 1 & 1 & 1 & 1 \\ 0 & 0 & 1 & 0 & 0 & 1 & 1 & 0 \\ 1 & 0 & 1 & 1 & 1 & 0 & 0 & 0 \\ 0 & 0 & 0 & 0 & 1 & 0 & 1 & 0 \\ 0 & 1 & 0 & 0 & 0 & 1 & 1 & 1 \end{pmatrix} \begin{pmatrix} X7 \\ X6 \\ X5 \\ X4 \\ X3 \\ X2 \\ X1 \\ X0 \end{pmatrix}, \quad \text{[Equation 3]}$$

and, in an extension field conversion unit 302 also shown in FIG. 36, the following matrix operation $$\begin{pmatrix} Y7 \\ Y6 \\ Y5 \\ Y4 \\ Y3 \\ Y2 \\ Y1 \\ Y0 \end{pmatrix} = \begin{pmatrix} 1 & 0 & 0 & 0 & 1 & 1 & 1 & 0 \\ 0 & 1 & 1 & 0 & 1 & 1 & 0 & 0 \\ 0 & 0 & 0 & 0 & 1 & 1 & 1 & 0 \\ 1 & 1 & 0 & 1 & 0 & 0 & 1 & 1 \\ 0 & 1 & 0 & 0 & 1 & 0 & 1 & 0 \\ 0 & 0 & 1 & 0 & 1 & 0 & 1 & 0 \\ 1 & 0 & 0 & 1 & 0 & 0 & 0 & 0 \\ 1 & 1 & 0 & 0 & 1 & 0 & 1 & 1 \end{pmatrix} \begin{pmatrix} B7 \\ B6 \\ B5 \\ B4 \\ B3 \\ B2 \\ B1 \\ B0 \end{pmatrix} \quad \text{[Equation 4]}$$

is used.

Accordingly, the decryption device 3 which generates decrypted text from encrypted text using a key, the decryption device 3 being structured to include: a random number generation unit 35 (FIG. 32) which generates a random number; an input unit (a mask processing unit 30 (FIG. 32), AddRoundKey 31 (FIG. 32), InvShiftRows 320 (FIG. 33), an exclusive OR unit shown in FIG. 36, the extension field conversion unit 302 (FIG. 36) included in randomized InvRound_n 32 (FIGS. 32 and 33), AddRoundKey 322 (FIG. 33), InvMixColumns 323 (FIG. 33), InvShiftRows 330 (FIG. 34) included in randomized InvRound_0 33 (FIG. 34)) which receives the encrypted text and generates randomized input data that is obtained by adding, to input data that is obtained by performing predetermined processing on the encrypted text using the key, a predetermined input mask value determined depending on the random number; an 8-bit randomized composite field inverse element calculation unit 301 (FIG. 36) which receives the randomized input data generated by the input unit and the input mask value, and which generates randomized output data that is obtained by adding, to an inverse element of the input data in the first finite field, an output mask value that is an inverse element of the received input mask value in the first finite field; and an output unit (the extension field conversion unit 302 (FIG. 36) included in the randomized InvRound_0 33 (FIGS. 32 and 34), AddRoundKey 332 (FIG. 34), an unmask processing unit 34 (FIG. 32)) which receives the randomized output data generated by the 8-bit randomized composite field inverse element calculation unit 301, and which generates the decrypted text from the received randomized output data.

<Estimation of Maximum Number of Logical Steps>

The maximum number of logical steps of the randomized 8-bit inverse element calculation unit 101 (FIGS. 13 and 14) in the above-described embodiment will be estimated. Critical paths and the maximum number of logical steps when the randomized 8-bit inverse element calculation unit 101 is implemented in a circuit are estimated as below.

A critical path of the randomized 8-bit inverse element calculation unit 101 is as follows in FIG. 14.

The seventeenth power calculation unit 110 »the exclusive OR unit 113 »the randomized 4-bit inverse element calculation unit 114 »the 4-bit output calculation unit 118

A critical path of the 4-bit output calculation unit 118 that is on the above critical path is as follows (FIG. 18).

The 4-bit multiplication unit 118*a* »the exclusive OR unit 118*c* »the exclusive OR unit 118*e*

Moreover, a critical path of the randomized 4-bit inverse element calculation unit 114 that is on the path shown in FIG. 14 is as follows (FIG. 23).

The fifth power calculation unit 150 »the exclusive OR unit 153 »the randomized 2-bit inverse element calculation unit 154 »the 2-bit output calculation unit 158

A critical path of the 2-bit output calculation unit 158 that is shown in FIG. 23 is as follows (FIG. 27).

The 2-bit multiplication unit 158*a* »the exclusive OR unit 158*c*» the exclusive OR unit 158*e*

A critical path of the randomized 2-bit inverse element calculation unit 154 that is on the critical path shown in FIG. 23 is as follows (FIG. 28).

The exclusive OR unit 154*c*

Therefore, the maximum number of logical steps in the randomized 8-bit inverse element calculation unit 101 (FIG. 14) is the number of logical steps at the time of serially processing the following processes.

Seventeenth power calculation×1 time
Fifth power calculation×1 time
4-bit multiplication×1 time
2-bit multiplication×1 time
Exclusive OR operation×7 times It is to be noted that, here, "7 times" in the above "Exclusive OR operation×7 times" is obtained through the following calculation: 7=1+2+1+2+1. In other words, the number of times the exclusive OR operation is performed is reduced by 11 times compared to the randomized 8-bit inverse element calculation unit 81 (FIG. 1) according to Conventional Technique 2, and the reduction in the maximum number of logical steps is achieved.

(Modification)

It is to be noted that although a cipher to be protected from the power analysis attack is the AES cipher in the present embodiment, such a cipher is not limited to the AES cipher. Encryption schemes in which an inverse element calculation is used in encryption processing or table conversion processing used in the encryption processing can be configured based on the inverse element calculation can be applied to the present embodiment. An other example of the encryption schemes includes Camellia cipher described in ISO/IEC 18033-3: 2005, "Information technology—Security technique—Encryption algorithms—Part 3: Block ciphers" (Non-patent Reference 3).

Furthermore, even in the case where functions of the above embodiment are implemented in software, since it is unnecessary to hold a conversion table as a matrix, the above embodiment produces effects of saving code size as with conventional techniques and reducing encryption processing time more than the conventional techniques.

Moreover, although the above embodiment has described a case where the whole processing is implemented in an operational circuit, a part of the processing may be implemented as the conversion table. For instance, in the case of the randomized 4-bit inverse element calculation unit 114, the randomized 4-bit inverse element calculation unit 114 may be implemented in a matrix Inv4[16] that includes 4 bits×16 elements, and a 4-bit output may be outputted as Inv4[X] with respect to a 4-bit input X.

It is to be noted that although the present invention has been described based on the above embodiment, the present invention is not obviously limited to the above embodiment. The present invention includes the following cases.

(1) Each of the aforementioned devices is specifically a computer system including a micro processor, a ROM, a RAM, a hard disk unit, a display unit, a keyboard, a mouse, and so on. A computer program is stored in the RAM or hard disk unit. Each device achieves it functions through the microprocessor's operation according to the computer program. Here, the computer program is configured by combining plural instruction codes indicating instructions for a computer, so as to achieve predetermined functions.

(2) A part or all of the components included in each device may be configured from a single system large-scale integration (LSI). The system LSI is a super-multifunctional LSI manufactured by integrating components on one chip, and is specifically a computer system configured by including a microprocessor, a ROM, a RAM, and so on. A computer program Is stored in the RAM. The system LSI achieves it functions through the microprocessor's operation according to the computer program.

(3) A part or all of the components included in each device may be configured as an IC card which can be attached to and detached from each device or as a stand-alone module. The IC card or the module is a computer system including a microprocessor, a ROM, a RAM, and so on. The IC card or the module may also be included in the super-multifunctional LSI. The IC card or the module achieves its functions through the microprocessor's operation according to a computer program. The IC card or the module may also have tamper-resistance.

(4) The present invention may be the aforementioned methods. In addition, the present invention may be a computer program for realizing these methods or may be a digital signal including the computer program.

Furthermore, the present invention may also be realized by storing the computer program or the digital signal in a computer-readable recording medium such as a flexible disk, a hard disk, a CD-ROM, an MO, a DVD, a DVD-ROM, a DVD-RAM, a BD (Blu-ray Disc), and a semiconductor memory. Moreover, the present invention also includes the digital signal recorded in these recording media.

In addition, the present invention may also be realized by transmitting the computer program or the digital signal via a telecommunication line, a wireless or wired communication line, a network represented by the Internet, a data broad cast, and so on.

Furthermore, the present invention may also be a computer system including a microprocessor and a memory, in which the memory stores the computer program and the microprocessor operates according to the computer program.

Moreover, an other independent computer system may perform execution by transferring the computer program or the digital signal that are recorded on the recording medium or by transferring the computer program or the digital signal via the network and so on.

(5) It is to be noted that the mask value generation unit may generate, in parallel with a calculation, performed by the randomized 8-bit inverse element calculation unit 101 (FIG. 14), of randomized output data from randomized input data, RD8($t$+1) and the like, which is subsequent to RDt used for the calculation by the randomized 8-bit inverse element calculation unit 101. This way, the randomized 8-bit inverse element calculation unit 101 can start using RD(t+1) and the like without delay, and cause the encryption device 1 to operate at high speed.

(6) In addition, the present invention may adopt the following aspect.

To put it differently, the present invention may adopt an aspect of an encryption processing program which is an encryption processing program used in a computer for generating encrypted text by performing predetermined encryption processing on plain text based on a key, the encryption processing program causing the computer to execute the following information processing: generating a random number; and receiving randomized input data and an input randomized mask value to perform an inverse element calculation in the first infinite field, and generating randomized output data, wherein the randomized input data is a value that is masked by adding the input mask value and input data, the randomized output data is a value that is masked by adding an output mask value and output data, the input mask value is a value determined depending on the random number, the output data is an inverse element of the input data in the first finite field, and the output mask value is an inverse element of the input mask value in the first finite field.

Furthermore, the present invention may take the following aspect. Stated differently, the present invention may adopt an aspect of a computer program which is a computer program used in a computer for generating encrypted text from plain text using a key, the computer program causing the computer to execute: generating a random number; receiving the plain text and generating randomized input data that is obtained by adding, to input data that is obtained by performing predetermined processing on the plain text, a predetermined input mask value determined depending on the random number; receiving the randomized input data generated in the receiving the plain text and generating the randomized input data and the input mask value, and generating randomized output data that is obtained by adding, to an inverse element of the input data in the first finite field, an output mask value that is a predetermined inverse element of the received input mask value in the first finite field; and receiving the randomized output data generated in the receiving the randomized input data and the mask value and generating the randomized out put data, and generating the encrypted text from the received randomized output data.

It is to be noted that the encryption processing program and the computer program each may be executed by a multiprocessor or the like which executes mutually different processes in parallel, and in this case, the computer program may cause the computer to generate the input mask value in parallel with generation of the randomized output data from the randomized input data.

(7) The above embodiment and the above modifications may be combined respectively.

INDUSTRIAL APPLICABILITY

Characterized by reducing encryption processing amount more than the conventional techniques while preventing the power analysis attack, the encryption device according to the present invention is useful for realizing an encryption device of which a high processing speed and low manufacturing costs are required.

The invention claimed is:

1. An encryption circuit which generates encrypted text from plain text using a key, said encryption device comprising:
a random number generation circuit which generates a random number;
a randomized input data generation circuit which receives the plain text, and generates randomized input data that is obtained by adding, to input data that is obtained by performing predetermined processing on the plain text using the key, a predetermined input mask value determined depending on the random number;
a first randomized inverse element data generation circuit which receives the randomized input data generated by said randomized input data generation circuit and the input mask value, and generates randomized output data that is obtained by adding, to an inverse element of the input data in a predetermined first finite field, an output mask value that is an inverse element of the received input mask value in the first finite field; and
an output data processing circuit which receives the randomized output data generated by said first randomized inverse element data generation circuit, and generates the encrypted text from the received randomized output data.

2. The encryption circuit according to claim 1,
wherein said first randomized inverse element data generation circuit includes:
a first exponential operation circuit which performs, with a predetermined first exponent, an exponential operation on the randomized input data and the input mask value, and generates, through the exponential operations, first exponential randomized input data and a first exponential input mask value, respectively;
a correction data generation circuit which generates predetermined correction data from the randomized input data and the input mask value;
an addition circuit which adds the generated correction data to the calculated first exponential randomized input data, and generates side randomized input data;
a second randomized inverse element data generation circuit which receives the side randomized input data and the first exponential input mask value, and generates randomized side output data that is obtained by adding, to an inverse element of the side randomized input data in a predetermined second finite field, a mask value that is an inverse element of the first exponential input mask value in the second finite field; and
a randomized output data generation circuit which generates the randomized output data from the randomized side output data, the randomized input data, the input mask value, and the first exponential input mask value.

3. The encryption circuit according to claim 2,
wherein said randomized output data generation circuit includes:
a second exponential operation circuit which performs, with a predetermined second exponent, an exponential operation on each of the randomized input data and the input mask value, and generates, through each of the exponential operations, second exponential randomized input data and a second exponential input mask value, respectively;
an inverse element calculation circuit which performs, on the first exponential input mask value, an inverse element calculation in the second finite field, and generates an inverse element exponential input mask value that is the inverse element of the first exponential input mask value in the second finite field; and
a randomized output data generation circuit which generates the randomized output data from the randomized side output data, the second exponential randomized input data, the second exponential input mask value, and the inverse element exponential input mask value.

4. The encryption circuit according to claim 1,
wherein said encryption circuit performs encryption processing for Advanced Encryption Standard (AES) cipher on the plain text, and generates encrypted text in AES cipher, and
the inverse element of the input data is a result of performing, on the input data, an inverse element calculation, between the inverse element calculation and an affine that are equivalent to an Sbox table for AES cipher.

5. The encryption circuit according to claim 1,
wherein said randomized input data generation circuit includes:
a first component which generates, from the plain text, first randomized input data by adding a first input mask value to the plain text; and
a second component which receives (t−1)th randomized output data generated by said first randomized inverse element data generation circuit, and which generates tth randomized input data ($2 \leq t \leq J$ where J is a predetermined integer number that is no less than 2) by adding a tth input mask value determined by a (t−1)th output mask value to the received (t−1)th randomized output data,
said encryption circuit further comprises a mask value generation circuit which generates first to Jth input mask values from the random number,
said first randomized inverse element data generation circuit generates the first randomized output data from the first randomized input data generated by said first component and the generated first input mask value, as well as tth randomized output data ($2 \leq t \leq J$) from the tth randomized input data generated by said second component and the generated tth input mask value, and
said output data processing circuit generates the encrypted text from generated Jth randomized output data.

6. A decryption circuit which generates decrypted text from encrypted text using a key, said decryption device comprising:
a random number generation circuit which generates a random number;
a randomized input data generation circuit which receives the encrypted text, and generates randomized input data that is obtained by adding, to input data that is obtained by performing predetermined processing on the encrypted text using the key, a predetermined input mask value determined depending on the random number;
a first randomized inverse element data generation circuit which receives the randomized input data generated by said randomized input data generation circuit and the input mask value, and generates randomized output data that is obtained by adding, to an inverse element of the input data in a predetermined first finite field, an output mask value that is an inverse element of the received input mask value in the first finite field; and
an output data processing circuit which receives the randomized output data generated by said first randomized inverse element data generation circuit, and generates the decrypted text from the received randomized output data.

7. An encryption method which is performed by an encryption circuit to generate encrypted text from plain text using a key, said encryption method comprising:
generating a random number, said generating being performed by a random number generation circuit;
receiving the plain text and generating randomized input data that is obtained by adding, to input data that is obtained by performing predetermined processing on the plain text using the key, a predetermined input mask value determined depending on the random number, said receiving of the plain text and generating of randomized input data being performed by a randomized input data generation circuit;
receiving the randomized input data generated in said receiving of the plain text and generating of the randomized input data and the input mask value and generating randomized output data that is obtained by adding, to an inverse element of the input data in a predetermined first finite field, an output mask value that is an inverse element of the received input mask value in the first finite field, said receiving of the randomized input data and generating of randomized output data being performed by a first randomized inverse element data generation circuit; and
receiving the randomized output data generated in said receiving of the randomized input data and generating of the randomized output data and generating the encrypted text from the received randomized output data, said receiving of the randomized output data and generating of the encrypted text being performed by an output data processing circuit.

8. An integrated circuit which generates encrypted text from plain text using a key, said integrated circuit comprising:
a random number generation unit configured to generate a random number;
a randomized input data generation unit configured to receive the plain text, and generate randomized input data that is obtained by adding, to input data that is obtained by performing predetermined processing on the plain text using the key, a predetermined input mask value determined depending on the random number;
a first randomized inverse element data generation unit configured to receive the randomized input data generated by said randomized input data generation unit and the input mask value, and generate randomized output data that is obtained by adding, to an inverse element of the input data in a predetermined first finite field, an output mask value that is an inverse element of the received input mask value in the first finite field; and
an output data processing unit configured to receive the randomized output data generated by said first randomized inverse element data generation unit, and generate the encrypted text from the received randomized output data.

* * * * *